United States Patent
Kakutani

(10) Patent No.: US 7,957,031 B2
(45) Date of Patent: *Jun. 7, 2011

(54) HIGH-IMAGE-QUALITY HALFTONE PROCESS

(75) Inventor: Toshiaki Kakutani, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 1190 days.

This patent is subject to a terminal disclaimer.

(21) Appl. No.: 11/601,509

(22) Filed: Nov. 17, 2006

(65) Prior Publication Data

US 2007/0121137 A1    May 31, 2007

(30) Foreign Application Priority Data

Nov. 18, 2005 (JP) ................................. 2005-334419

(51) Int. Cl.
H04N 1/405 (2006.01)
H04N 1/407 (2006.01)

(52) U.S. Cl. ....................................... 358/3.01; 358/3.16

(58) Field of Classification Search ................. 358/3.13, 358/3.19, 3.2, 3.01, 3.16; 382/237
See application file for complete search history.

(56) References Cited

U.S. PATENT DOCUMENTS

| 4,760,460 | A * | 7/1988 | Shimotohno | 358/426.01 |
|---|---|---|---|---|
| 6,304,340 | B1 * | 10/2001 | Wang | 358/1.9 |
| 6,493,112 | B1 * | 12/2002 | Arce et al. | 358/3.19 |
| 7,009,737 | B2 | 3/2006 | Morimatsu | |
| 7,393,074 | B2 | 7/2008 | Yamazaki | |
| 2002/0186414 | A1 * | 12/2002 | Crossland et al. | 358/3.06 |
| 2004/0075706 | A1 * | 4/2004 | Kroon et al. | 347/15 |
| 2004/0218221 | A1 | 11/2004 | Hirano et al. | |
| 2005/0035996 | A1 * | 2/2005 | Maru et al. | 347/43 |
| 2005/0122361 | A1 * | 6/2005 | Huang et al. | 347/19 |
| 2007/0035772 | A1 | 2/2007 | Kakutani | |
| 2007/0171439 | A1 * | 7/2007 | Kakutani | 358/1.9 |

FOREIGN PATENT DOCUMENTS

| JP | 2001-298617 | 10/2001 |
|---|---|---|
| JP | 2001-346041 | 12/2001 |
| JP | 2003-101776 | 4/2003 |

(Continued)

OTHER PUBLICATIONS

Abstract of Japanese Patent Publication No. 2001-298617, Pub. Date: Oct. 26, 2001, Patent Abstracts of Japan.

(Continued)

*Primary Examiner* — David K Moore
*Assistant Examiner* — Peter L Cheng
(74) *Attorney, Agent, or Firm* — Martine Penilla & Gencarella, LLP

(57) ABSTRACT

An image processing method involves processing image data indicative of an image represented with a prescribed number of input tones by each of pixel groups composed of a plurality of print pixels, and generating dot data representing a status of dot formation on each of the print pixels to be formed on a print medium. The method includes preparing a first conversion table and a second conversion table, determining the pixel group tone value in response to the input tone value corresponding to the pixel group, converting the determined pixel group tone value into the code values for each of the pixel groups, by referring to the first conversion table, decoding the acquired code value into the output dot arrangement for each of the pixel groups, by referring to the second conversion table, and outputting the dot data in response to the output dot arrangement.

5 Claims, 44 Drawing Sheets

FOREIGN PATENT DOCUMENTS

| | | |
|---|---|---|
| JP | 2004-326613 | 11/2004 |
| JP | 2005-096443 | 4/2005 |
| JP | 2005-236768 | 9/2005 |
| JP | 2005-269527 | 9/2005 |
| WO | WO 2005/104525 | 11/2005 |

OTHER PUBLICATIONS

Abstract of Japanese Patent Publication No. 2001-346041, Pub. Date: Dec. 14, 2001, Patent Abstracts of Japan.
Abstract of Japanese Patent Publication No. 2003-101776, Pub. Date: Apr. 4, 2003, Patent Abstracts of Japan.
Abstract of Japanese Patent Publication No. 2004-326613, Pub. Date: Nov. 18, 2004, Patent Abstracts of Japan.
Abstract of Japanese Patent Publication No. 2005-096443, Pub. Date: Apr. 14, 2005, Patent Abstracts of Japan.
Abstract of Japanese Patent Publication No. 2005-236768, Pub. Date: Sep. 2, 2005, Patent Abstracts of Japan.
Abstract of Japanese Patent Publication No. 2005-269527, Pub. Date: Sep. 29, 2005, Patent Abstracts of Japan.

* cited by examiner

Fig.12

COUNT DATA (CODE VALUE) CONVERSION TABLE

| CLASSIFICATION NUMBER | | | | | |
|---|---|---|---|---|---|
| 1 | 0 | 1 | 2 | 3 |
| 2 | 0 | 1 | 2 | 3 |
| 3 | 0 | 1 | 3 | 4 |
| 4 | 0 | 1 | 2 | 4 |
| 5 | 0 | 1 | 2 | 3 |
| 6 | 0 | 2 | 3 | |
| 7 | 0 | 1 | 3 | |
| 8 | 0 | 1 | | |
| 9 | 0 | | | |
| 10 | 0 | | | |

| MULTIVALUE QUANTIZATION RESULT VALUE | | | | | | | | | |
|---|---|---|---|---|---|---|---|---|---|
| 14 | 15 | 16 | 17 | 18 | 19 | 20 | 21 | ... | 30 | 31 |
| 157 | 164 | — | — | — | — | — | — | | — | — |
| 143 | 153 | 159 | 164 | — | — | — | — | | — | — |
| 138 | 148 | 151 | 160 | 146 | 148 | 158 | — | | — | — |
| 109 | 124 | 130 | 139 | 157 | 163 | — | — | | — | — |
| 135 | 141 | 147 | 150 | — | — | — | — | | — | — |
| 150 | 153 | 161 | — | 160 | — | — | — | | — | — |
| — | 142 | 149 | 155 | 139 | 146 | 151 | 158 | | — | — |
| — | 127 | 129 | 130 | 152 | 162 | 164 | — | | — | — |
| — | 141 | 144 | 147 | 160 | — | — | — | | — | — |
| — | 138 | 143 | 154 | | 164 | | | | — | — |

Fig.13

| COUNT DATA (CODE VALUE) | DOT COUNT | | |
|---|---|---|---|
| | LARGE | MEDIUM | SMALL |
| 0 | 0 | 0 | 0 |
| 1 | 0 | 0 | 1 |
| 2 | 0 | 0 | 2 |
| 3 | 0 | 0 | 3 |
| 160 | 6 | 2 | 0 |
| 161 | 7 | 0 | 0 |
| 162 | 7 | 0 | 1 |
| 163 | 7 | 1 | 0 |
| 164 | 8 | 0 | 0 |

Fig.14

ORDER VALUE MATRIX CONVERSION TABLE (POSITION NUMBER ACQUISITION TABLE)

| CLASSIFICATION NUMBER | 0 | 1 | 2 | 3 | ... | 14 | 15 | 16 | 17 | ... | 30 | 31 |
|---|---|---|---|---|---|---|---|---|---|---|---|---|
| 1 | 0 | 6 | 75 | 742 | | 61357042 | 61357042 | — | — | | — | — |
| 2 | 0 | 4 | 32 | 325 | | 53041672 | 53041672 | — | — | | — | — |
| 3 | 0 | 3 | 32 | 324 | | 75104623 | 75104623 | — | — | | — | — |
| 4 | 0 | 1 | 12 | 125 | | 13724065 | 13724065 | 13742065 | 13724065 | | — | — |
| 5 | 0 | 2 | 23 | | | 31072654 | 31072654 | 31072654 | — | | — | — |
| 6 | 0 | 5 | 51 | | | 52361740 | 52361740 | — | — | | — | — |
| 7 | 0 | 5 | | | | | 05432617 | 05432617 | — | | — | — |
| 8 | 0 | | | | | | 74125306 | 74125306 | 74125306 | | — | — |
| 9 | 0 | | | | | | 50324761 | 50324761 | 50324761 | | — | — |
| 10 | 0 | | | | | | 23164750 | 23164750 | 50324761 | | — | — |

MULTI-VALUE QUANTIZATION RESULT VALUE

DETERMINATION OF THE ORDER VALUE MATRIX
WHEN THE CLASSIFICATION NUMBER AND THE MULTI-VALUE
QUANTIZATION RESULT VALUE ARE BOTH '1'.

POSITION NUMBER: 6

DETERMINATION OF THE ORDER VALUE MATRIX WHEN
THE CLASSIFICATION NUMBER AND THE MULTI-VALUE
QUANTIZATION RESULT VALUE ARE '1' AND '15', RESPECTIVELY.

POSITION NUMBER: 61357042

THE ORDER VALUE MATRIXES WITH THE CLASSIFICATION NUMBER '1'

Fig.16A

THE ORDER VALUE MATRIX FOR 1 DOT
(THE MULTI-VALUE QUANTIZATION RESULT VALUE IS '1')

|   |   |   |   |
|---|---|---|---|
|   |   | 0 |   |

Ord1

Fig.16B

THE ORDER VALUE MATRIX FOR 2 DOTS
(THE MULTI-VALUE QUANTIZATION RESULT VALUE IS '2')

|   |   |   |
|---|---|---|
|   | 1 | 0 |

Ord2

Fig.16C

THE ORDER VALUE MATRIX FOR 3 DOTS
(THE MULTI-VALUE QUANTIZATION RESULT VALUE IS '3')

|   | 2 |   |
|---|---|---|
| 1 |   | 0 |

Ord3

Fig.16D

THE ORDER VALUE MATRIX FOR 4 DOTS
(THE MULTI-VALUE QUANTIZATION RESULT VALUE IS '4' TO '10')

|   | 1 |   | 2 |
|---|---|---|---|
| 3 |   | 0 |   |

Ord4

Fig.16E

THE ORDER VALUE MATRIX FOR 5 DOTS
(THE MULTI-VALUE QUANTIZATION RESULT VALUE IS '11' AND '12')

| | 1 | | 2 |
|---|---|---|---|
| 3 | | 0 | 4 |

Ord5

Fig.16F

THE ORDER VALUE MATRIX FOR 6 TO 8 DOTS
(THE MULTI-VALUE QUANTIZATION RESULT VALUE IS '13' TO '15')

| 5 | 1 | 7 | 2 |
|---|---|---|---|
| 6 | 3 | 0 | 4 |

Ord6

FIRST DETERMINATION EXAMPLE OF
THE DOT FORMATION STATE
WHEN THE CLASSIFICATION NUMBER IS '1'.

← 0 LARGE DOTS
0 MEDIUM DOTS
1 SMALL DOT

SECOND DETERMINATION EXAMPLE OF
THE DOT FORMATION STATE WHEN
THE CLASSIFICATION NUMBER IS '1'.

← 1 LARGE DOT
2 MEDIUM DOTS
1 SMALL DOT

2 MEDIUM DOTS
1 SMALL DOT

← 1 SMALL DOT

Fig.21A
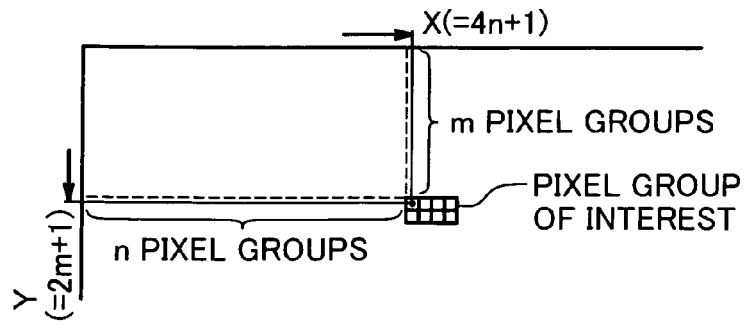
Fig.21B
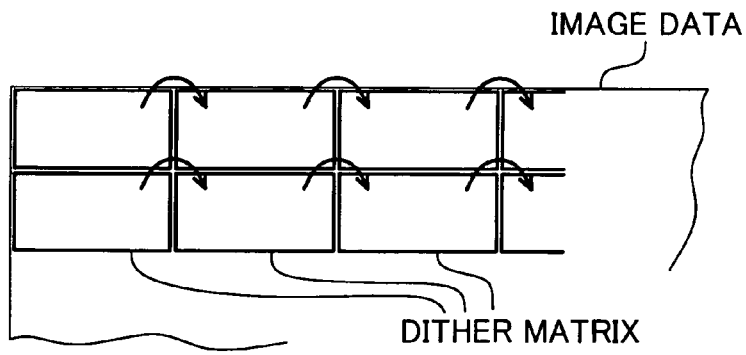
Fig.21C
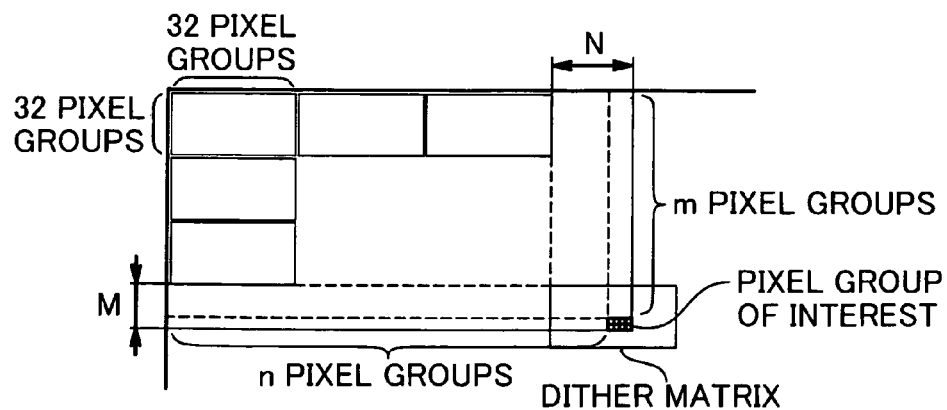
Fig.21D
$$\begin{cases} N = n - \text{int}(n/32) \times 32 + 1 \\ M = m - \text{int}(m/32) \times 32 + 1 \end{cases}$$

Fig.22

(a) X : |1|2|3|4|5|6|7|8|9|10|  ⎞ 2 BIT SHIFT
                                 ⎠ TO RIGHT (b) n : |0|0|1|2|3|4|5|6|7|8|  ⎞ 5 BIT SHIFT
                                ⎠ TO RIGHT (c) int (n/32) : |0|0|0|0|0|0|0|1|2|3|  ⎞ 5 BIT SHIFT
                                         ⎠ TO LEFT (d) int (n/32) × 32 : |0|0|1|2|3|0|0|0|0|0|

(e) n − int (n/32) × 32 : |0|0|0|0|0|4|5|6|7|8|

(f) MASK DATA |0|0|0|0|0|1|1|1|1|1|

(g) MASK DATA |0|0|0|1|1|1|1|1|0|0|

Fig.31A
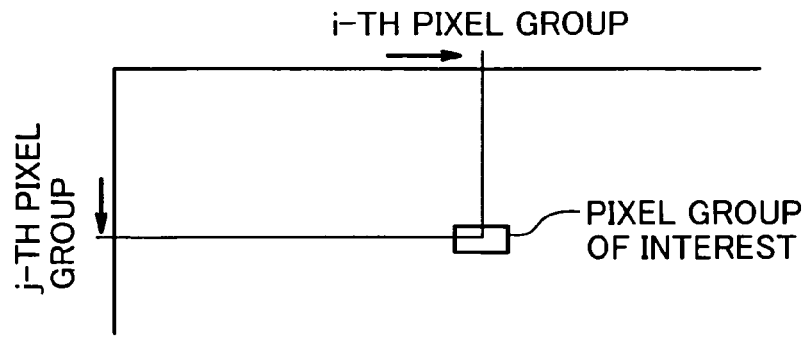
Fig.31B
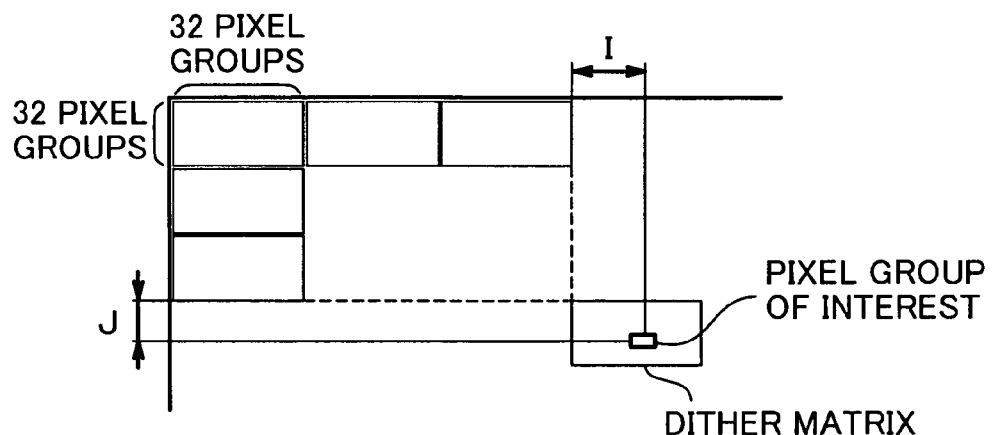
Fig.31C
$$\begin{cases} I = i - \text{int}(i/32) \times 32 + 1 \\ J = j - \text{int}(j/32) \times 32 + 1 \end{cases}$$

Fig.33A

| 170 | 99 | 231 | 43 | 196 | 120 | 21 | 212 | 94 | 172 | 8 | 157 |
| 55 | 204 | 86 | 161 | 1 | 143 | 80 | 176 | 58 | 242 | 108 | 220 |
| 254 | 152 | 27 | 110 | 185 | 40 | 228 | 64 | 192 | 25 | 153 | 77 |
| 12 | 132 | 238 | 68 | 210 | 116 | 15 | 162 | 101 | 236 | 122 | 4 |
| 178 | 91 | 193 | 47 | 141 | 246 | 84 | 216 | 129 | 31 | 180 | 91 |
| 36 | 154 | 6 | 172 | 206 | 22 | 166 | 54 | 146 | 253 | 69 | 225 |

Fig.33B

| 185 | 40  | 228 | 64  |
| --- | --- | --- | --- |
| 210 | 116 | 15  | 162 |

— LMd(Ord6)

Fig.33C

| 185 | 40  | 228 | 64  |
| --- | --- | --- | --- |
| 210 | 116 | 15  | 162 |

— LMd(Ord1)

Fig.33D

| 185 | 116 | 228 | 64  |
| --- | --- | --- | --- |
| 210 | 40  | 162 | 15  |

— LM1(Ord2)

Fig.33E

| 185 | 116 | 64  | 228 |
| --- | --- | --- | --- |
| 40  | 210 | 162 | 15  |

— LM2(Ord3)

Fig.38

| CODE DATA | INTERMEDIATE DATA | CORRESPONDING DOT COUNT | | |
|---|---|---|---|---|
| | | LARGE | MEDIUM | SMALL |
| 0 | 0000000000000000 | 0 | 0 | 0 |
| 1 | 0000000000000001 | 0 | 0 | 1 |
| 2 | 0000000000000101 | 0 | 0 | 2 |
| 3 | 0000000000010101 | 0 | 0 | 3 |
| 160 | 1010111111111111 | 6 | 2 | 0 |
| 161 | 0011111111111111 | 7 | 0 | 0 |
| 162 | 0111111111111111 | 7 | 0 | 1 |
| 163 | 1011111111111111 | 7 | 1 | 0 |
| 164 | 1111111111111111 | 8 | 0 | 0 |

Fig.41

| | | MULTI-VALUE QUANTIZATION RESULT VALUE | | | | | |
|---|---|---|---|---|---|---|---|
| | | 0 | 1 | 2 | 3 | 4 | 5 |
| CLASSIFICATION NUMBER | 1 | DD(1,0) | DD(1,1) | DD(1,2) | DD(1,3) | DD(1,4) | DD(1,5) |
| | 2 | DD(2,0) | DD(2,1) | DD(2,2) | DD(2,3) | DD(2,4) | D |
| | 3 | DD(3,0) | DD(3,1) | DD(3,2) | DD(3,3) | DD(3,4) | |
| | 4 | DD(4,0) | DD(4,1) | DD(4,2) | DD(4,3) | DD(4,4) | |
| | 5 | DD(5,0) | DD(5,1) | DD(5,2) | DD(5,3) | | |
| | 6 | DD(6,0) | DD(6,1) | DD(6,2) | | | |
| | 7 | DD | | | | | |

$DD(i, j) =$ | (1) | (2) | (3) | (4) | (5) | (6) | (7) | (8) |
 1,1 | 0,0 | 1,0 | 0,0 | 0,0 | 0,1 | 0,0 | 1,0

HIGH-IMAGE-QUALITY HALFTONE PROCESS

BACKGROUND

1. Technical Field

The present invention relates to a technique of forming dots on a printing medium to print an image.

2. Related Art

Printing devices that form dots on a printing medium to print an image have been used widely as the output device of images generated by computers and images taken with digital cameras. The printing device conventionally performs halftone process by the known dither method or the error diffusion method to specify the dot formation state on the printing medium.

However, the conventional dither method and error diffusion method have intrinsic limitations. The dither method directly controls the dot formation state by appropriate arrangement of threshold values stored in a dither matrix, but has a limitation in arrangement of the threshold values in the dither matrix due to the requirement for consideration about the whole range of expected input tone values. The optimized arrangement of threshold values in a certain range of input tone values causes a significant deviation from the optimum state in another range of input tone values. Some compromise is thus required for arrangement of the threshold values in the individual ranges of input tone values. The error diffusion method, on the other hand, disperses dots by diffusion of the arising errors and thus attains the good dispersibility of dots without such compromise. The error diffusion method, however, has disadvantages of difficulty in direct control of the dot formation state and of the severe processing load.

SUMMARY

An advantage of some aspects of the invention is thus to reduce the drawbacks of the prior art technique and to provide a technique of enhancing the picture quality in a partial range of input tone values with relaxed trade-off with the picture quality in another range of input tone values.

An image processing method according to an aspect of the invention is provided as an image processing method of processing image data indicative of an image represented with a prescribed number of input tones by each of pixel groups composed of a plurality of print pixels, and generating dot data representing a status of dot formation on each of the print pixels to be formed on a print medium. The method includes: preparing an first conversion table containing first correspondence relationships of pixel group tone values representing tone values of the pixel groups and code values assuming a prescribed range of values, the first correspondence relationships being prepared for each of the pixel groups; preparing a second conversion table containing second correspondence relationships of output dot arrangements indicative of dot states for each pixel in the pixel groups and the code values, the second correspondence relationships being prepared for each of the pixel groups; determining the pixel group tone value in response to the input tone value corresponding to the pixel group, among the image data; encoding the determined pixel group tone value into the code values for each of the pixel groups, by referring the first conversion table; decoding the acquired code value into the output dot arrangement for each of the pixel groups, by referring the second conversion table; and outputting the dot data in response to the output dot arrangement. The first correspondence relationships and the second correspondence relationships are configured to make a state of dot formation close to a predetermined characteristic over a whole range of the input tone values. Dot positions of at least part of the output dot arrangements are changed within the each pixel group to make the state of dot formation closer to the predetermined characteristic with regard to a partial range of the input tone values corresponding to each of the output dot arrangements.

The image processing method of the invention applies the specific output dot arrangement optimized for the partial range of the input tone values. The specific output dot arrangement for single size of dot is set to make the dot formation state closer to the predetermined characteristic with regard to the partial range of the input tone values only, compared with the output dot arrangement that is set with regard to the whole range of the input tone values. This arrangement desirably enhances the picture quality in the partial range of the input tone values with relaxed trade-off with the picture quality in another range of the input tone values. The step of preparing the first conversion table and the second conversion table includes the process of loading the tables into a memory for the halftone.

In the process of 'determining the pixel group tone value', the input tone value may be directly regard as the pixel group tone value, or the pixel group tone value may be generated after resolution conversion of the input image according to at least one pixel value in a pixel among multiple output pixels corresponding to each input pixel. The former procedure is advantageously free from the additional loading of the resolution conversion and the potential quality deterioration due to the resolution conversion. The advantage of the latter procedure is to enable printing in any arbitrary size.

The 'generating dot data' in claim set is not restricted to the procedure of specifying the dot arrangement according to the order value matrix (including the specific order value matrix) in response to each input of the encoded data, but includes a procedure of utilizing a correlation map set in advance according to the order value matrix to specify the dot arrangement as described later in Variation Example 8.

An printing method according to an aspect of the invention is provided as a printing method of printing on a printing medium in response to image data indicative of an image represented with a prescribed number of input tones, the printing method includes: generating dot data representing a status of dot formation on each of print pixels of a print image to be formed on a print medium, by performing a halftone process on the image data with a preset dither matrix; and forming a dot on the each print pixel to generate the print image in response to the dot data. The preset dither matrix is structured to include a plurality of local matrixes as multiple cell blocks, each cell of the cell block storing a threshold value. Storage positions of the threshold values in the preset dither matrix being determined to make the state of dot formation close to a predetermined characteristic over a whole range of the input tone values. Storage positions of the threshold values in at least part of the cell blocks being changed within the each cell block to make the state of dot formation closer to the predetermined characteristic with regard to a partial range of the input tone values.

The preset dither matrix may include multiple different dither matrixes optimized in individual ranges. For example, when the input tone value varies from 0 to 255, each range may have a predetermined width of input tone values, such as 0 to 7 or 8 to 15, or may be equivalent to each input tone value. The storage positions of the threshold values may be changed in only a specific range having a high potential of halftone-induced picture quality deterioration, that is, in a range of low dot density.

The dither matrix of the present invention may not include multiple different dither matrixes. The requirement for the dither matrix is the changeable storage positions of threshold values in each local matrix applied to each pixel group, in order to make the dot formation state closer to the predetermined characteristic with regard to the partial range of the input tone values.

The terminology 'halftone process on the image data with a preset dither matrix' in claims is used in a wide sense and includes a procedure of generating dot data according to data (for example, a count data conversion table shown in FIG. 12) based on the preset dither matrix or according to an order value matrix conversion table (FIG. 14) based on the preset dither matrix.

In the embodiment and its variation examples described below, the count data conversion table and the order value matrix conversion table are provided by comparison between the threshold value set in the dither matrix and the tone value of image data with regard to each pixel. One possible modification may compare the sum of the threshold value and the tone value with regard to each pixel with a fixed value to determine the dot on-off state in the pixel and provide the respective tables (see FIGS. 12 and 14).

The technique of the invention is actualized by any of diverse applications including a dither matrix, a dither matrix preparation apparatus, a printing apparatus with a dither matrix and a corresponding printing method, a corresponding method of preparing a printed matter, as well as computer programs for causing the computer to attain the functions of these methods and the apparatuses, recording media in which such computer programs are recorded, and data signals that include such computer programs and are embodied in carrier waves.

BRIEF DESCRIPTION OF THE DRAWINGS

FIG. 12 is an illustration depicting conceptually a conversion table referred during the dot count determination in accordance with combinations of the classification number and the Multi-value Quantization Result value of the Embodiment.

FIG. 13 is an illustration depicting correspondence relations between coded count value and the count of each dot type represented by code value.

FIG. 14 shows a position number acquisition table used for acquiring a position number to provide the order value matrix.

FIGS. 16A to 16F show order value matrixes with the classification number '1'.

FIGS. 21A to 21D are illustrations depicting a method for calculating classification numbers of pixel groups.

FIG. 22 is an illustration depicting a method for calculating classification numbers from binary representation of the coordinates of a pixel group of interest.

FIGS. 31A to 31C are illustrations depicting a method for determining classification number from pixel group location in an image.

FIGS. 33A to 33E show the change of the storage positions of threshold values in a local matrix according to the pixel group tone value.

FIG. 38 is an illustration depicting an correspondence relationship table in which intermediate data is associated with code value representing dot counts.

FIG. 41 conceptually shows a conversion table referred to in the dot on-off state determination process in Variation Example 8.

DESCRIPTION OF EXEMPLARY EMBODIMENT

Figure 1:
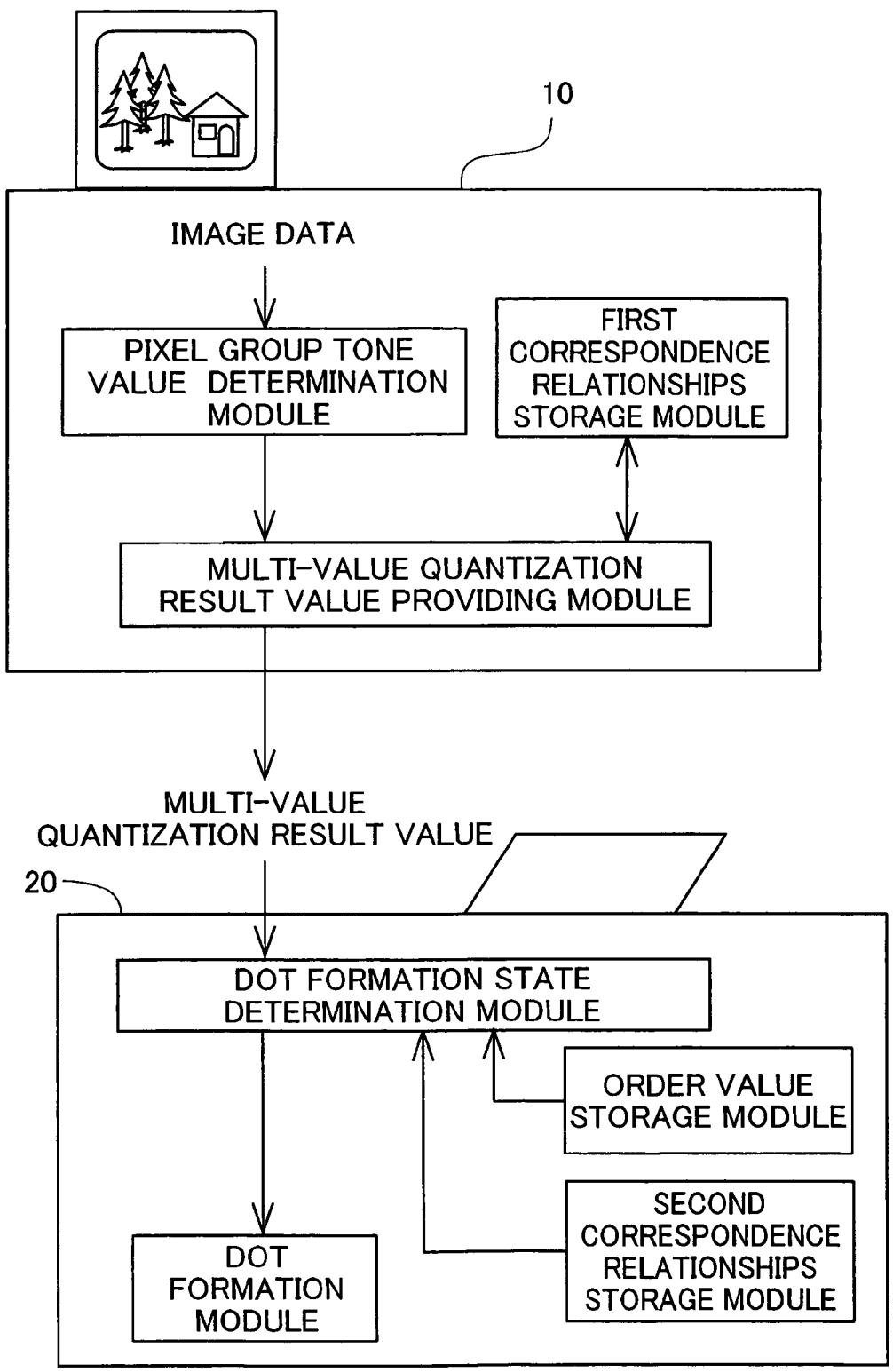
FIG. 1 is an illustration providing an overview of the invention, taking the example of a printing system.

In order to elucidate the functions and the effects of the invention, one mode of carrying out the invention is described below in the following sequence as a preferred embodiment with reference to the accompanied drawings:
A. Outline of Embodiment:
B. Device Arrangement example:
C. Overview of Image Printing Process in Embodiment of Invention:
   C-1. Overview of Multi-value Quantization Result Value Generation Process:
   C-2. Overview of Dot On/Off State Determination Process:
   C-3. Overview of Dither Method:
   C-4. Conceptual Approach of Determining Classification Number:
   C-5. Multi-value Quantization Table Setup Method:
   C-6. Conversion Table Setup Method:
   C-7. Order Value Matrix Setup Method:
   C-8: Basic Principle Enabling Appropriate Determination of Dot On/Off State from Multi-value Quantization Result values:
   C-9. Method of Determining Classification Number from Pixel Group Location:
D. Variation Examples
   D-1. Variation Example 1
   D-2. Variation Example 2
   D-3. Variation Example 3
   D-4. Variation Example 4
   D-5. Variation Example 5
   D-6. Variation Example 6
   D-7. Variation Example 7
   D-8. Variation Example 8
A. Outline of Embodiment:

FIG. 1 schematically illustrates the configuration of a printing system to explain the overview of the invention. The printing system includes a computer 10 working as an image processing apparatus and a printer 20 working as an image output device. The computer 10 loads and executes a predetermined program to function, in cooperation with the printer 20, as an integrated image output system. The printer 20 forms dots on a printing medium to print an image. The computer 10 performs a preset series of image processing on image data of an object image for printing to generate control data for controlling dot formation in respective pixels by the printer 20 and supplies the generated control data to the printer 20.

The general printing system adopts the following procedure to print images. The computer performs a preset series of image processing to convert image data into dot state data representing the dot on-off state in each printing pixel (or each output pixel) and supplies the dot state data to the printer. The printer forms dots according to the received dot state data to print an image. An increase in number of pixels included in an object image to be printed extends the time required for image processing and thereby interferes with high-speed image printing. The large number of pixels increases the volume of the dot state data representing the dot on-off state in each pixel and extends the time required for data output from the computer to the printer. This undesirably increases the total printing time.

The printing system of FIG. 1 adopts this principle to print an image. The computer 10 performs multi-value quantization to give a Multi-value Quantization Result value, with a view to expressing an input tone value of each input pixel included in a 256-tone image in about 200 dpi by a pixel group of 8 pixels having 4 tones in 1440 dpi×720 dpi. The Multi-value Quantization Result value is supplied from the computer 10 to the printer 20 (see FIG. 1). The Multi-value Quantization Result value supplied to the printer 20 is processed by a dot on-off state determination module to be converted to dot state data representing the dot on-off state in respective pixels included in the pixel group. A dot formation module forms dots on a printing medium to print an image according to the dot state data representing the dot on-off state determined for the respective pixels.

The printer 20 receives the code value of each pixel group and generates dot state data (arrangement of dots in output pixel group) representing the dot on-off state in respective pixels of the pixel group. The dot on-off state determination module refers to a second correlation map to determine the dot on-off state. The dot formation module then forms dots to print an image according to the determination result of the dot on-off state.

The code value of each pixel group has a significantly smaller data volume than the dot state data representing the dot on-off state in each pixel. The supply of the code value of each pixel group, instead of the dot state data representing the dot on-off state in each pixel, ensures the extremely high-speed data transfer from the computer 10 to the printer 20.

The computer 10 may perform the encoding process. In this case, the computer 10 supplies the code value, instead of the Multi-value Quantization Result value, to the printer 20. The code value in claims is equivalent to the Multi-value Quantization Result value in this embodiment.

As mentioned previously, the 'Multi-value Quantization Result value generation process' may directly generate the Multi-value Quantization Result value from the input tone value of each input pixel or may generate the Multi-value Quantization Result value, after resolution conversion of the input image, according to at least one pixel value in a pixel among multiple output pixels corresponding to each input pixel. The former procedure is advantageously free from the additional loading of the resolution conversion and the potential quality deterioration due to the resolution conversion. The advantage of the latter procedure is to enable printing in any arbitrary size.

The inventors of the present application have noted the configuration that enables not only simple enhancement of the printing process speed but the novel half toning process beyond the limitations of the conventional dither method and error diffusion method without applying an extreme processing load on the printing apparatus.

The conventional dither method and error diffusion method have intrinsic limitations. The dither method directly controls the dot formation state by appropriate arrangement of threshold values stored in a dither matrix, but has a limitation in arrangement of the threshold values in the dither matrix due to the requirement for consideration about the whole range of expected input tone values. The optimized arrangement of threshold values in a certain range of input tone values causes a significant deviation from the optimum state in another range of input tone values. Some compromise is thus required for arrangement of the threshold values in the individual ranges of input tone values. The error diffusion method, on the other hand, disperses dots by diffusion of the arising errors and thus attains the good dispersibility of dots without such compromise. The error diffusion method, however, has disadvantages of difficulty in direct control of the dot formation state and of the severe processing load.

The halftone technique beyond such limitations is actualized as described below to freely control the dot formation state according to each dot count in each pixel group.

Figure 2:
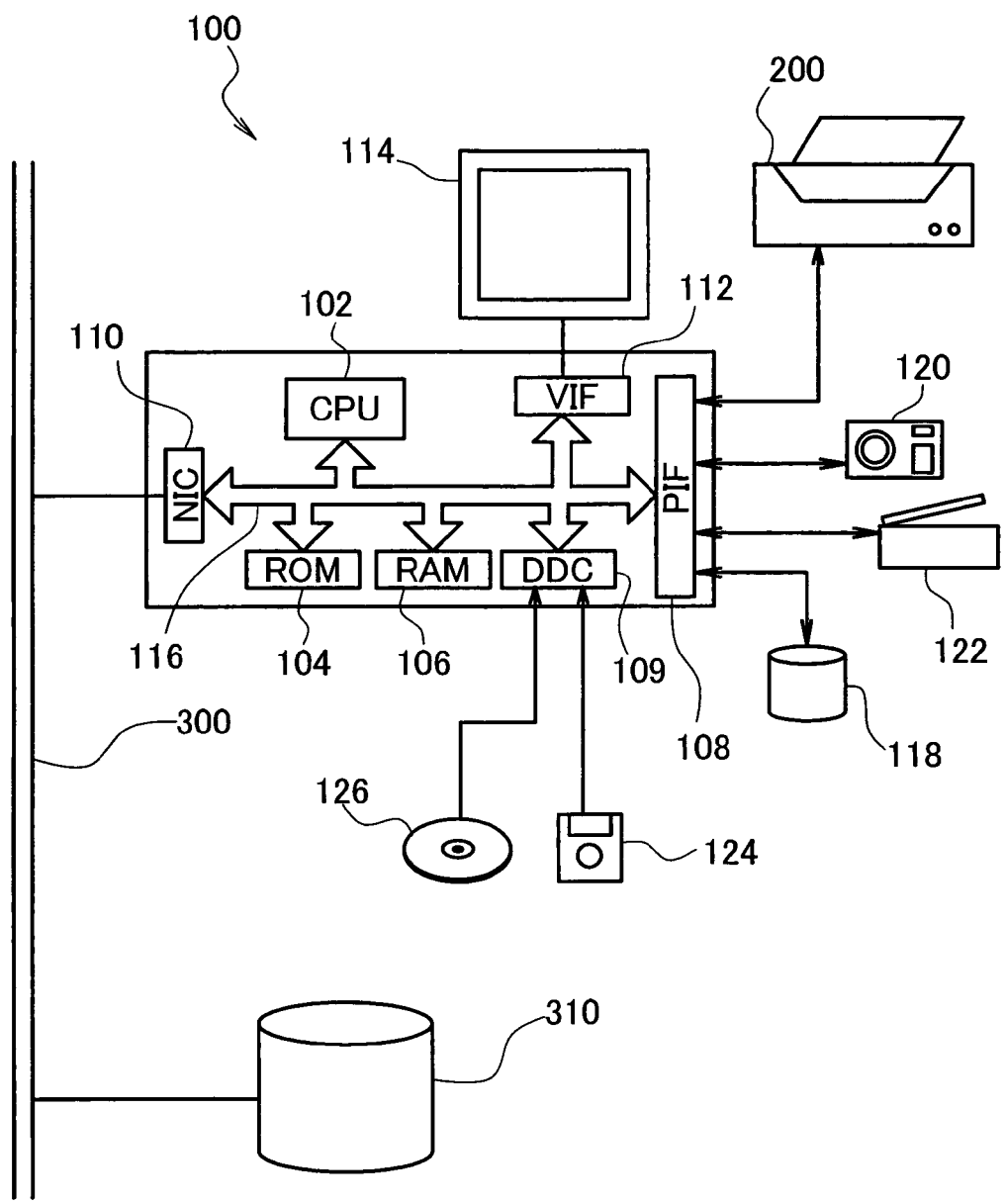
FIG. 2 is an illustration showing the arrangement of a computer as the image processing apparatus in the embodiments.

B. Device Arrangement Example:

FIG. 2 is an illustration showing the arrangement of a computer as the image processing apparatus in the embodiments. The computer 100 is a computer of commonly known type based on a CPU 102, and including a ROM 104, RAM 106 and so on interconnected via a bus 116.

To the computer 100 are connected a disk controller DDC 109 for reading data from a flexible disk 124, a compact disk 126 or the like; a peripheral interface PIF 108 for exchange of information with peripheral devices; and a video interface VIF 112 for driving a CRT 114. To the PIF 108 in turn are connected a color printer 200 (described later), a hard disk 118, and so on. Where a digital camera 120, a color scanner 122 or the like is connected to the PIF 108, it would be possible to print an image acquired from the digital camera 120 or color scanner 122. Also, by installing a network interface card NIC 110, the computer 100 could be connected to a communications circuit 300, enabling acquisition of data stored on a storage device 310 connected to the communications circuit.

Figure 3:
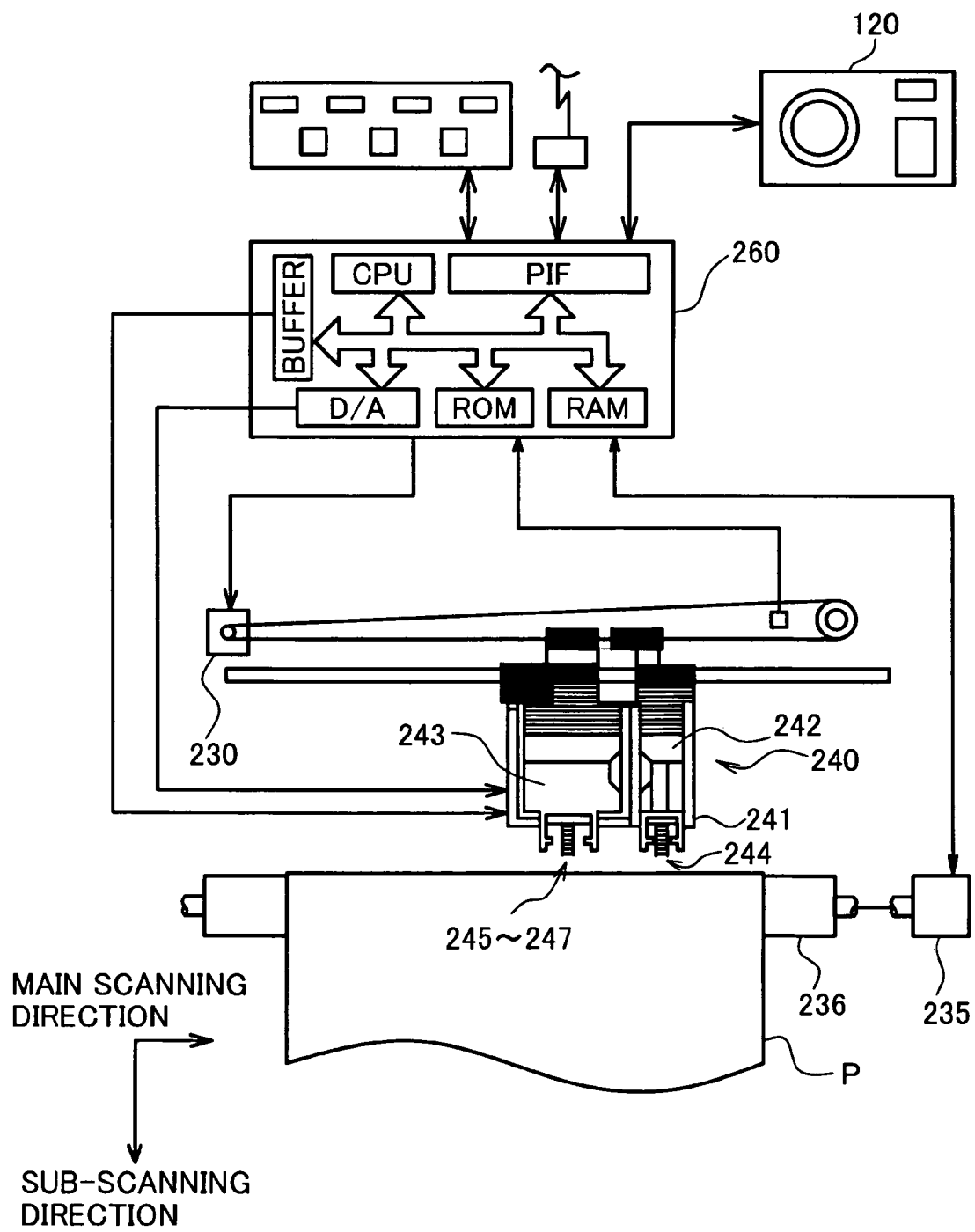
FIG. 3 is an illustration showing a simplified arrangement of the color printer of the embodiments.

FIG. 3 is an illustration showing a simplified arrangement of the color printer of the embodiments. The color printer 200 is an ink-jet printer capable of forming dots with four colors of ink, namely, cyan, magenta, yellow, and black. Of course, it would also be possible to use an ink-jet printer capable of forming dots with a total of six colors of ink including, in addition to these four colors, dye or pigment low density cyan (light cyan) ink, and dye or pigment low density magenta (light magenta) ink. Herein below, in certain instances cyan ink, magenta ink, yellow ink, black ink, light cyan ink, and light magenta ink shall be denoted as C ink, M ink, Y ink, K ink, LC ink, and LM ink, respectively.

As shown in the drawing, the color printer 200 is composed of a mechanism for driving a print head 241 that is installed on a carriage 240, to perform ink ejection and dot formation; a mechanism for reciprocating this carriage 240 in the axial direction of a platen 236 by means of a carriage motor 230; a mechanism for feeding printing paper P by means of a paper feed motor 235; and a control circuit 260 for controlling dot formation, the movement of the carriage 240, and feed of the printing paper.

On the carriage 240 are installed an ink cartridge 242 containing K ink, and an ink cartridge 243 containing C ink, M ink, and Y ink. With the ink cartridges 242, 243 installed on the carriage 240, each ink inside the cartridges is supplied through an inlet line (not shown) to the ink ejection head 244 to 247 of each color, these being disposed on the lower face of the print head 241.

Figure 4:
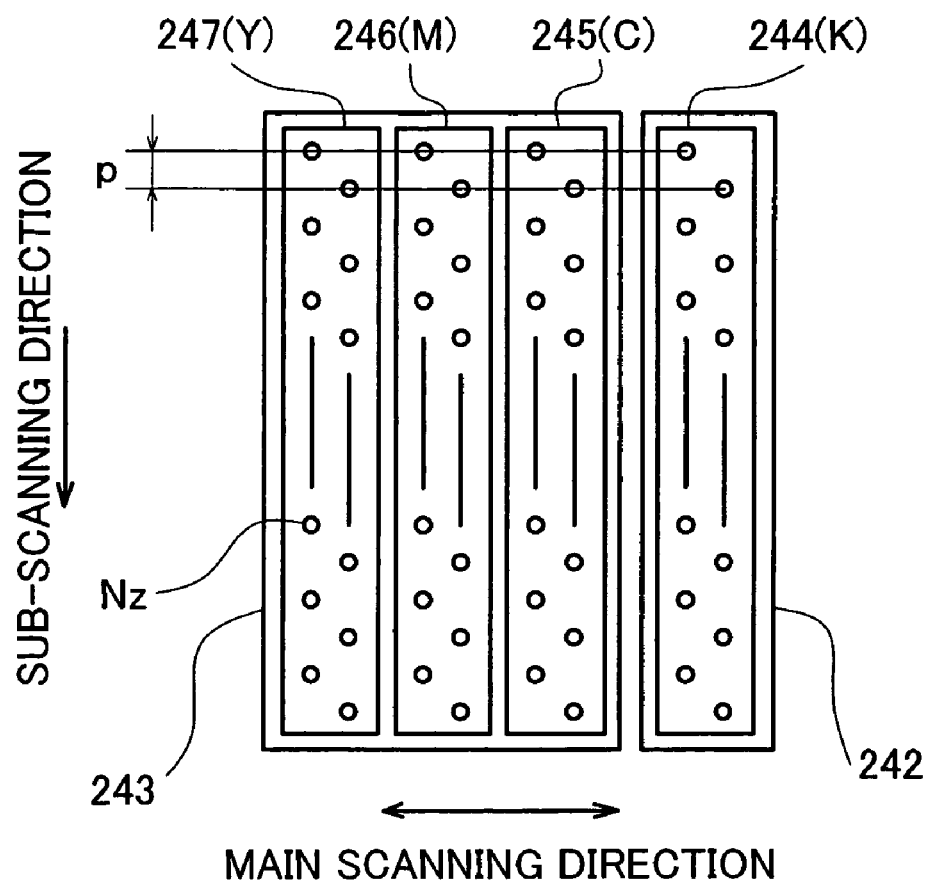
FIG. 4 is an illustration showing an arrangement of ink jet nozzles on the ink ejection heads.

FIG. 4 is an illustration showing an arrangement of ink jet nozzles on the ink ejection heads 244 to 247. As illustrated, four sets of nozzle rows for ejecting ink of the colors C, M, Y, K are formed on the lower face of the ink eject heads, with each nozzle row set containing eight nozzles Nz, arranged at a given nozzle pitch p.

The control circuit 260 is composed of a CPU, ROM, RAM, PIF (peripheral interface) and so, interconnected by bus. The control circuit 260, by means of controlling the operation of the carriage motor 230 and the paper feed motor 235, controls main scanning and sub-scanning operation of the carriage 240, as well as ejecting ink drops at appropriate timing from each nozzle on the basis of the print data supplied by the computer 100. In this way, the color printer 200 can print a color image by forming dots of each ink color at appropriate locations on the printing medium under control by the control circuit 260.

In the color printer 200 of the present embodiment, it is possible to control ink dot size by means of controlling the size of the ejected ink drops. The method for forming ink dots of different size with the color printer 200 will be described herein below, but in preparation therefor, the internal structure of the nozzles for ejecting each color of ink shall be described first.

Figure 5A:
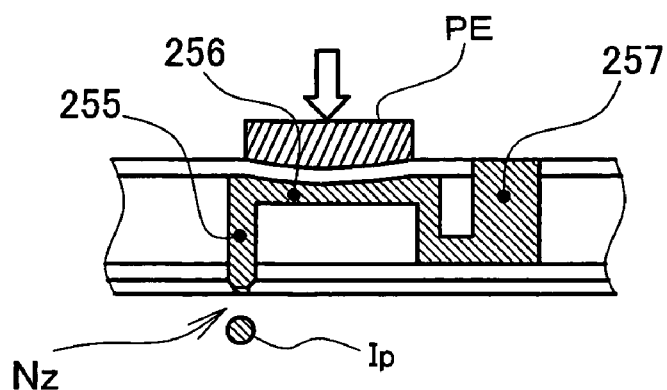
FIGS. 5A and 5B are illustrations showing the basic principle of forming dots of different size through control of ink drop ejection.

FIG. 5A is an illustration depicting the internal structure of a nozzle for ejecting ink. The ink ejection heads 244 to 247 for the various colors are each furnished with a plurality of such nozzles. As illustrated, each nozzle is furnished with an ink passage 255, an ink chamber 256, and a piezo element PE over the ink chamber. When the ink cartridges 242, 243 are installed on the carriage 240, the ink inside the cartridge is supplied to the ink chamber 256 via an ink gallery 257. The piezo element PE is an element of commonly known type, whose in crystal structure deforms when voltage is applied, converting electricity to mechanical energy extremely rapidly thereby. In the present embodiment, by applying voltage of prescribed waveform across electrodes disposed at both ends of the piezo element PE, the side wall of the ink chamber 256 is caused to deform. As a result, the ink chamber 256 contracts in volume, and an ink drop Ip equivalent to the decline in volume is ejected from the nozzle Nz. This ink drop Ip, by penetrating into the printing paper P held on the platen 236, forms an ink dot on the printing paper.

Figure 5B:
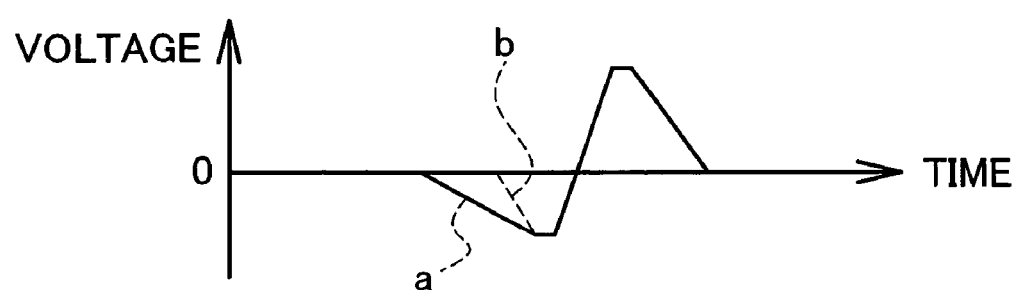

FIG. 53 is an illustration showing the basic principle of varying the size of the ink drop by controlling the voltage waveform applied to the piezo element PE. In order to eject an ink drop Ip from the nozzle, negative voltage is applied to the piezo element PE to initially draw ink into the ink chamber 256 from the ink gallery 257, and then positive voltage is applied to the piezo element PE, causing the ink chamber to contract in volume so that an ink drop Ip is ejected. Here, if ink is drawn in at proper rate, ink will be drawn in by an amount equivalent to the change in volume of the ink chamber, but if drawn at too fast a rate, passage resistance between the ink gallery 257 and the ink chamber 256 will result in the ink inflowing too late from the ink gallery 257. As a result, ink in the ink passage 255 will backflow into the ink chamber, and the ink boundary in proximity to the nozzle will retract appreciably. The voltage waveform a indicated by the solid line in FIG. 5b depicts a waveform for drawing in ink at proper rate, while the waveform b indicated by the broken line indicates an example of a waveform at which ink will be drawn in at a rate greater than the proper rate.

With the ink chamber 256 interior supplied with enough ink, application of positive voltage to the piezo element PE will eject from the nozzle Nz an ink drop Ip of volume equivalent to the reduction in volume of the ink chamber 256. If on the other hand, positive voltage is applied under conditions of inadequate ink supply and appreciable retraction of the ink boundary, the ejected ink drop will be a small ink drop. In this way, in the printer 200 of the present embodiment, the size of the ejected ink drop can be controlled by varying the rate at which ink is drawn in by means of controlling the negative voltage waveform applied prior to the ink drop being ejected, making it possible to form three types of ink dots, namely, a large dot, a medium dot, and a small dot.

Of course, dot types are not limited to three, and it would be possible to form more types of dots as well. Further, the size of ink dots formed on the printing paper could also be controlled by employing a method of ejecting multiple very fine ink drops all at one time, while controlling the number of ink drops ejected. As long as ink dot size can be controlled in this way, it is possible to print images of higher picture quality, by selectively using ink dots of different size depending on the area of the image being printed.

Any of various methods can be employed as the method for ejecting ink drops from the ink ejection heads of each color. Specifically, a format in which piezo elements are used for ink ejection, or a method in which bubbles are generated in the ink passages by means of heaters disposed in the ink passages in order to eject ink could be used. It would also be possible to employ a printer of a format wherein instead of ejecting drops of ink, ink dots are formed on the printing paper utilizing a phenomenon such as thermal transfer; or a format in which electrostatic charge is utilized to deposit toner of each color onto a printing medium.

In the color printer 200 having a hardware arrangement such as that described above, by means of driving the carriage motor 230, the ink ejection heads 244-247 of each color are moved in the main scanning direction with respect to printing paper P, while by means of driving the paper feed motor 235 the printing paper P is moved in the sub-scanning direction. The control circuit 260, in sync with the movement of the carriage 240 in the main scanning direction and the sub-scanning direction, drives the nozzles at appropriate timing to eject ink drops whereby the color printer 200 prints a color image on the printing paper.

Since the color printer 200 is also furnished with CPU, RAM, ROM and the like installed in the control circuit, it would be possible for the processes carried out by the computer 100 to be performed in the color printer 200 instead. In this case, image data for an image shot with a digital camera or the like could be supplied directly to the color printer 200, and the necessary image processing carried out in the control circuit 260, making it possible for the image to be printed out directly from the color printer 200.

Figure 6:
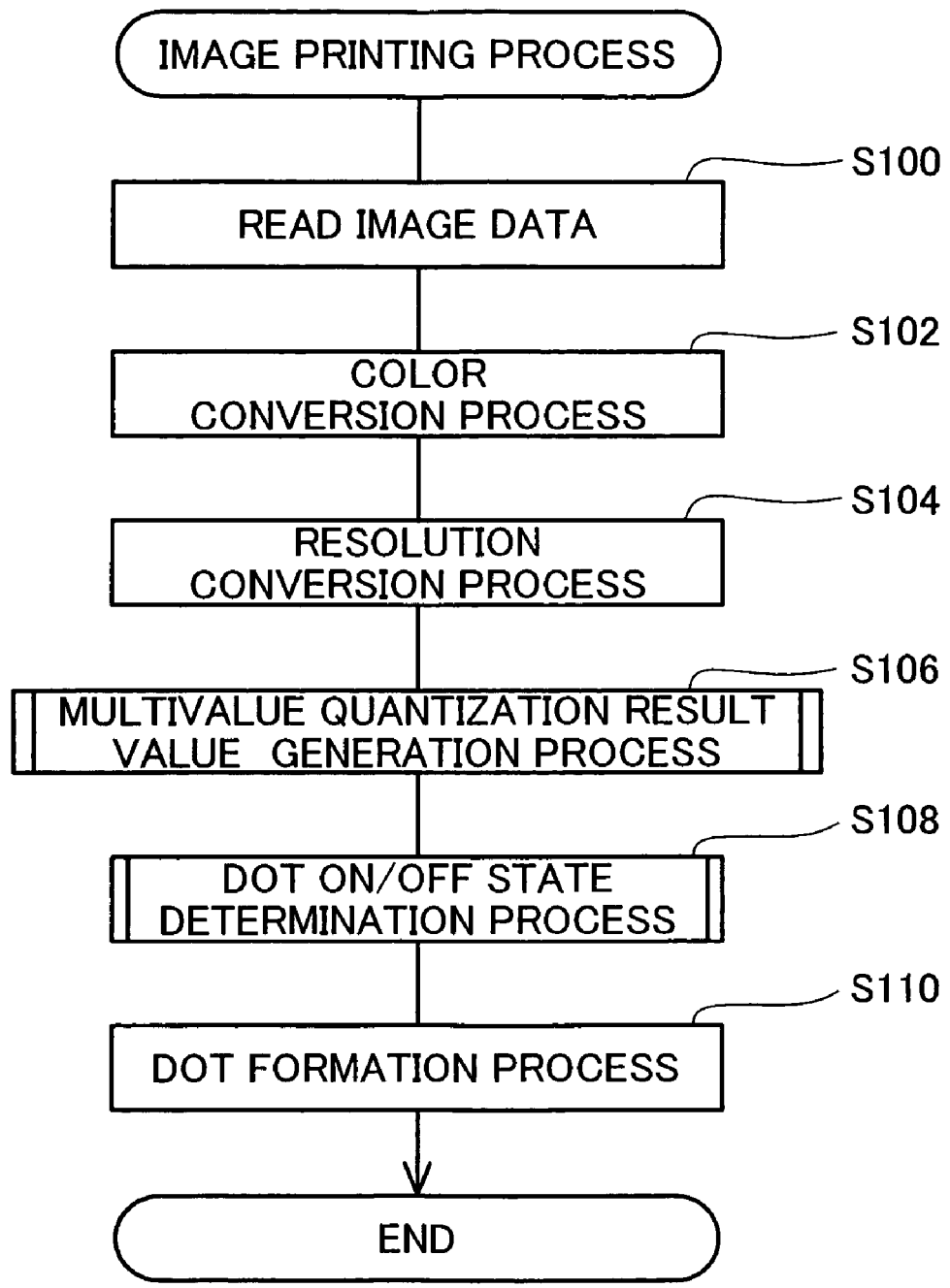
FIG. 6 is a flowchart depicting the overall flow of an image printing process in the Embodiment.

C. Overview of Image Printing Process of the Embodiment:

FIG. 6 is a flowchart depicting the overall flow of the image printing process in the Embodiment. As illustrated, prior to initiating the image printing process, the computer 100 first initiates reading of the image data (Step S100). Here, while the image data is described as being RGB color image data, it is not limited to color image data; application would be similar for monochrome image data. Nor is application limited to a color printer; application would be similar for a monochrome printer.

After the color image data is read, a color conversion process is performed (Step S102). The color conversion process is a process for converting RGB color image data represented by combinations of R, G, B tone values to image data represented by combinations of tone values of the ink colors used for printing. As noted, the color printer 200 prints images using ink of the four colors C, M, Y, K. Thus, in the color conversion process, image data represented by the colors RGB is converted to data represented by tone values of the colors C, M, Y, K. The color conversion process is carried out with reference to a three-dimensional numerical table termed a color conversion table (LUT). In the LUT, tone values for the colors C, M, Y, K derived by color conversion of RGB color data have been stored in advance. In the process of Step S102, by means of referring to this table, it is possible for the RGB color data to undergo rapid color conversion to image data of the colors C, M, Y, K.

When the color conversion process has been completed, a resolution conversion process is carried out (Step S104). The resolution conversion process is a process for converting the resolution of the image data to the resolution at which the image will be printed by the printer 200 (print resolution). Where the resolution of the image data is lower than the print resolution, interpolation is performed to create new image data between existing pixels, while conversely where the resolution of the image data is higher than the print resolution, a process to thin out the data at a prescribed rate until the image data resolution and the print resolution match is carried out.

Once the resolution has been converted to the print resolution in the above manner, the computer 100 initiates a Multi-value Quantization Result value generation process (Step S106). The details of Multi-value Quantization Result value generation process shall be described exhaustively later; for the time being, only an overview shall be provided. In the Multi-value Quantization Result value generation process, neighboring pixels are grouped in prescribed number into pixel groups, whereby a single image is divided into a plurality of pixel groups. The number of pixels grouped into the pixel groups need not always be the same for all pixel groups, it being possible for the multiple pixel count to vary systematically, or for the number of pixels grouped into pixel groups to vary according to location in the image; here, for convenience in description, the simplest case, i.e. one where all pixel groups have the same number of pixels, shall be described. Once the plurality of pixels have been grouped into pixel groups, and pixel group tone values which are tone values representing each pixel group have been derived, multi-value quantization of the pixel group tone values is carried out. As a result pixel group tone values are converted on a pixel group-by-group basis to Multi-value Quantization Result values.

In the Multi-value Quantization Result value generation process of the present embodiment, the number of states that can be assumed as a result of multi-value quantization differs on a pixel group-by-group basis. Specifically, whereas in multi-value quantization as it is typically carried out, there is no switching between binary conversion and trinary conversion within a single image for example, in the Multi-value Quantization Result value generation process of the present embodiment, the number of steps of multi-value quantization differs on a pixel group-by-group basis. The result values derived by this multi-value quantization of pixel group tone values in several numbers of steps on a pixel group-by-group basis are output to the color printer 200. Where pixel group tone values undergo multi-value quantization in a unique number of levels on a pixel group-by-group basis in this way, and the results derived thereby are output, the amount of data needing to be output to the color printer 200 can be reduced to a considerable extent.

When the CPU within the control circuit 260 of the color printer 200 receives Multi-value Quantization Result value data provided to it on a pixel group-by-group basis, it initiates a dot on/off state determination process (Step S108). As noted previously, Multi-value Quantization Result values are values derived by multi-value quantization of pixel group tone values; they are not values indicating on which pixels dots should be formed in a pixel group. One known method for determining pixel locations for forming dots from pixel group Multi-value Quantization Result values is termed the density pattern method; however, since the Multi-value Quantization Result values of the present embodiment undergo multi-value quantization in a unique number of levels on a pixel group-by-group basis, the density pattern method cannot be used as-is. Accordingly, in the dot on/off state determination process of the Embodiment, pixel locations for forming dots are determined from Multi-value Quantization Result values derived on a pixel group-by-group basis, by means of employing a special method which shall be described later.

In the density pattern method, actual resolution drops to the resolution of the pixel groups that have undergone multi-value quantization, and there is a tendency for picture quality to deteriorate. With the dot on/off state determination method of the Embodiment, on the other hand, picture quality is not degraded in a manner dependent on pixel group size, as will be discussed later. Additionally, it becomes possible to print images of high picture quality with good dispersion of dots, such as can be achieved through the use of a dither matrix known as a blue noise mask or green noise mask. The specifics of the dot on/off state determination method of the Embodiment, and the reasons why such characteristics are obtained by means of determining dot on/off state by applying this method, shall be discussed in detail later.

Once pixel locations for forming dots have been determined in this way, a process to form dots at the pixel locations so determined is carried out (Step S110). Specifically, as described with reference to FIG. 3, ink dots are formed on the printing paper by means of driving the ink ejection heads and ejecting ink drops while reciprocating the carriage in the main scanning direction and the sub-scanning direction. By forming dots in this manner, an image corresponding to the image data is printed.

Figure 7:
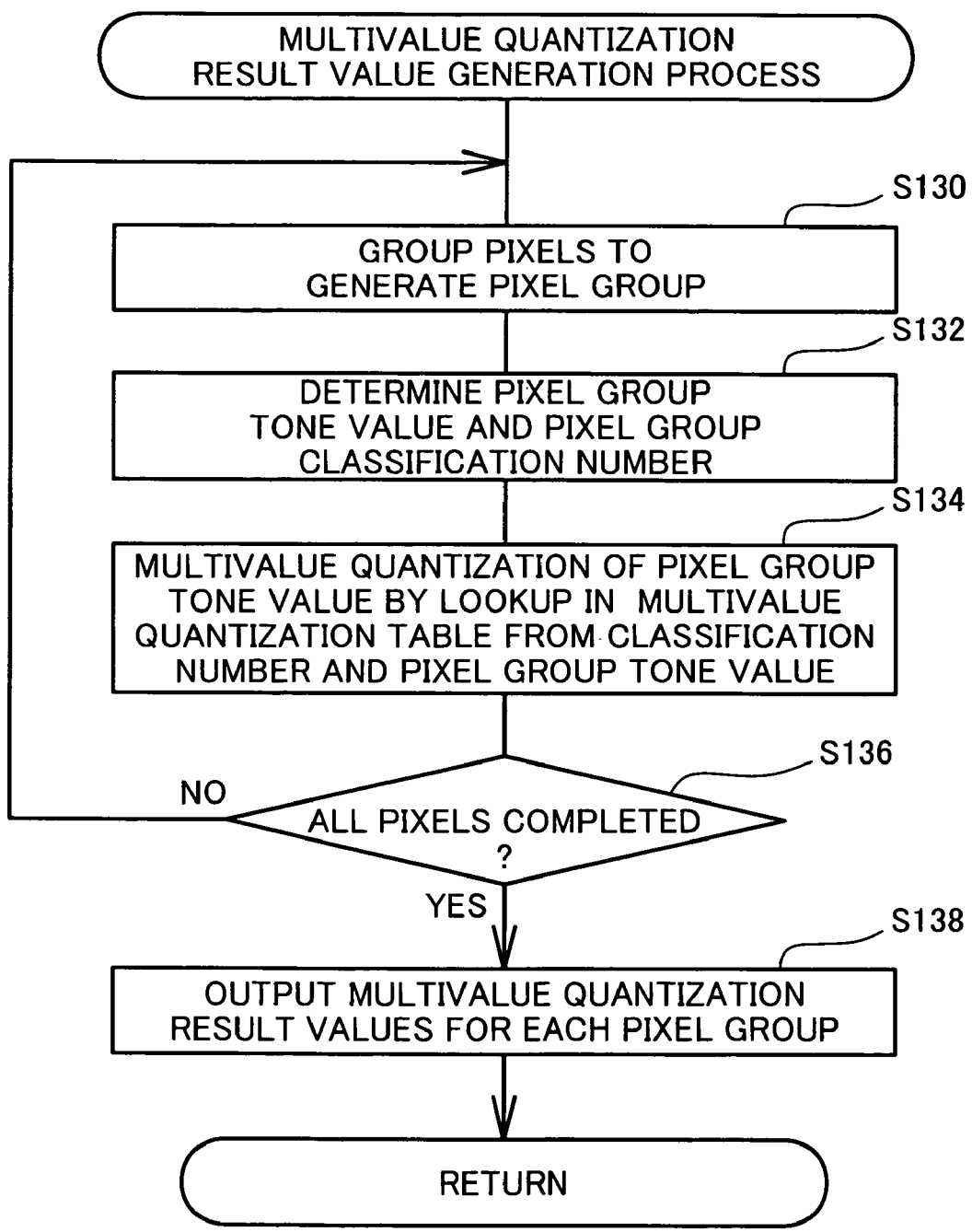
FIG. 7 is a flowchart depicting the flow of a Multi-value Quantization Result value generation process carried out in the image printing process in the Embodiment.

C-1. Overview of Multi-Value Quantization Result Value Generation Process:

FIG. 7 is a flowchart depicting the flow of a Multi-value Quantization Result value generation process carried out in the image printing process in the Embodiment. Here, while the Multi-value Quantization Result value generation process is described as being carried out with the computer 100, as will be described later the Multi-value Quantization Result value generation process can be made an extremely simple process, so it would be possible to carry out the process in the color printer 200 or the digital camera 120. The description herein below follows the flowchart.

When the Multi-value Quantization Result value generation process of the present embodiment is initiated, first, neighboring pixels are grouped in prescribed number to form pixel groups (Step S130). Here, a total of eight pixels, namely the equivalent of four pixels in the main scanning direction and the equivalent of two pixels in the sub-scanning direction, are grouped together into pixel groups. The pixels making up pixel groups need not be pixels lined up at locations on the vertical and horizontal of quadrangular shapes; pixel groups may be composed of any pixels as long as the pixels are neighboring and like in a prescribed positional relationship.

Next, pixel group tone values and pixel group classification numbers are determined (Step S132). Pixel group tone values are values that represent pixel groups, and can be determined easily in the following manner. For example, an average value of the image data assigned to each pixel in a pixel group can be derived and used as the pixel group tone value. Alternatively, it is possible for the image data assigned to the most pixels in a pixel group, or the image data of a pixel at a specific location within a pixel group, to be used as the pixel group tone value.

Figure 8A:
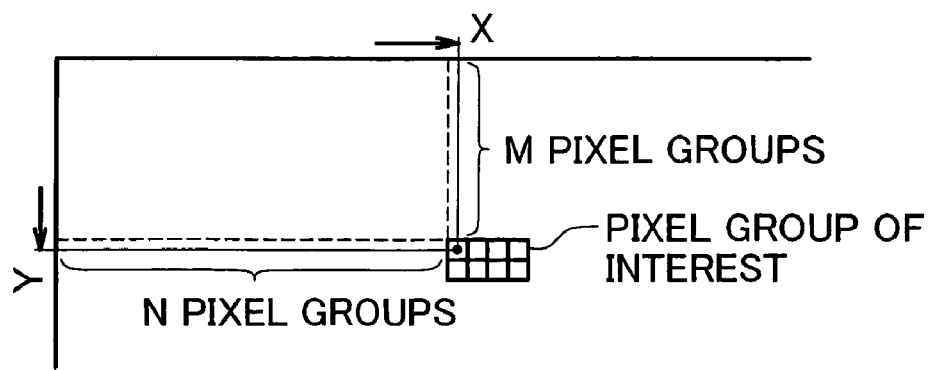
FIGS. 8A and 8B are illustrations showing a method of determining classification numbers of pixel groups.

Next, pixel group classification numbers can be determined easily in the following manner, for example. FIG. 8 illustrates a method of determining pixel group classification numbers. FIG. 8A shows a single pixel group created by grouping together eight pixels in an image. The method of determining a classification number for this pixel group shall be described below. As shown in FIG. 8A, the pixel group selected for the purpose of determining a classification number is termed the pixel group of interest.

Figure 8B:
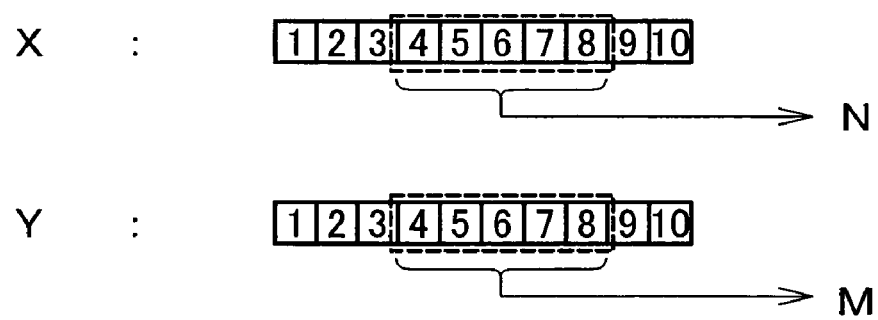

Taking the uppermost left corner of the image as the origin, a pixel location is expressed in terms of pixel count in the main scanning direction and the sub-scanning direction from the origin. Pixel group location is expressed in terms of the pixel location of the pixel in the upper left corner of the pixel group. In FIG. 8a, a black dot is shown on the pixel representing the location of the pixel group of interest. Let it be assumed that the pixel location of this pixel is (X, Y). The classification number of the pixel group of interest can be determined very easily by means of representing X, Y as a binary number and storing this on a prescribed number of bits which can then be simply read out. For example, let it be assumed that, as shown in FIG. 8b, X and Y representing the location of a pixel group of interest each consist of 10-bit data. Let the value derived by reading the fourth to eighth bit after the lead bit of X be designated as N, and the value derived by reading the fourth to eighth bit after the lead bit of Y be designated as M. In the present embodiment, by calculating the expression:

$$N+(M-1)\times 32 \tag{1}$$

a classification number for the pixel group can be determined easily. The reason why it is possible to determined pixel group classification numbers in this way shall be described later.

Figure 9:
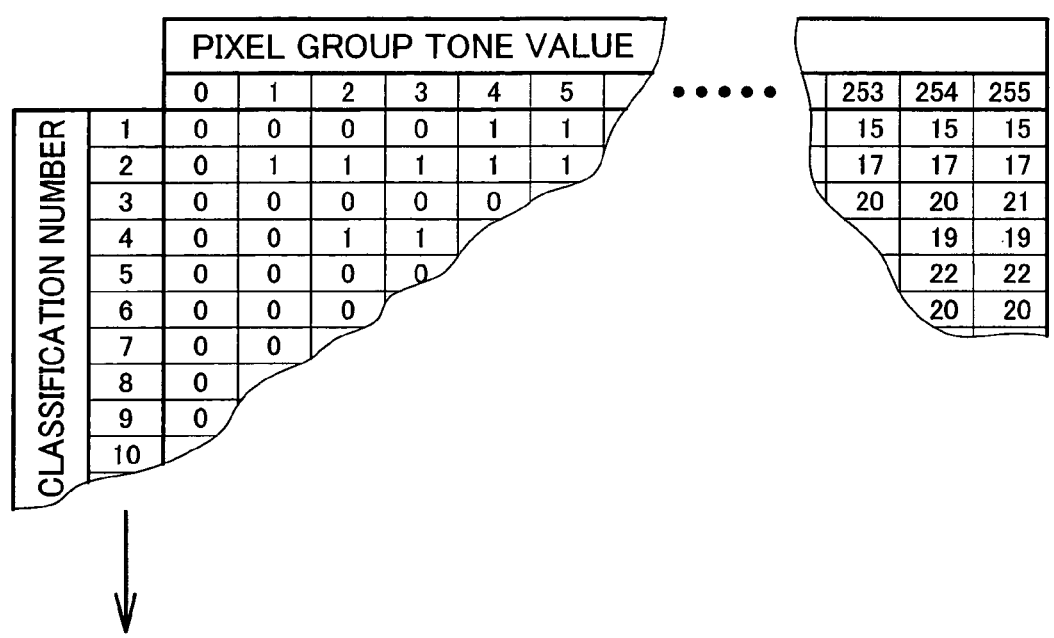
FIG. 9 is an illustration depicting conceptually a multi-value quantization table referred to in the Multi-value Quantization Result value generation process of the Embodiment.

Once pixel groups classification numbers and pixel group tone values have been determined in this way, the pixel group tone values undergo multi-value quantization by means of referring to a multi-value quantization table, described later (Step S134). FIG. 9 is an illustration depicting conceptually a multi-value quantization table referred to during multi-value quantization. As illustrated, the multi-value quantization table stores Multi-value Quantization Result values associated with pixel group tone values, for each pixel group classification number; Multi-value Quantization Result values increase in stepwise fashion in correspondence relationship with increasing pixel group tone values.

Figure 10:
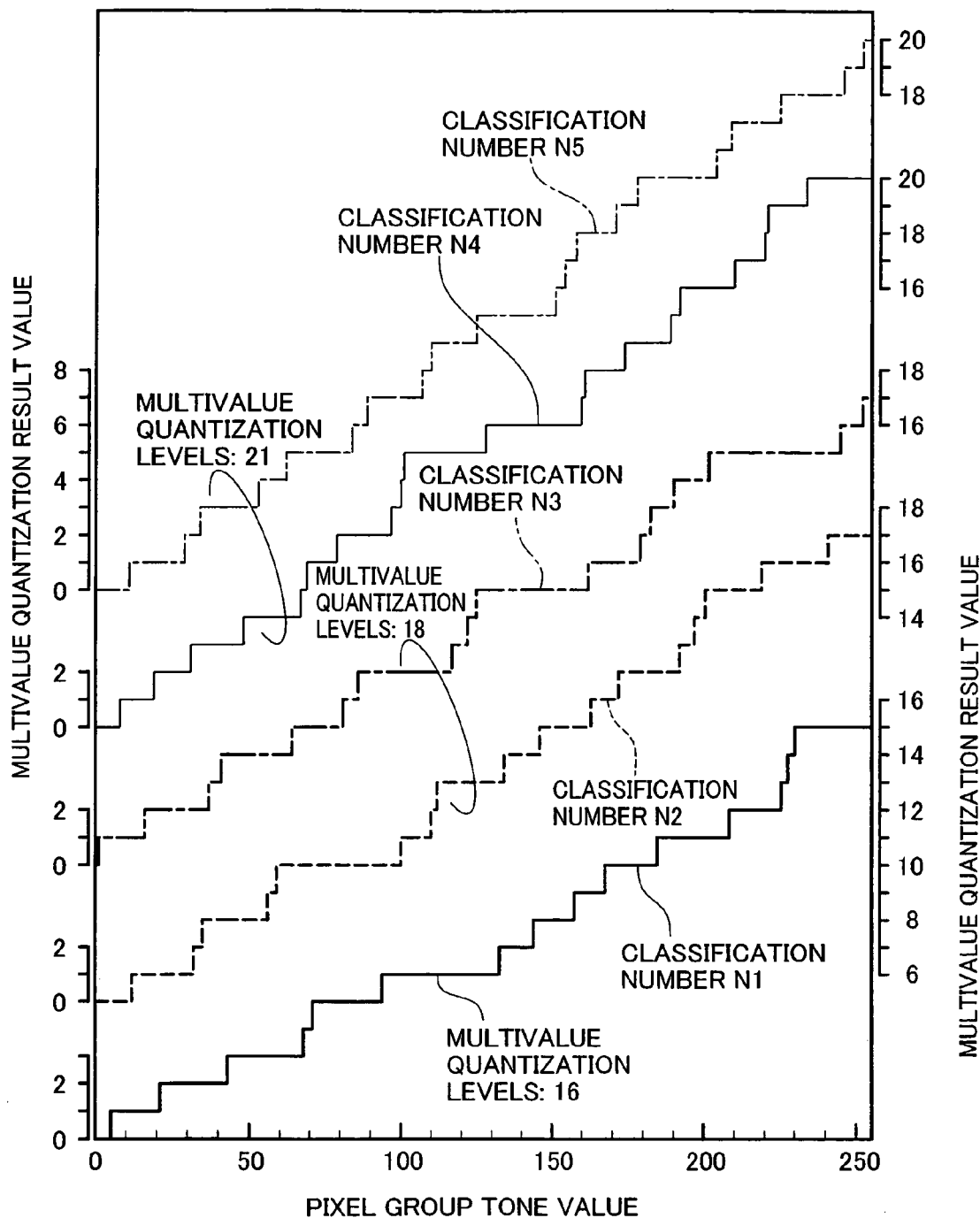
FIG. 10 is an illustration depicting an example of stepwise increase in Multi-value Quantization Result values in correspondence relationship with increasing pixel group tone values.

FIG. 10 is an illustration depicting an example of stepwise increase in Multi-value Quantization Result values in correspondence relationship with increasing pixel group tone values. In FIG. 10, Multi-value Quantization Result values associated with increasing pixel group tone values are shown using a line graphs in which pixel group tone values are given on the horizontal axis and Multi-value Quantization Result values are given on the vertical axis. In the drawing, Multi-value Quantization Result values are shown for five pixel groups having different classification numbers N1-N5; in order to prevent the line graphs of the pixel groups from overlapping and becoming difficult to distinguish from one another, the location of the origin of the Multi-value Quantization Result values is portrayed shifted in small increments in the vertical axis direction.

Taking as a example for description the pixel group of classification number N1 represented by the heavy solid line in the drawing, within a pixel group tone value range of 0-4, the Multi-value Quantization Result value is "0"; within a pixel group tone value range of 5-20, meanwhile, the Multi-value Quantization Result value increases to "1." Next, within a pixel group tone value range of 21-42 the Multi-value Quantization Result value increases to "2," and within a pixel group tone value range of 43-69 the Multi-value Quantization Result value increases to "3." In this way, Multi-value Quantization Result value increases in stepwise fashion in correspondence relationship with increasing pixel group tone value, with the Multi-value Quantization Result value ultimately increasing to "15." That is, pixel group tone values that can assume tone values over the range 0-255 are subjected to multi-value quantization to sixteen levels, from tone values of 0-15 (in other words, base 16 conversion).

Similarly, for the pixel group of classification number N2 represented by the heavy dashed line, and the pixel group of classification number N3 represented by the heavy dot-and-dash line in the drawing, pixel group tone values that can assume tone values over the range 0-255 undergo multi-value quantization to eighteen levels from tone values of 0-17 (in other words, base 18 conversion). Further, for the pixel group of classification number N4 represented by the fine solid line and the pixel group of classification number N5 represented by the fine dot-and-dash line, pixel group tone values undergo multi-value quantization to twenty-one levels from tone values of 0-20 (in other words, base conversion). In this way, in the Multi-value Quantization Result value generation process of the present embodiment, the number of levels of multi-value quantization of pixel groups (number of states that Multi-value Quantization Result values can assume) are not all the same; rather, multi-value quantization is carried out using unique level numbers depending on pixel group classification number. As a result, even where the same given pixel group tone value undergoes multi-value quantization, the pixel group classification number will differ, and thus the number of levels for multi-value quantization will differ, so that the multi-value quantization will give different result values.

Even where the number of levels for multi-value quantization is the same, it is not the case that identical Multi-value Quantization Result values will be obtained. For example, as will be apparent from a comparison of the pixel group of classification number N2 with the pixel group of classification number N3 in FIG. 10, even though the number of levels of multi-value quantization for each is eighteen, the pixel group tone values at which their Multi-value Quantization Result value changes will not be the same in most instances. Similarly, for the pixel group of classification number N4 and the pixel group of classification number N5, even though the number of levels of multi-value quantization for each is twenty-one, the pixel group tone values at which their Multi-value Quantization Result value changes will not be the same in most instances. Consequently, even where the number of levels of multi-value quantization of pixel groups is the same, where their classification numbers differ, different Multi-value Quantization Result values will be obtained.

In the multi-value quantization depicted in FIG. 9, Multi-value Quantization Result values for pixel group tone values are stored on a pixel group-by-group classification number basis. As shown in FIG. 10, correspondence relationships of pixel group tone values with Multi-value Quantization Result values consist of unique correspondence relationships for each of the individual classification numbers. In Step S134 of the Multi-value Quantization Result value generation process shown in FIG. 7, the process for generating Multi-value Quantization Result values on a pixel group-by-groups basis is carried out by performing multi-value quantization of pixel group tone values with reference to this kind of multi-value quantization table. The method of setting up the multi-value quantization table depicted in FIG. 9 will be discussed in detail later.

Once pixels have been grouped into a pixel group, and Multi-value Quantization Result values have been generated for the pixel group in the above manner, it is determined whether processing has been completed for all pixels (Step S136). If there are any unprocessed pixels remaining (Step S136: no), the process returns to Step S130, a new pixel group is created, and the subsequent series of processes is performed to generate a Multi-value Quantization Result value for that pixel group. This procedure is repeated until it is determined that processing has been completed for all pixels (Step S136: yes), whereupon the Multi-value Quantization Result values derived for the pixel groups are output to the color printer 200 (Step S138), and the Multi-value Quantization Result value generation process of FIG. 7 terminates.

Where Multi-value Quantization Result values for each pixel group are output in this way, the amount of data needing to be sent to the printer is considerably less than the case where data representing dot on/off state for each individual pixel is output. The point shall be discussed below.

In the present embodiment, since it is possible to form three types of dots, namely, large dots, medium dots, and small dots, then including the case where no dot is formed, each individual pixel can assume any of four states, and consequently 2-bit data will be necessary in order to represent the dot on/off state of each single pixel. In the present embodiment, since a single pixel group is composed of eight pixels, the amount of data needed to represent the dot on/off state of single pixels is 16 bits (=2 bits×8 pixels) per pixel group.

In the Multi-value Quantization Result value generation process shown in FIG. 7, on the other hand, the number of levels is on the order of 15-21, while differing depending on pixel group classification number (see FIGS. 9 and 10). While the method for determining the number of levels of multi-value quantization on a pixel group-by-group basis shall be described later, the number of levels of multi-value quantization will likely not exceed 30 at most. Consequently, with Multi-value Quantization Result values for pixel groups, five bits of data should be sufficient to represent each single pixel group. As noted, since where the dot on/off state of each single pixel is represented, 16-bit data for each pixel group will be needed, by outputting result values derived by multi-value quantization of pixel group tone values, the amount of data needing to be output to the color printer 200 can be reduced to one-third or less. In this way, in the image printing process of the present embodiment, because Multi-value Quantization Result values for pixel groups are output, the amount of data can be reduced, and it is possible for the data to be output to the color printer 200 faster.

When the color printer 200 receives the Multi-value Quantization Result values from the computer 100, it determines the dot on/off state for each pixel in the pixel groups, by means of performing the dot on/off state determination process described below.

Figure 11:
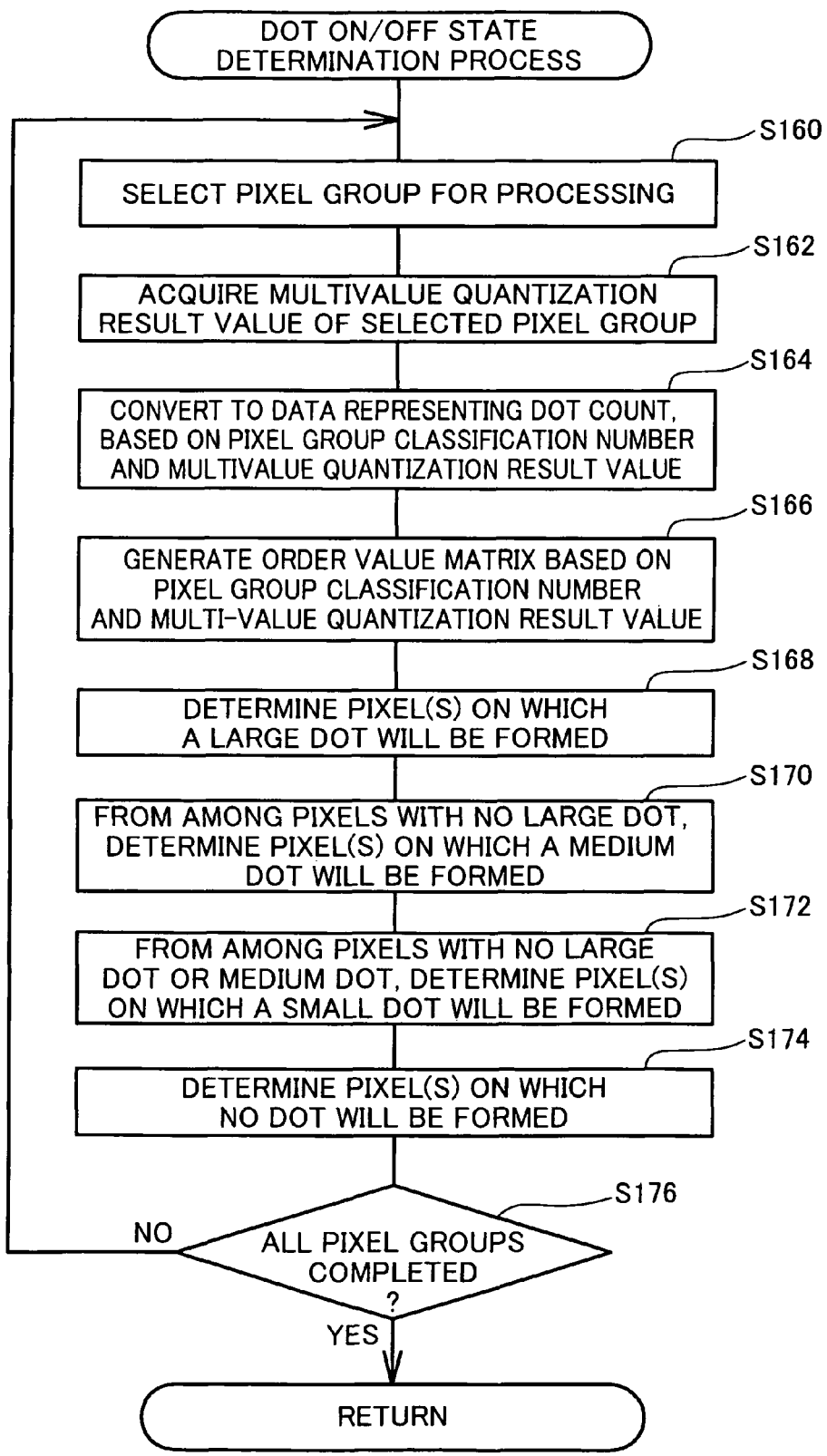
FIG. 11 is a flowchart depicting the flow of the dot on/off state determination process of the Embodiment.

C-2. Overview of Dot On/Off State Determination Process:

FIG. 11 is a flowchart depicting the flow of the dot on/off state determination process of the Embodiment. The process is a process that is executed by the color printer 200, after it has received Multi-value Quantization Result values for each pixel group from the computer 100. The description herein below will follow the flowchart of FIG. 11.

When the dot on/off state determination process of the Embodiment is initiated, first, one pixel group is selected for processing, and the Multi-value Quantization Result value of the selected pixel group is acquired (Steps S160, S162). Next, the Multi-value Quantization Result value for the pixel group is converted to data representing the number of dots to be formed in the pixel group (Step S164). Here, as shown in FIG. 9 and FIG. 10, where pixel group classification numbers differ, Multi-value Quantization Result values will assume different values even if pixel group tone values are the same. As will be apparent therefrom, pixel group Multi-value Quantization Result values constitute data for which it is possible to compare the magnitude of result values only between pixel groups of the same classification number; it is not possible to compare Multi-value Quantization Result values for pixel groups having different classification numbers.

Consider the case where Multi-value Quantization Result values dependent on pixel group classification numbers are converted to Multi-value Quantization Result values not dependent on classification numbers. Where Multi-value Quantization Result values are converted to values not dependent on classification numbers, since the magnitude of Multi-value Quantization Result values can be compared for all pixel groups, it is possible for appropriate numbers for forming large dots, medium dots, and small dots, i.e. data representing dot counts, to be associated according to the order of the respective converted values.

In Step S164 of FIG. 11, on the basis of this concept, Multi-value Quantization Result values dependent on pixel group classification numbers are converted to data indicating numbers of dots to be formed in pixel groups. The actual conversion can be carried out very quickly, simply by referring to a conversion table having appropriate dot count data pre-established therein for each combination of pixel group classification number and Multi-value Quantization Result value.

FIG. 12 is an illustration depicting conceptually a conversion table referred when combinations of pixel group classification numbers and Multi-value Quantization Result values are converted to data representing dot counts. As illustrated in this figure, in the conversion table, data representing dot counts corresponding to Multi-value Quantization Result values have been established for each classification number. As one example, to describe the case for a pixel group of the classification number 1, for a Multi-value Quantization Result value of 0, dot count data of "0" is established. This dot count data of "0" is code value indicating that the number of large dots, medium dots, and small dots to be formed is 0 for each. "1" is established as the as dot count data for the Multi-value Quantization Result value of 1. Dot count data of "1" is code value indicating that the number of large dots and medium dots to be formed is 0, while the number of small dots to be formed is 1. For the Multi-value Quantization Result value of 15, dot count data of "164" is established. Dot count data of "164" is code value indicating that 8 large dots are to be formed, and no medium dots or small dots are to be formed.

In this way, data indicative of dot count is established as encoded code value in the conversion table. Specifically, as long as count data is able to specify dot count by some method, then the data can take any form, even one that does not express dot count directly. For a pixel group of the classification number 1, no data is established representing dot counts for Multi-value Quantization Result values greater than "16." This is because the number of levels of multi-value quantization for a pixel group of the classification number 1 is sixteen levels, corresponding to the fact that Multi-value Quantization Result values can only assume values of 0-15. Consequently, for pixel groups whose number of levels of multi-value quantization is eighteen levels, such as pixel groups of the classification number 2, data indicating dot counts will be established only for Multi-value Quantization Result values of 0-17, while no data is established representing dot counts is established for Multi-value Quantization Result values greater than "18."

FIG. 13 is an illustration depicting correspondence relationships between coded count data and the count of each dot type represented by code value. The reason for handing dot counts of the various dot types in coded form in this way is as follows.

Here, since a single pixel group is composed of eight pixels, counts for forming large dots, medium dots, and small dots can each assume a value of 0-8. Consequently, if dot counts were represented as-is without being coded, the large dot count, medium dot count, and small dot count would each require 4 bits to represent them, for a total of 12 bits of data.

Meanwhile, since a single pixel group is composed of eight pixels, the total dot count that can be formed in any one pixel group is at most eight. For example, in the case of the combination of the dot counts: 4 large dots, 3 medium dots, and 2 small dots, the total dot count would be nine; since this exceeds eight, it would never actually occur. In light of this fact, the kinds of dot combinations that can actually occur are not considered to be very numerous. The actual calculation would be as follows. A pixel group contains eight pixels, and viewed in terms of each individual pixel, it can assume one of four states, namely, "form a large dot," "form a medium dot," "form a small dot," or "form no dot." The number of dot count combinations which it is possible to form in a pixel group is equivalent to the number of combinations of these four states when selected eight times permitting duplication, and thus can be calculated as:

$$_4H_8(=_{4+8-1}C_8),$$

so ultimately a maximum of only 165 possible combinations appears. Here, nHr is an operator for calculating the number of duplicate combinations when selected r times from among n objects while permitting duplication. nCr is an operator for calculating the number of combinations when selected r times from among n objects without permitting duplication. Where the number of possible combinations is 165, these can be represented on eight bits. Consequently, where code numbers are established for combinations of dot counts that can actually occur, combinations of dot counts to be formed in pixel groups can be represented with 8-bit data. Ultimately, by coding dot count combinations, it is possible to reduce the amount of data required, as compared to where dot formation counts are represented on a per-dot type basis. For reasons such as this, count data is represented in coded form as depicted in FIG. 13, and in the conversion table shown in FIG. 12, the coded dot count data is established for Multi-value Quantization Result values on a per-classification number basis. The method for setting up the conversion table shown in FIG. 12 will be described in detail later with reference to another drawing.

The dot on-off state determination process of FIG. 11 refers to the conversion table of FIG. 12 to convert a Multi-value Quantization Result value of each pixel group to a code value representing the dot count in the pixel group. Both the pixel group classification number and the Multi-value Quantization Result value are required for referring to the conversion table of FIG. 12. As described previously with reference to FIG. 8, the classification number of each pixel group is specified according to the location of the pixel group in the image. The Multi-value Quantization Result value is supplied with regard to each pixel group. The order of supply of Multi-value Quantization Result values thus identifies the position of each pixel group having a Multi-value Quantization Result value as a processing object on the image. This readily provides the classification number of the pixel group. The method of determining the pixel group classification number from the location of the pixel group on the image will be described later in detail. The pixel group classification number may be output together with the Multi-value Quantization Result value from the computer 100 to the color printer 200.

Figure 15A:
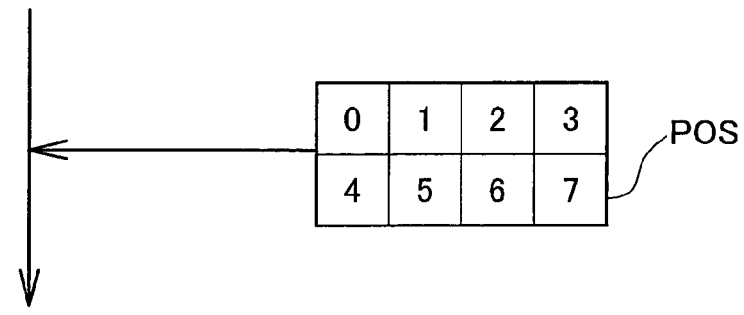
FIGS. 15A and 15B show preparation of the order value matrix based on the acquired position number.
Figure 15A:
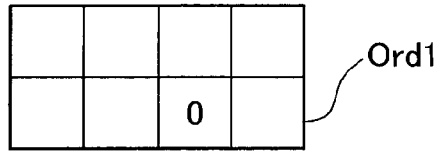
Figure 15B:
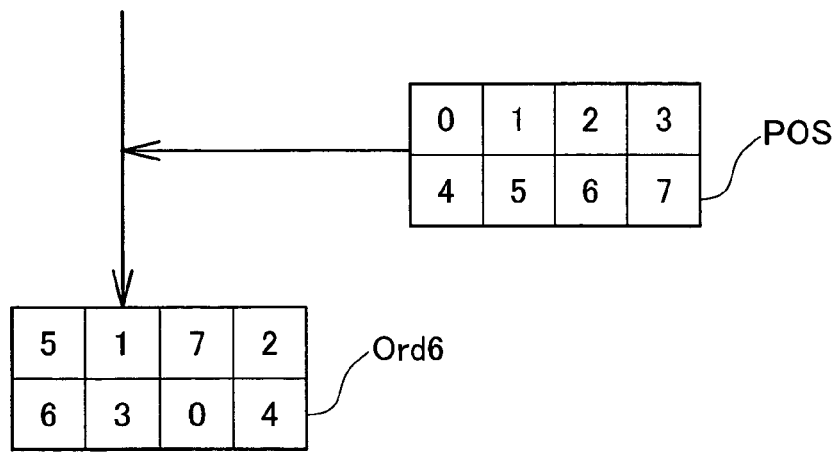

The dot on-off state determination process then prepares an order value matrix corresponding to each pixel group (step S166). The order value matrix specifies a dot formation order set in the respective pixels included in the pixel group. FIG. 14 shows a position number acquisition table used for acquiring a position number to provide the order value matrix. FIGS. 15A and 15B show preparation of the order value matrix based on the acquired position number.

In one example, an order value matrix is prepared by the following procedure when the classification number and the Multi-value Quantization Result value are both equal to '1'. A position number '6' is read corresponding to the given classification number '1' and the given Multi-value Quantization Result value '1' from the position number acquisition table (see FIG. 14). An order value matrix Ord1 is obtained according to the acquired position number '6' and a reference position matrix POS (FIGS. 15A and 15B) set in advance as the basis for creation of the order value matrix. The position number '6' means dot formation only in a pixel position corresponding to a cell for storage of the value '6' in the reference position matrix POS.

In another example, when the classification number is equal to '1' and the Multi-value Quantization Result value is equal to '15', an ordinal value matrix Ord6 is obtained according to an acquired position number '61357042' and the reference position matrix POS set in advance as the basis for creation of the order value matrix. The position number '61357042' represents an order of dot formation in the reference position matrix POS. The numeral '6' at the first place of the position number indicates the position of first dot formation in the reference position matrix POS, and the following numerals '1357042' at the subsequent places of the position number indicate the positions of second to eighth dot formation in the reference position matrix POS.

For reduction of the data volume, the order value matrix is obtained not directly from the Multi-value Quantization Result value but from the position number in the reference position matrix POS. In the case of the small dot count, for example, in the case of the dot count equal to '1', the order value matrix is readily obtained according to the position number data of only one numeral ('6' in the above example).

FIGS. 16A to 16F show order value matrixes with the classification number '1'. In this illustrated example, the Multi-value Quantization Result value '1' gives an order value matrix Ord1 specifying one position of dot formation. The Multi-value Quantization Result values '2' and '3' respectively give an order value matrix Ord2 specifying two positions of dot formation and an order value matrix Ord3 specifying three positions of dot formation. The Multi-value Quantization Result values '4' to '10' give an identical order value matrix Ord4 specifying four positions of dot formation. The Multi-value Quantization Result values '11' and '12' give an identical order value matrix Ord5 specifying five positions of dot formation. The Multi-value Quantization Result values '13' to '15' give an identical order value matrix Ord6 specifying eight positions of dot formation.

The procedure of this embodiment sets the order value matrix according to the Multi-value Quantization Result value. This allows free setting of both the dot count and the dot arrangement according to the input tone value. Such free setting, which is unattainable by the conventional dither method, is characteristic of the halftone process of the invention as described later in detail.

The order value matrix conversion table of FIG. 14 and the reference position matrix POS of FIGS. 15A and 15B are stored in advance in the ROM mounted on the color printer 200 of this embodiment. The method of setting the order value matrix according to the pixel group classification number and the Multi-value Quantization Result value will be described below in detail with reference to other illustrations.

Figure 17A:
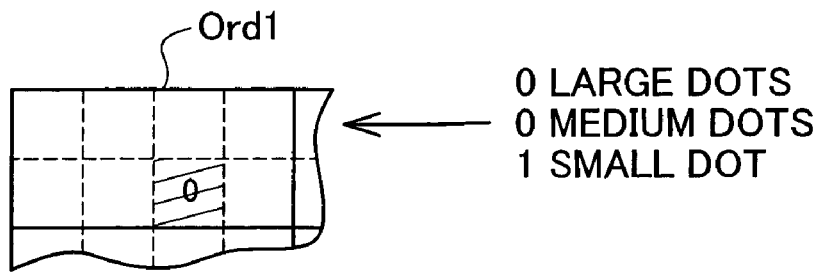
FIGS. 17A and 17B conceptually show determination of the dot-on pixels with regard to the respective size dots in one pixel group according to the dot count data and the order value matrix.
Figure 17B:
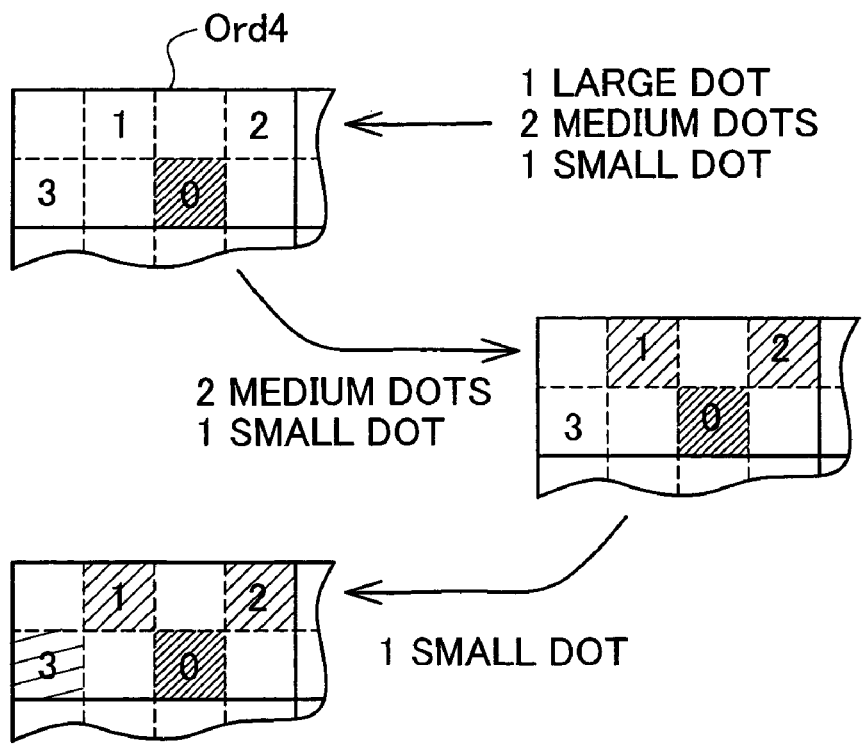

FIGS. 17A and 17B conceptually show determination of the dot-on pixels with regard to the respective size dots in one pixel group according to the dot count data and the order value matrix. In an illustrated example of FIG. 17A, the code value representing the dot count to be formed in the pixel group indicates formation of only one small-size dot, that is, a combination of zero large-size dot, zero medium-size dot, and one small-size dot. In this case, the dot formation position of only one small-size dot is determined according to the order value matrix Ord1. In FIG. 17A, the position of the dot-on pixel for the small-size dot is shown by a rectangle filled with rough slant lines.

In another illustrated example of FIG. 17B, the code value representing the dot count to be formed in the pixel group indicates a combination of one large-size dot, two medium-size dots, and one small-size dot. In this case, the dot formation positions are determined according to the order value matrix in the sequence of the large-size dot, the medium-size dot, and the small-size dot. The dot on-off state determination process of FIG. 11 specifies a dot-on pixel for formation of the large-size dot according to the dot count data and the order value matrix at step S168. The position of the dot-on pixel for the large-size dot is shown by a rectangle filled with fine slant lines.

After specification of the dot-on pixel for the large-size dot, the dot on-off state determination process of FIG. 11 subsequently specifies a dot-on pixel for formation of the medium-size dot (step S170). In the illustrated example of FIGS. 17A and 17B, two medium-size dots are to be formed in the pixel group. Since the pixel with the order value '0' has already been specified as the dot-on pixel for the large-size dot, the pixels with the order value '1' and the order value '2' are specified as the dot-on pixels for the medium-size dot. In the illustration of FIGS. 17A and 17B, the positions of the dot-on pixels for the medium-size dot are shown by rectangles filled with regular slant lines. The dot-on pixel for the medium-size dot is selected among the pixels with no formation of the large-size dot at step S170 in FIG. 11.

After specification of the dot-on pixel for the medium-size dot, the dot on-off state determination process of FIG. 11 specifies a dot-on pixel for formation of the small-size dot (step S172). In the illustrated example of FIGS. 17A and 17B, one small-size dot is to be formed in the pixel group. Since the pixels with the order values '0' to '2' have already been specified as the dot-on pixels for the large-size dot and the medium-size dot, the pixel with the order value '3' is specified as the dot-on pixel for the small-size dot. In the illustration of FIGS. 17A and 17B, the position of the dot-on pixel for the small-size dot is shown by a rectangle filled with rough slant lines.

After specification of the dot-on pixels with regard to the large-size dot, the medium-size dot, and the small-size dot in the above manner, the remaining pixels in the pixel group are specified as dot-off pixels (step S174 in FIG. 11). This completes the determination of the dot on-off state with regard to all the pixels included in the pixel group.

The dot on-off state determination process then identifies complete or incomplete determination of the dot on-off state with regard to all the pixel groups (step S176). When there is any unprocessed pixel group (step S176: no), the dot on-off state determination process goes back to step S160 to select another pixel group and executes the subsequent series of processing with regard to the newly selected pixel group. Upon completion of the processing with regard to all the pixel groups (step S176: yes), the processing flow exits from the dot on-off state determination process of FIG. 11 and returns to the image printing process of FIG. 6. The image printing process forms dots according to the determination result of the dot on-off state to print an image on a printing medium.

As described above, the image printing process of the embodiment collects multiple pixels to one pixel group, performs multi-value quantization of each pixel group, and outputs the Multi-value Quantization Result values to the color printer 200. The Multi-value Quantization Result value of each pixel group is readily determinable from the pixel group classification number and the pixel group tone value by simply referring to the multi-value quantization table of FIG. 9. Since the pixel group classification number and the pixel group tone value are obtained very easily as described previously, the Multi-value Quantization Result value of each pixel group is determinable at the extremely high speed by the extremely simple process.

The Multi-value Quantization Result value is expressible by only a small number of bits (5 bits at most in this embodiment). The data volume of the Multi-value Quantization Result values is thus significantly less than the data volume of the dot state data representing the dot on-off state in each pixel. The output of the Multi-value Quantization Result value of each pixel group, instead of the dot state data representing the dot on-off state in each pixel, desirably enhances the speed of data transfer to the color printer 200 by the reduced data volume.

The color printer 200 receives the Multi-value Quantization Result value of each pixel group and converts the received Multi-value Quantization Result value into dot count data representing the dot count to be formed in the pixel group. Such conversion is readily implemented by simple reference to the conversion table of FIG. 12. The color printer 200 determines the dot on-off state of the respective pixels with regard to the large-size dot, the medium-size dot, and the small-size dot based on the dot count data and the order value matrix and actually forms dots according to the determination result to form an image. The dot-on pixels of the large-size dot, the medium-size dot, and the small-size dot are determinable rather easily by referring to the order value matrix. In response to input of the Multi-value Quantization Result value of each pixel group, the color printer 200 can quickly determine the dot on-off state of the respective pixels by the relatively simple processing, thus attaining the high-speed image printing.

The image printing process of the embodiment enables high-speed image printing with sufficiently high picture quality. Adequate setting of the multi-value quantization table, the conversion table, and the order value matrix according to the pixel group classification numbers ensures high-quality image printing of good dot dispersibility, which is equivalent to the result of image printing with a dither matrix, for example, a blue noise mask or a green noise mask.

The image printing process of this embodiment prepares the order value matrix based on the Multi-value Quantization Result values. This allows free setting of both the dot count and the dot arrangement according to the input tone value. The description sequentially regards the conceptual approach of determining the pixel group classification number and the methods of setting the multi-value quantization table, the conversion table, and the order value matrix, with the reason for allowing such free setting.

C-3. Overview of Dither Method:

The image printing process of the Embodiment discussed above has been improved through deployment of a method known as the dither method. First, an overview of the dither method will be described in brief, to provide a foundation for discussion of the concept of determining pixel group classification number, and of methods for setting up multi-value quantization tables, conversion tables, order value matrices and so on.

The dither method is a typical method for use in converting image data to data representing the dot on/off state for each pixel. With this method, threshold values are established in a matrix known as a dither matrix; for each pixel, the tone value of the image data is compared with the threshold values are established in the dither matrix, and it is decided to form dots on those pixels for which the image data tone value is greater, and to not form dots on pixels for which this is not the case. By performing this decision for all pixels within an image, image data can be converted to data representing the dot on/off state for each pixel.

Figure 18:
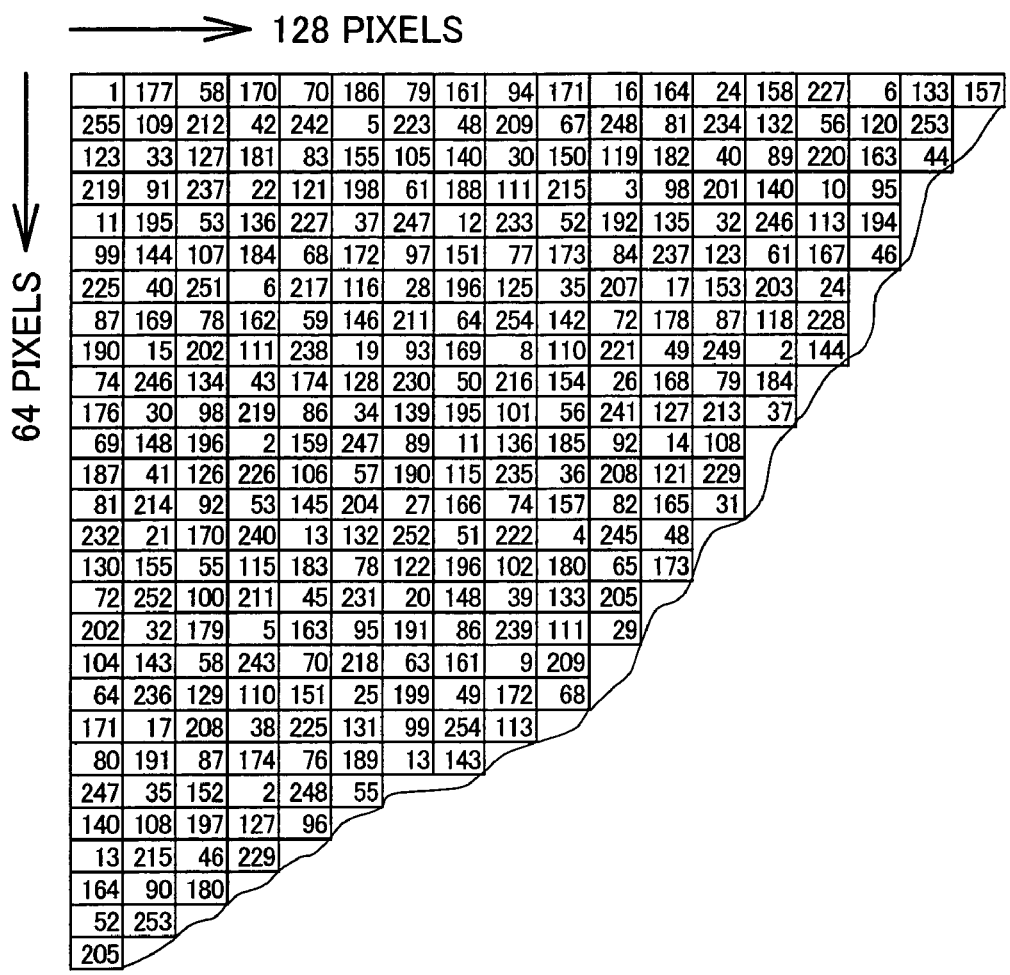
FIG. 18 an illustration depicting conceptually a portion of a dither matrix.

FIG. 18 an illustration depicting conceptually a portion of a dither matrix. In the illustrated matrix, there are randomly stored threshold values selected randomly from a tone value range of 1-225, for a total of 8192 pixels consisting of 128 pixels in the horizontal direction (main scanning direction) and 64 pixels in the vertical direction (sub-scanning direction). Here, the reason for selecting threshold value tone values from the range of 1-225 is that, in the present embodiment, the image data is 1-byte data able to assume tone values of 0-255, and additionally that where an image data tone value and a threshold value are equal, a decision is made to form a dot on that pixel.

Specifically, where dot formation is limited to pixels for which the image data tone value is greater than the threshold value (i.e. not to form a dot on any pixel whose image data tone value and threshold value are equal), no dot will ever be formed on any pixel having a threshold value equal in value to the maximum tone value that can be assumed by the image data. In order to avoid this, the value range that can be assumed by the threshold values is a range that excludes the maximum tone value from the range that can be assumed by the image data. Conversely, where a dot is formed on any pixel whose image data tone value and threshold value are equal as well, a dot will always be formed on any pixel having a threshold value equal in value to the minimum tone value that can be assumed by the image data. In order to avoid this, the value range that can be assumed by the threshold values is a range that excludes the minimum tone value from the range that can be assumed by the image data. In the present embodiment, since image data can assume tone values of 0-255, and a dot is formed on any pixel whose image data tone value and threshold value are equal, the range that can be assumed by the threshold value is set to 1-255. The size of the dither matrix is not limited to the size shown by way of example in FIG. 18; various sizes can be used, including matrices having the same pixel count in both the horizontal and vertical directions.

Figure 19:
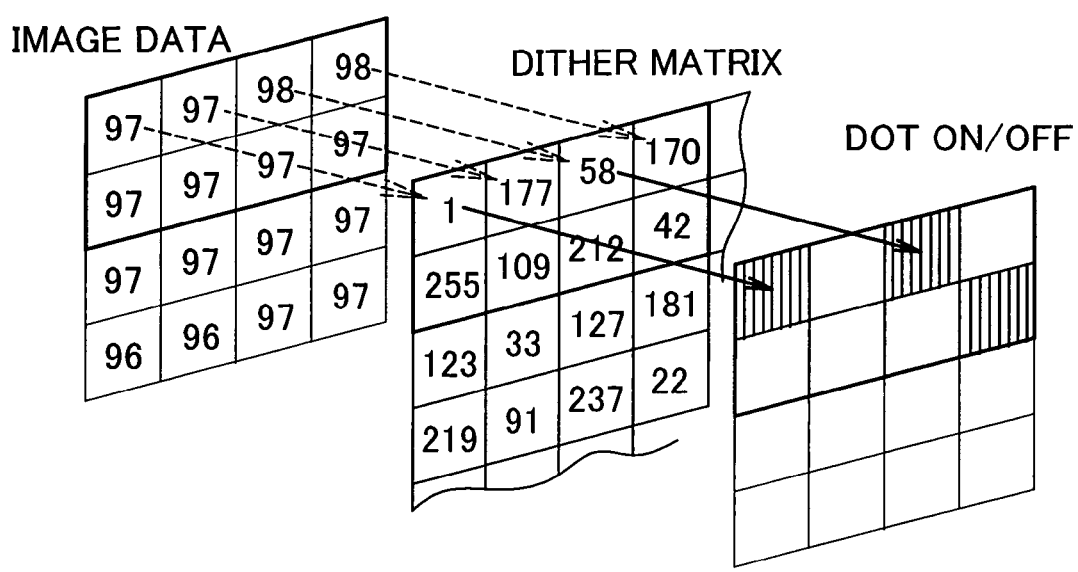
FIG. 19 is an illustration depicting conceptually the dot on/off state decision for pixels, by referring to the dither matrix.

FIG. 19 is an illustration depicting conceptually the dot on/off state decision for pixels, made while referring to the dither matrix. When deciding dot on/off state, first, a pixel for decision is selected, and the image data tone value for this pixel is compared with the threshold value stored at the corresponding location in the dither matrix. The fine broken line arrows in FIG. 19 depict in model form pixel-by-pixel comparison of image data tone values with threshold values stored in the dither matrix. For example, for the pixel in the upper left corner of the image data, the image data tone value is 97, while the dither matrix threshold value is 1, so the decision is made to form a dot on this pixel. The solid line arrow in FIG. 19 depicts in model form the decision to form a dot on this pixel, with the decision result being written to memory. For the pixel neighboring this pixel to right, meanwhile, the image data tone value is 97, while the dither matrix threshold value is 177, and since the threshold value is greater, the decision is made to not form a dot on this pixel. With the dither method, by deciding on a pixel-by-pixel basis whether or not to form a dot, while making reference to the dither matrix, the image data is converted to data representing dot on/off state on a pixel-by-pixel basis.

In view of the preceding description, the concept of determining pixel group classification number, and methods for setting up multi-value quantization tables, conversion tables, order value matrices and so on, shall now be described.

C-4. Conceptual Approach of Determining Classification Number:

First, the concept of assigning to classification numbers to pixel groups shall be discussed. Next, the reason why pixel group classification numbers can be derived by means of the simple method described using FIG. 8 shall be discussed.

Figure 20A:
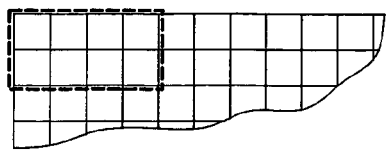
FIGS. 20A to 20C are illustrations depicting the conceptual approach of determining classification number on a pixel group-by-group basis.
Figure 20B:
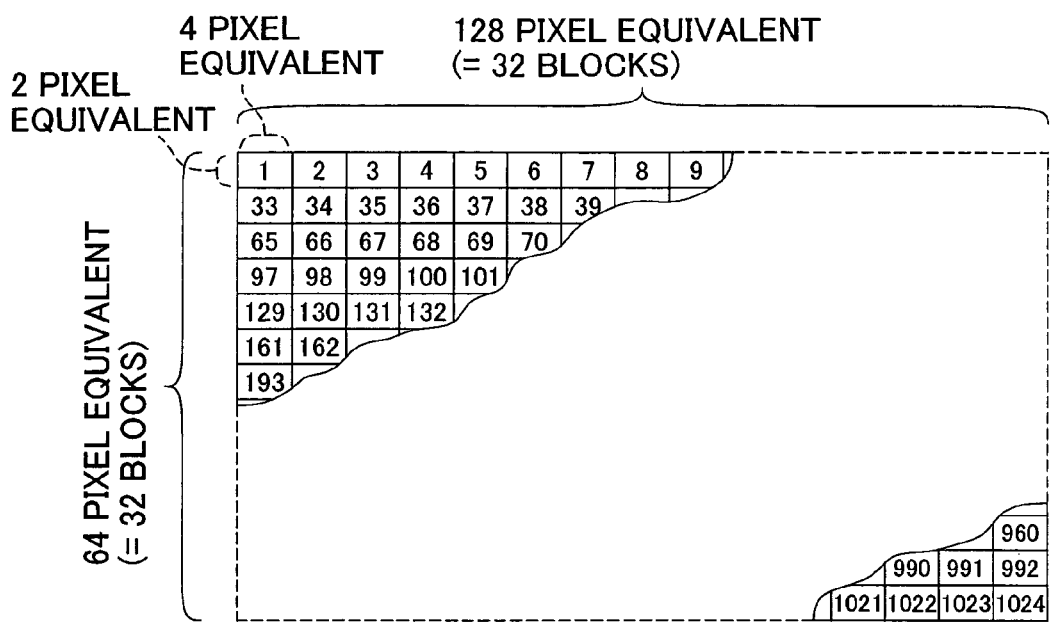
Figure 20C:
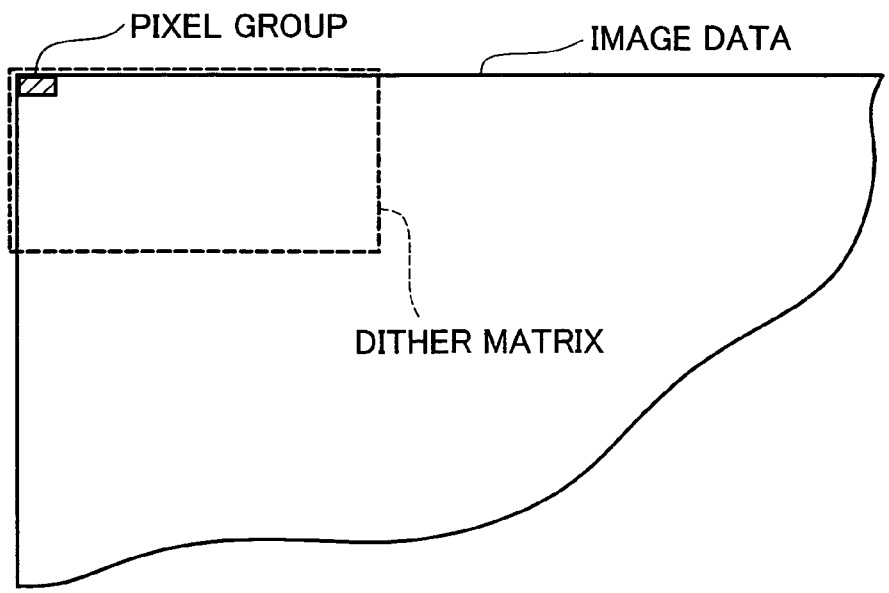

FIGS. 20A to 20C illustrate the conceptual approach of determining classification number on a pixel group-by-group basis. FIG. 20A illustrates conceptually a single pixel group created by grouping together a total of 8 pixels, namely four pixels in the horizontal direction and two pixels in the vertical direction, at a location at the upper leftmost corner of an image.

As noted, in the dither method, dot on/off state is decided on a pixel-by-pixel basis, by comparing the tone values of image data assigned to pixels, with threshold values established at corresponding locations in the dither matrix. In the present embodiment meanwhile, since prescribed numbers of neighboring pixels are grouped into pixel groups, the threshold values established in the dither matrix are likewise grouped together in prescribed numbers corresponding to the pixel groups, to create blocks. FIG. 20B depicts multiple blocks created by grouping threshold values established in the dither matrix depicted in FIG. 18, and each composed of four values in the horizontal direction and two values in the vertical direction. The dither matrix depicted in FIG. 18 is composed of threshold values equivalent to a total of 8192 pixels, namely 128 pixels in the horizontal direction (main scanning direction) and 64 pixels in the vertical direction (sub-scanning direction), so by grouping together threshold values in blocks each composed of four in the horizontal direction and two in the vertical direction, the dither matrix is divided into 32 blocks each in the horizontal and vertical directions, for a total of 1024 blocks.

As shown in FIG. 20B, these blocks are assigned serial numbers from 1 to 1024. When the dither matrix is applied to image data, pixel groups are classified according to the serial number of the block which will be applied to the location of a pixel group. For example, as shown in FIG. 20C, since the block having the serial number 1 in FIG. 20B will be applied to the pixel group in the uppermost left corner of the image, this pixel group is classified as a pixel group of classification number 1. The preceding represents the basic concept for determining pixel group classification numbers.

Next, the reason why it is possible to calculate pixel group classification numbers by means of the method described previously with FIG. 8 will be discussed. FIGS. 21A to 21D illustrate the method for calculating classification numbers of pixel groups. FIG. 21A shows a single pixel group created in an image. In the description herein below, the method for calculating classification number will be described, taking this pixel group as the pixel group of interest. As noted, the location of a pixel group of interest is represented by the pixel location of the pixel in the upper left corner of the pixel group. In FIG. 21A, the location of this pixel group is shown by a black dot on the pixel. The pixel location of this pixel is denoted as (X,Y). Since the size of each pixel group is 4 pixels in the main scanning direction and two pixels in the sub-scanning direction, there exist numbers n, m (here, n and m are positive integers $\geq 0$) such that $$X=4n+1, Y=2m+1.$$

In other words, n pixel groups are arrayed to the left side of the pixel group of interest, and m pixel groups are arrayed to the upper side of the pixel group of interest.

Here, as noted, when the dither matrix is applied to the image data, the pixel groups are classified on the basis of the serial number of the block applied to the pixel group of interest (see FIGS. 20A to 20C), and thus by means of a method of moving the dither matrix while applying it to image data, a given pixel group will be classified into different classification numbers. In actual practice, any method of moving the dither matrix while applying it to image data is acceptable; for convenience, however, the simplest method, i.e. moving the dither matrix in the horizontal direction, is described here. FIG. 21B illustrates conceptually repeatedly applying the dither matrix to image data while moving it in small increments in the horizontal direction.

FIG. 21C illustrates conceptually application of the dither matrix to the pixel group of interest shown in FIG. 21A, while repeatedly using the dither matrix as shown in FIG. 21B. When the dither matrix is moved in this way, any block in the dither matrix is applied to the pixel group of interesthere, let is be assumed that the block of row M, column N of the dither matrix has been applied to the pixel group of interest. Since as shown in FIG. 21A there are n pixel groups situated to the left of the pixel group of interest and m pixel groups situated to the upper side, for N and n and for M and m, the following relationships are respectively true:

$$N=n-int(n/32)\times 32+1$$

$$M=m-int(m/32)\times 32+1$$

Here, int is an operator representing rounding off to the decimal point to give an integer. Specifically, int (n/32) represents an integer value derived by rounding off to the decimal point the result of the calculation n/32. In this way, once the location of a pixel group of interest is known, numerical values M and N are derived from the equations given above shown in FIG. 21D, and the block number of the block of row M, column N of the dither matrix is assigned as the classification number of the pixel group of interest. In actual practice, as described previously with reference to FIG. 8, values can be derived very easily, simply by extracting data of a prescribed bit from data providing binary representation of the coordinate values X, Y for the pixel group of interest. The reason for this is as follows.

FIG. 22 is an illustration depicting a method for deriving a classification number from binary representation of the coordinates of a pixel group of interest. Let the coordinate values for the pixel group of interest be denoted as (X, Y), with X, Y represented on 10 bits. Zone(a) of FIG. 22 depicts conceptually binary data of the 10 bits representing the numerical value X. In the drawing, in order to identify each bit, they are shown assigned serial numbers from 1 to 10, starting from the most significant bit towards the least significant bit.

As described previously with reference to FIGS. 21A to 21D, the number n of pixel groups situated to the left side of the pixel group of interest can be derived by subtracting 1 from the value of X and dividing by 4. Here, since division by 4 can be accomplished by shifting to the right by the equivalent of 2 bits, it suffices to subtract 1 from the value of X and then bit shifting the binary data derived thereby to the right by the equivalent of 2 bits. Further, since the value of X does not assume an arbitrary value, but rather can only assume a numerical value representable in the form 4n+1, the number n of pixel groups can be derived simply by bit shifting the binary data to the right by the equivalent of 2 bits, without subtracting 1. Zone(b) of FIG. 22 depicts conceptually binary data for the number n, derived by bit shifting the value of X in this way.

Next, the expression int (n/32) is calculated. Specifically, the number n is divided by 32, and an operation to round off to the decimal place is performed. Division by 32 can be accomplished by bit shifting the binary data to the right by the equivalent of 5 bits, and where data is handed in integer form, rounding off to the decimal place will take place automatically. Ultimately, binary data for int (n/32) can be derived simply by bit shifting the binary data for the number n to the right by the equivalent of 5 bits. FIG. 20C depicts conceptually binary data for int (n/32), derived by bit shifting the number n.

int (n/32) derived in this way is multiplied by 32. Multiplication by 32 can be accomplished by bit shifting the binary data to the left by the equivalent of 5 bits. Zone(d) of FIG. 22 depicts conceptually binary data for the int (n/32)×32 derived by bit shifting the number n.

Next, the number N mentioned above can be derived by subtracting int (n/32)×32 from the number n. As will be apparent by comparing the binary data for the number n (see Zone(b) of FIG. 22) with the data for the expression int (n/32)×(see Zone(d) of FIG. 22), these sets of binary data have the five higher order bits in common, while the five lower order bits of the number of the subtrahend are all "0". Consequently, the derived value N can be obtained by extracting as-is the five lower order bits of the minuend value (the number n). Specifically, it is possible to derive the value N in a very simple manner, merely by applying mask data like that shown in Zone(f) of FIG. 22 to the binary data shown in Zone(b) of FIG. 22. Alternatively, is possible to derive the value N by applying mask data like that shown in Zone(g) of FIG. 22 to the binary data of the value X shown in Zone(a) of FIG. 22 and indicating the location of the pixel of interest, and directly extracting the fourth to eighth bit data.

In FIG. 22, there is described a case where a value N indicating block location within the dither matrix is derived from the value X of the coordinates (X, Y) indicating the location of a pixel group; however, a value M indicating block location can be derived in exactly the same way from the value Y. Ultimately, where the location of a pixel group of interest is known, the pixel block at a particular row and column in the dither matrix to which the pixel group of interest corresponds can be ascertained simply by extracting specific bit location data from the binary data; and by calculating the serial number of this block, the classification number of the pixel group of interest can be derived. The classification number calculation method described previously in FIG. 8 is a method that has been derived in this way.

C-5. Multi-Value Quantization Table Setup Method:

Next, the method for setting up the multi-value quantization table shown in FIG. 9 shall be described. As discussed previously, Multi-value Quantization Result values for pixel group tone values are established on a pixel group classification number-by-number basis; and by carrying out multi-value quantization while referring to the multi-value quantization table, pixel group tone values undergo multi-value quantization in unique form depending on pixel group classification number as shown in FIG. 10.

The multi-value quantization table of the present embodiment is established on the basis of a method that deploys the dither method described above, so as to enable dot on/off state decisions to be made on a pixel-by-pixel basis for multiple types of dots differing in size. The details of the method are disclosed in Japanese Patent No. 3292104. By way of providing a ground work, prior to describing the multi-value quantization table, an overview of the technology disclosed in the aforementioned patent publication shall be described.

Figure 23:
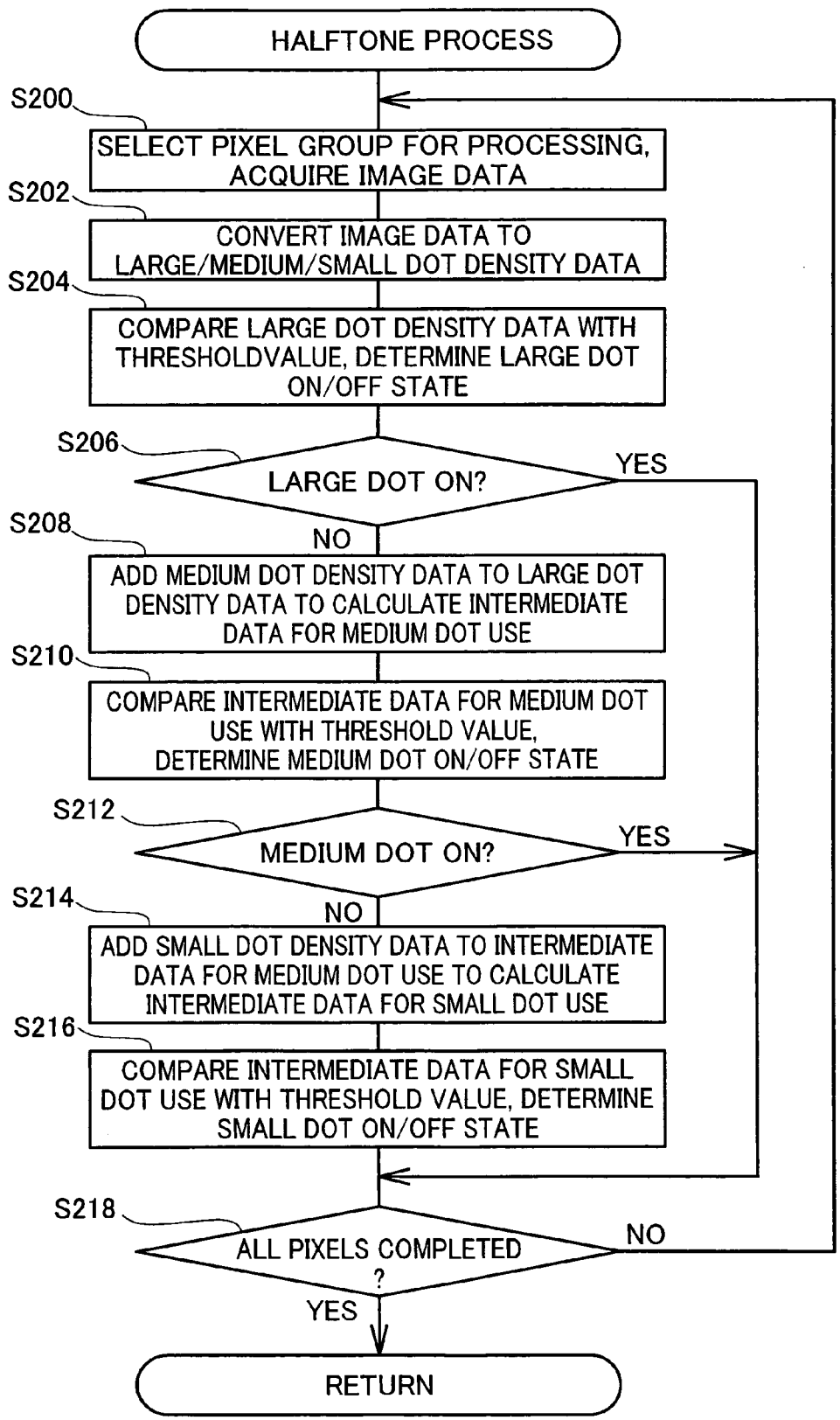
FIG. 23 is a flowchart depicting the flow of a halftone process in which a dither process is deployed making possible determination of large/medium/small dot on/off states on a pixel-by-pixel basis.

FIG. 23 is a flowchart depicting the flow of a halftone process in which a dither process is deployed making possible determination of the large/medium/small dot on/off states on a pixel-by-pixel basis. When the halftone process commences, first, a pixel for which dot on/off state decisions are to be made is selected, and image data for that pixel is acquired (Step S200). Next, the acquired image data is converted to density data for the large, medium, and small dots. Here, density data refers to data indicating densities at which to form dots. Density data will represent dot formation at higher density in correspondence relationship with greater tone value. For example, a density data tone value of "255" represents dot formation density of 100%, i.e. dots being formed on all pixels, while a density data tone value of "0" represents dot formation density of 0%, i.e. no dots being formed on any pixel. Conversion to such density data can be carried out by means of referring to a numerical table called a dot density conversion table.

Figure 24:
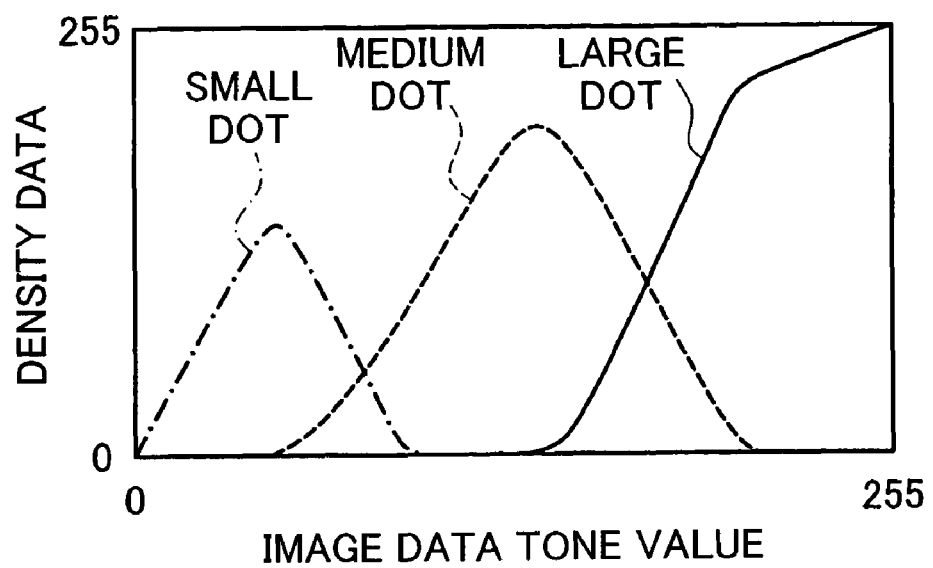
FIG. 24 is an illustration depicting conceptually a dot density conversion table used for lookup when converting image data tone values to density data for large/medium/small dots.

FIG. 24 is an illustration depicting conceptually a dot density conversion table used for lookup when converting image data tone values to density data for the large/medium/small dots. As shown in the drawing, in the dot density conversion table there is established density data for each type of dot, namely small dots, medium dots, and large dots, with respect to image data tone values. In the range where image data approaches a tone value of "0," the density data for both medium dots and large dots is set to a tone value of "0." The small dot density data increases in correspondence relationship with increasing image data tone value, but once image data reaches a certain tone value it conversely starts to decrease, with the medium dot density data beginning to increase in its place. As image data tone value increases further, the small dot density data drops to a tone value of "0," the medium dot density data starts to decrease, and the large dot density begins to increase in its place. In Step S202 of FIG. 23, a process to convert image data tone values to large dot density data, medium dot density data, and small dot density data is carried out while referring to this dot density conversion table.

Once the large/medium/small dot density data has been derived for a pixel being processed, first, the on/off state decision is made for the large dot (Step S204 of FIG. 23). The decision is carried out by comparing the large dot density data with the dither matrix threshold value established at the location corresponding to the pixel being processed. In the event that the large dot density data is greater than the threshold value, the decision is made to form the large dot on the pixel being processed, while conversely if the density data is smaller, the decision is made to not form the large dot.

Next, it is determined whether a decision has been made to form the large dot on the pixel being processed (Step S206), and in the event that a decision has been made to form the large dot on the pixel being processed (Step S206: yes), the decisions regarding the medium dot and the small dot are dispensed with, and it is decided whether all pixels have been completed (Step S218). In the event that there are any remaining pixels for which dot on/off state has yet to be determined (Step S218: no), the routine returns to Step S200, a new pixel is selected, and the series of processes is carried out.

If on the other hand it has not been decided to form the large dot on the pixel being processed (Step S206: no), then for the purpose of deciding the on/off state for the medium dot, the medium dot density data is added to the large dot density data to calculate intermediate data for medium dot use (Step S208). The intermediate data for medium dot use derived in this way is compared with the threshold value in the dither matrix. If the intermediate data for medium dot use is greater than the threshold value, a decision is made to form the medium dot, whereas conversely if the dither matrix threshold value is greater than the intermediate data for medium dot use, a decision is made to not form the medium dot (Step S210).

Next, it is determined whether a decision has been made to form the medium dot on the pixel being processed (Step S212), and in the event that a decision has been made to form the medium dot on the pixel being processed (Step S212: yes), the decision regarding the small dot is dispensed with, and it is decided whether all pixels have been completed (Step S218).

In the event that it has not been decided to form the medium dot on the pixel being processed (Step S212: no), then for the purpose of deciding the on/off state for the small dot, the small dot density data is added to the intermediate data for medium dot use to calculate intermediate data for small dot use (Step S214). The intermediate data for small dot use derived in this way is compared with the threshold value in the dither matrix. If the intermediate data for small dot use is greater than the threshold value, a decision is made to form the small dot, whereas conversely if the dither matrix threshold value is greater than the intermediate data for small dot use, the decision is made to form no dot whatsoever (Step S216).

That is, for a pixel for which the threshold value in the dither matrix is greater than the large dot density data (i.e. a pixel not having the large dot formed thereon), the medium dot density data is added to the large dot density data, the intermediate data derived thereby is compared with the threshold value, and if the intermediate data is greater the decision is made to form the medium dot. Meanwhile, for pixels for which the threshold value is still greater than the intermediate data, the small dot density data is added to the intermediate data and new intermediate data is calculated. This intermediate data is compared with the threshold value, and if the new intermediate data is greater than the threshold value the decision is made to form the small dot, whereas for a pixel for which the threshold value is still greater, the decision is made to form no dot whatsoever.

By means of carrying out the process described above, it is possible to decide, for a pixel being processed, whether to form the large dot, the medium dot, or the small dot, or to form no dot whatsoever. At this point it is decided whether processing has been completed for all pixels (Step S218), and in the event that there are any pixels remaining undecided (Step S218: no), the routine returns to Step S200, a new pixel is selected, and the series of processes is carried out. In this way, decisions as to whether to form the large, medium or small dot are made one at a time for a pixel selected for processing. Once it is decided that processing has been completed for all pixels (Step S218: yes), the halftone process shown in FIG. 23 terminates.

The preceding description relates to the method for deciding the on/off states for the large, medium, and small dot utilizing the dither matrix. The following description of the method for setting up the multi-value quantization table shown in FIG. 9 is based on the preceding discussion.

In the Multi-value Quantization Result value generation process discussed previously, image data for pixels in a pixel group are represented by a pixel group tone value, and the pixel group undergoes multi-value quantization as a unit. During setup of the multi-value quantization table, first, consider deciding on/off state for each dot type, i.e. large/medium/small, on the assumption that all pixels within a pixel group have image data of the same value as the pixel group tone value. Decisions as to on/off state for each dot type are carried out by means of the halftone process described previously using FIG. 23.

Figure 25:
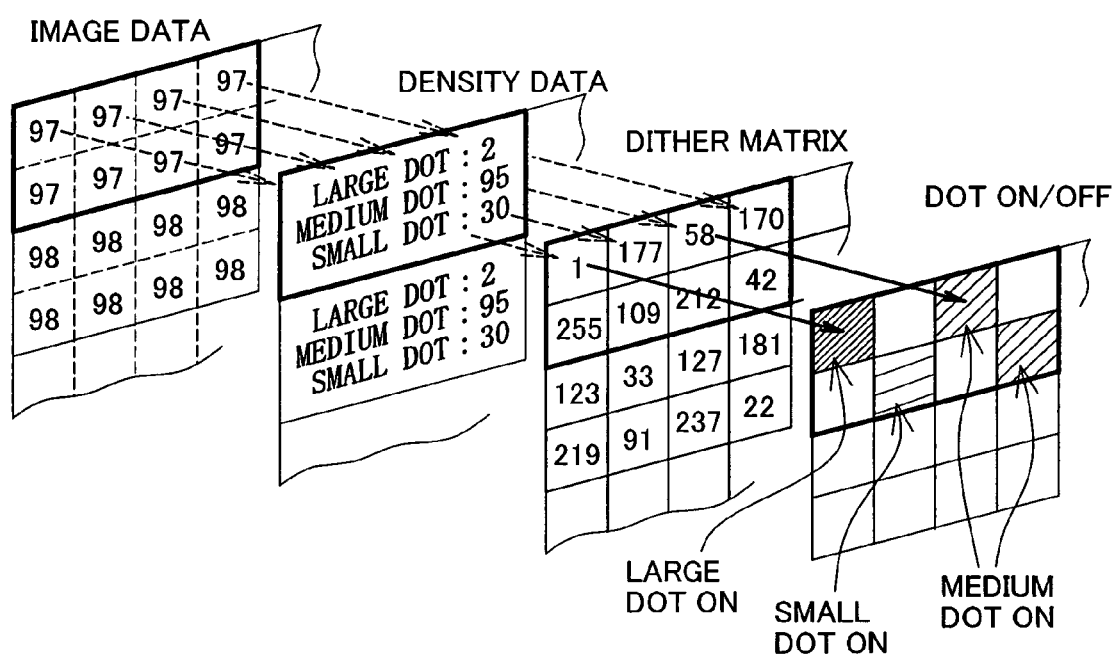
FIG. 25 is an illustration depicting conceptually the large/medium/small dot on/off state decisions for pixels within a pixel group.

FIG. 25 is an illustration depicting conceptually the large/medium/small dot on/off state decisions for pixels within a pixel group. In the drawing, a pixel group of interest for the purpose of carrying out the halftone process is shown bordered by a heavy solid line. The pixel group is made up of eight pixels, with the image data for each pixel having the same value as the pixel group tone value (in the illustrated example, a tone value of 97). In order to decide on/off state for each dot type, i.e. large/medium/small, the image data is converted to density data for each dot. Conversion to density data is carried out by referring to the dot density conversion table depicted in FIG. 24. Here, since all of the pixels in the pixel group have identical image data, the density data for each dot type will be identical for all pixels. In the illustrated example, there is depicted a case where the tone value of the large dot density data is "2," the tone value of the medium dot density data is "95," and the tone value of the small dot density data is "30."

Next, as described with FIG. 23, the on/off state for each dot type is decided on a pixel-by-pixel basis by comparing the large dot density data, the intermediate data for medium dot use, or the intermediate data for small dot use with threshold values in the dither matrix. Here, the dither matrix threshold values used for the comparisons are threshold values established at locations corresponding to the pixel group of interest, taken from the dither matrix. For example, in the example depicted in FIG. 25, since the pixel group is situated in the upper left corner of the image, for the threshold values as well, the threshold values established in the pixel group is situated in the upper left corner of the dither matrix are used.

Of the eight threshold values established for the pixel group, for pixels for which a threshold value smaller than the large dot density data has been established, the decision will be made to form the large dot here, since the large dot density data has the tone value "2," the only pixel on which the large dot will be formed is the pixel for which the threshold value has been set to "1." In FIG. 25, the pixel on which it has been decided to form the large dot is indicated by fine hatching. For pixels for which a threshold value greater than the large dot density data of "2" but smaller than the intermediate data for medium dot use of "97", derived by adding the large dot density data and the medium dot density data, has been established, the decision will be made to form the medium dot. There are only two such pixels, namely, the pixel for which a threshold value of "42" has been established; and the pixel for which a threshold value of "58" has been established. In FIG. 25, the pixels on which it has been decided to form the medium dot are shown with somewhat coarser hatching. Finally, for pixels for which a threshold value greater than the intermediate data for medium dot use of "97" but smaller than the intermediate data for small dot use of "127", derived by adding the small dot density data to the intermediate data for medium dot use, has been established, the decision will be made to form the small dot. There is only one such pixel, namely, the pixel for which a threshold value of "109" has been established. In FIG. 25, the pixel on which it has been decided to form the small dot is shown with coarse hatching. As a result of deciding large dot, medium dot, and small dot on/off states in this way, in the case of a pixel group of interest with a pixel group tone value of "97," one large dot, two medium dots, and one small dot will be formed.

Where pixel group tone values differ considerably, the numbers of large dots, medium dots, and small dots formed within pixel groups will likewise differ considerably. Where pixel group tone values vary from "0" to "255," in correspondence relationship therewith, numbers of large dots, medium dots, and small dots will likely vary in a number of stages. Additionally, where pixel group classification numbers differ, since the dither matrix threshold values will differ as well, the manner of variation of dot count will likely vary as well. The multi-value quantization table shown in FIG. 9 has been set up by means of investigating, on a classification number-by-number basis, the behavior of stepwise change in dot count of each dot type, when pixel group tone values vary from "0" to "255."

Figure 26:
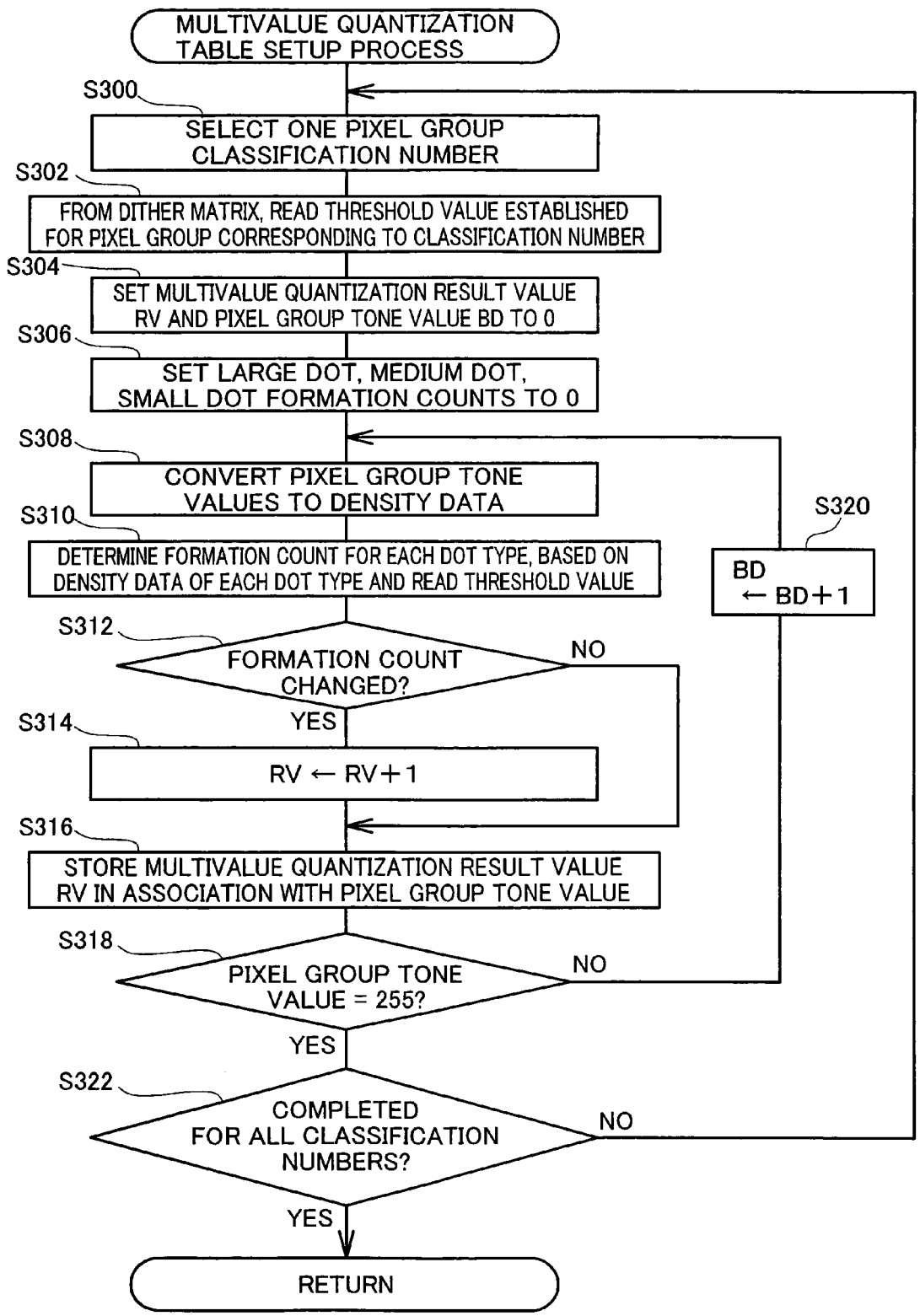
FIG. 26 is a flowchart depicting the flow of a process for setting up the multi-value quantization table.

FIG. 26 is a flowchart depicting the flow of the process for setting up the multi-value quantization table. The description herein below follows the flowchart. When the multi-value quantization table setup process is initiated, first, a single pixel group classification number is selected (Step S300). For example, here, classification number 1 is selected.

Next, the threshold values corresponding to the pixel group of the selected classification number are read from the dither matrix (Step S302). For example, since classification number 1 has been selected here, the eight threshold values established at the block location indicated by the number 1 in FIG. 20B are read out from the dither matrix depicted by way of example in FIG. 18.

Then, the Multi-value Quantization Result value RV and the pixel group tone value BD are set to "0" (Step S304), and the large dot, medium dot, and small dot formation counts are each set to 0 (Step S306).

Next, by referring to the dot density conversion table shown in FIG. 24, the pixel group tone value is converted to density data for the large dot, the medium dot, and the small dot (Step S308), after which, on the basis of this density data the threshold values read previously, formation counts for each dot type, i.e. large/medium/small, are determined (Step S310). Specifically, as described with FIG. 23 or FIG. 25, the number of threshold values smaller than the large dot density data is derived, and the number derived thereby is designated to be the large dot formation count. The number of threshold values greater than the large dot density data but smaller than the intermediate data for medium dot use is derived, and designated to be the medium dot formation count. Finally, the number of threshold values greater than the intermediate data for medium dot use but smaller than the intermediate data for small dot use is derived, and designated to be the small dot formation count.

It is then decided whether the formation counts for each of the dot types derived in the manner modify the formation counts established previously (Step S312). If it is decided that the formation counts are modified (Step S312: yes), the Multi-value Quantization Result value RV is incremented by "1" (Step S314), and the Multi-value Quantization Result value RV derived thereby is associated with the pixel group tone value BD and stored in memory (Step S316). If on the other hand it is decided that the formation counts are unchanged (Step S312: no), the Multi-value Quantization Result value RV is not incremented, and is associated as-is with the pixel group tone value BD and stored in memory (Step S316).

Once a Multi-value Quantization Result value for a given pixel group tone value has been stored in memory in this way, it is decided whether the pixel group tone value BD has reached a tone value of 255 (Step S318). If a tone value of 255 has not been reached (Step S318: no), the pixel group tone value BD is incremented by "1" (Step S320), and the process returns to Step S308 whereupon the pixel group tone value BD is again converted to density data, and the series of process carried out to associate a Multi-value Quantization Result value RV with the new pixel group tone value BD and store these in memory (Step S316). This procedure is repeated until the pixel group tone value BD reaches a tone value of 255. Once the pixel group tone value BD has reached a tone value of 255 (Step S316: yes), all Multi-value Quantization Result values will have been established for the selected classification number.

It is then decided whether the above process has been completed for all classification numbers (Step S322), and in the event that any unprocessed classification numbers remain (Step S322: no), the process returns to Step S300, and the above process is carried out again. This procedure is repeated until it is decided that all Multi-value Quantization Result values have been established for all classification numbers (Step S322: yes), whereupon the multi-value quantization table setup process depicted in FIG. 26 terminates.

As will be apparent from the preceding description, Multi-value Quantization Result values are determined by means of large/medium/small dot density data derived by conversion of a pixel group tone values, and threshold values stored in the dither matrix at locations corresponding to pixel groups. Here, as regards the dot density conversion table, shown in FIG. 24, since reference is made to the same table even where pixel group classification numbers differ, dot density data for pixel group tone values will be identical density data, irrespective of the classification number. However, the combination of threshold values read out from the dither matrix does vary on a classification number-by-number basis. The reason is that the dither matrix has been established with threshold values dispersed as much as possible and as randomly as possible, in order to avoid dots from being produced in a given pattern on an image, or from being produced clustered together at proximate locations so that picture quality deteriorates. Thus, the plurality of threshold values included in pixel groups, when viewed as sets, are thought to have low probability of occurring in exactly the same combination. For reasons such as this, the multi-value quantization table used for lookup in the Multi-value Quantization Result value generation process of the present embodiment contains pixel group tone value-Multi-value Quantization Result value correspondence relationships that differ on a classification number-by-number basis, with the number of times that Multi-value Quantization Result values change (the number of levels of multi-value quantization shown in FIG. 10) differing by classification number as well.

C-6. Conversion Table Setup Method:

Next, the method for setting up the conversion table described previously with FIG. 12 shall be discussed. This table is a table used in the dot on/off state determination process shown in FIG. 11, for lookup for the purpose of combining Multi-value Quantization Result values with classification numbers, and converting these to data representing dot counts to be formed in pixel groups.

As will be apparent from the multi-value quantization table setup method described previously with FIG. 26, Multi-value Quantization Result values established in the multi-value quantization table are determined based on large/medium/small dot counts formed in pixel groups. Naturally, Multi-value Quantization Result values are not associated directly with combinations of dot counts formed in pixel groups; rather, they can be associated with specific combinations of dot counts for the first time, by combining Multi-value Quantization Result values with pixel group classification numbers. The reason is that Multi-value Quantization Result values are established merely by extracting whether large/medium/small dot counts have changed when pixel group tone value is increased from a tone value of 0 to a tone value of 255, while omitting information indicating in what manner specific combinations of dot counts have changed.

That said, if the classification number of a pixel group is known, a combination of specific counts of each type of dot can be identified from the corresponding iteration of change of the pixel group, i.e. from the Multi-value Quantization Result value. Consequently, on a classification number-by-number basis, specific counts of each type of dot that resulted in the Multi-value Quantization Result value being established are derived, and code value corresponding to the dot count combination derived thereby is stored in memory, in correspondence relationship with the Multi-value Quantization Result value. The conversion table shown in FIG. 12 has been established by carrying out this procedure for all classification numbers.

Figure 27:
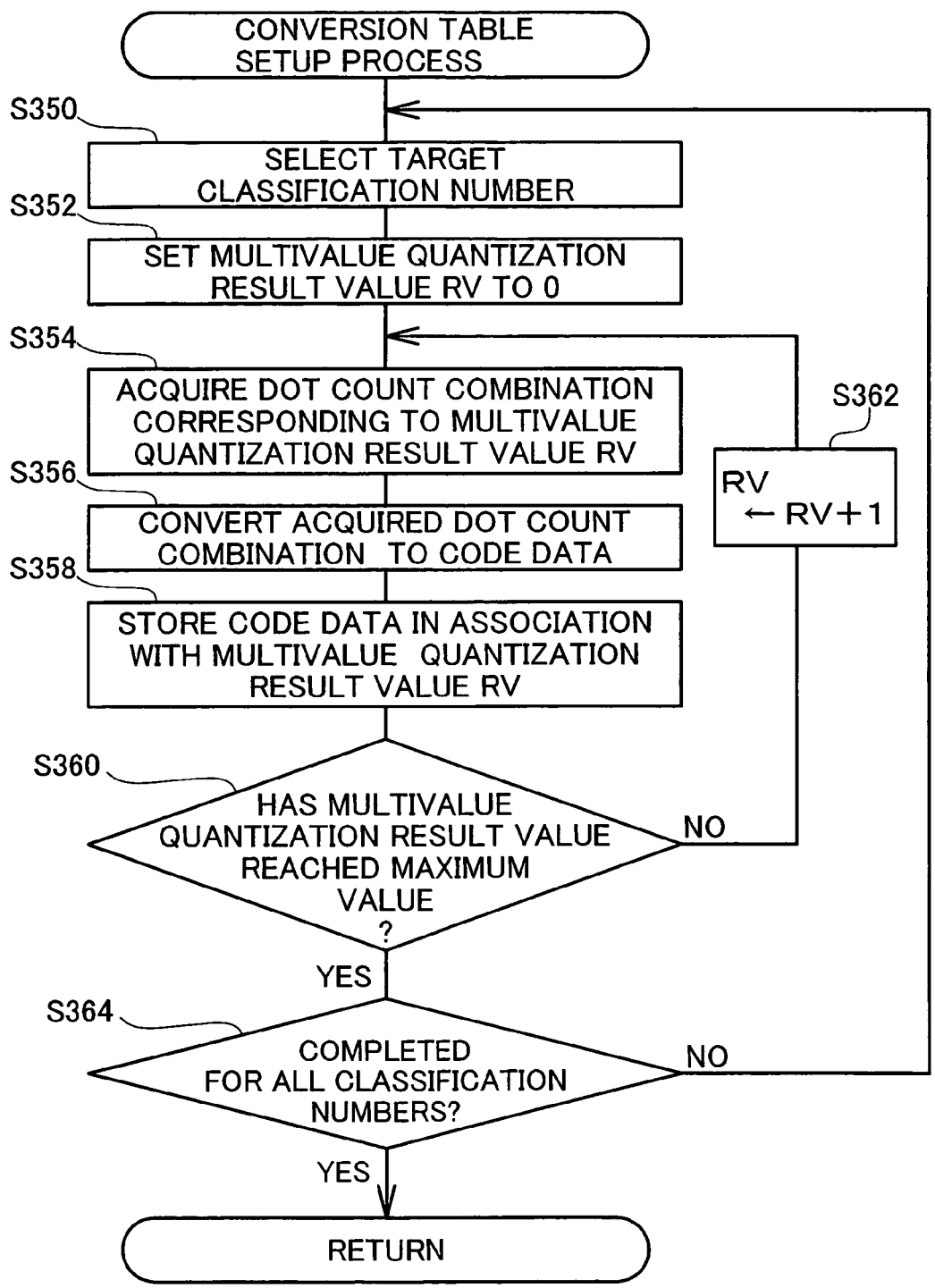
FIG. 27 is a flowchart depicting the flow of a process for setting up the conversion table.

FIG. 27 is a flowchart depicting the flow of a process for setting up the conversion table. The description herein below will follow the flowchart. When the conversion table setup process is initiated, first, a single classification number is selected for processing (Step S350), and the Multi-value Quantization Result value RV is set to 0 (Step S352).

Next, the large/medium/small dot counts corresponding to the Multi-value Quantization Result value RV are acquired (Step S354). For example, assuming the Multi-value Quantization Result value was "N," for the pixel group of that classification number, the large/medium/small dot on/off states are decided while varying the pixel group tone value from "0" to "255," and the large dot, medium dot, and small dot counts when the dot formation count has changed to the N-th iteration is acquired.

The dot count combination acquired in this way is converted to code value (Step S356). Conversion from dot count combination to code value is carried out by looking up the correspondence relationship table shown in FIG. 13. Next, the code value derived thereby is associated with the Multi-value Quantization Result value and stored in memory (Step S358), after which it is decided whether the maximum Multi-value Quantization Result value has been reached for the classification number being processed (Step S360). Specifically, since the maximum value of the Multi-value Quantization Result value differs depending on classification number as described with FIG. 9, it is decided whether the maximum Multi-value Quantization Result value has been reached for the classification number being processed.

In the event of a decision that the Multi-value Quantization Result value maximum value has not been reached (Step S360: no), the Multi-value Quantization Result value RV is incremented by "1" (Step S362). The routine then returns to Step S354, and after acquiring dot counts associated with the new Multi-value Quantization Result value RV, the subsequent series of processes is repeated. This procedure is repeated, and once it is decided that the maximum Multi-value Quantization Result value has been reached (Step S360: yes), all of the data for that classification number will have been established in the conversion table.

Now, it is decided whether this same process has been carried out for all classification numbers (Step S364). In the event that any unprocessed classification numbers remain, the routine then returns to Step 350, a new classification number is selected, and the series of processes described above is carried out for this classification number. Once it is decided that the process has been completed for all classification numbers ((Step S364: yes), all of the data of the conversion table will have been established, so the process shown in FIG. 27 terminates.

The color printer 200 of the Embodiment has the conversion table set up in the above manner stored in memory in the ROM in the control circuit 206. In the dot on/off state determination process depicted in FIG. 11, Multi-value Quantization Result values are converted to count data by means of looking up this conversion table.

C-7. Order Value Matrix Setup Method:

Next, the method for setting up the order value matrix conversion table shown by way of example in FIG. 14 shall be discussed. The order value matrix is a matrix that establishes a sequence for forming dots on pixels in a pixel group. In the dot on/off state determination process depicted in FIG. 11, the order value matrix corresponding to a pixel group is loaded, and pixels on which the large dot, the medium dot, and the small dot will be formed are determined according to the sequence established in the matrix.

Like the multi-value quantization table discussed earlier, the order value matrix is set up on the basis of the method disclosed in Japanese Patent No. 3292104 (method deploying the dither method to enable dot on/off state decisions to be made on a pixel-by-pixel basis for multiple types of dots differing in size). Specifically, as described previously, in the case of setting up the multi-value quantization table, on the assumption that all pixels within a pixel group have identical image data (i.e. the pixel group tone value), the pixel group tone value is varied from "0" to "255" while determining the large/medium/small dot counts formed in the pixel group, taking note of the change in the numbers of dots formed at this time, to establish the Multi-value Quantization Result values. As shown in FIG. 12, by combining the Multi-value Quantization Result value with the classification number, the large/medium/small dot counts formed in the pixel group can be restored. However, information as to which pixels in the pixel group dots of each type are formed on is missing, and cannot be ascertained from the Multi-value Quantization Result value or classification number. The order value matrix can be thought of as storing information relating to the pixel positions at which dots of each type are formed in a pixel group. Specifically, by applying the method taught in Japanese Patent No. 3292104, it is possible to determine not only the numbers in which dots of each type are formed, as described previously using FIGS. 23 to 25, but also the pixel positions at which dots of each type are formed in the pixel group. In the present embodiment, this method can be broken down into two elements, and thought of as causing information relating to numbers in which dots of each type are formed to be reflected primarily in Multi-value Quantization Result values (more accurately, Multi-value Quantization Result value/classification number combinations), while causing information relating to the pixel positions at which dots of each type are formed to be reflected in the order value matrix. In actual practice, such an order value matrix can be set up relatively easily.

Figure 28A:
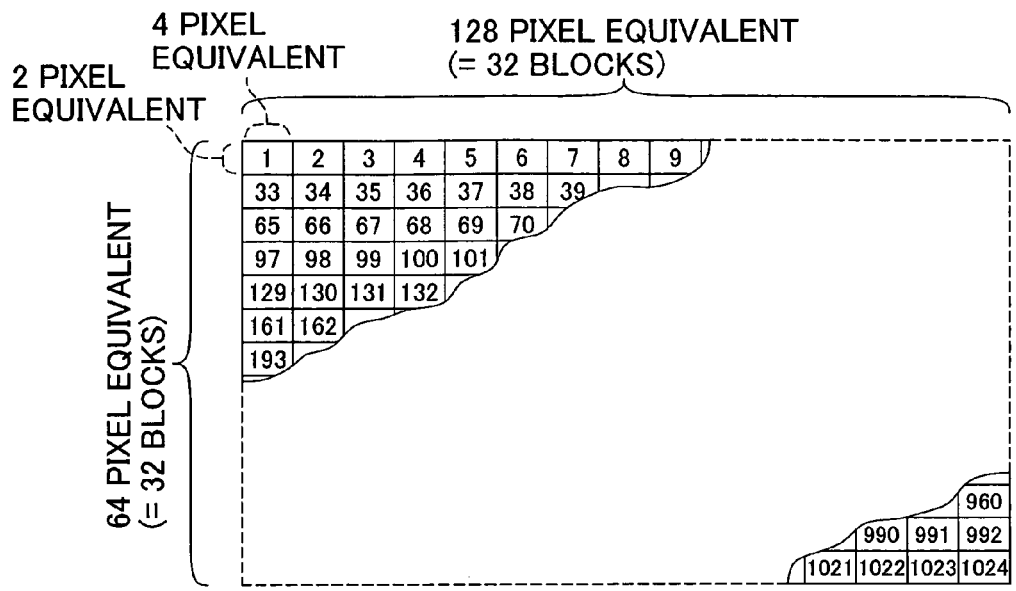
FIGS. 28A to 28C are illustrations depicting a method for setting up the order value matrix.
Figure 28B:
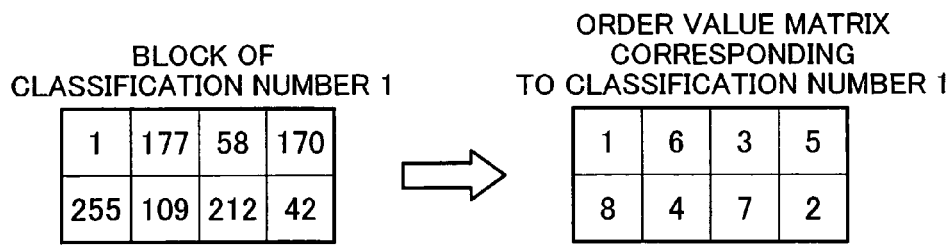
Figure 28C:
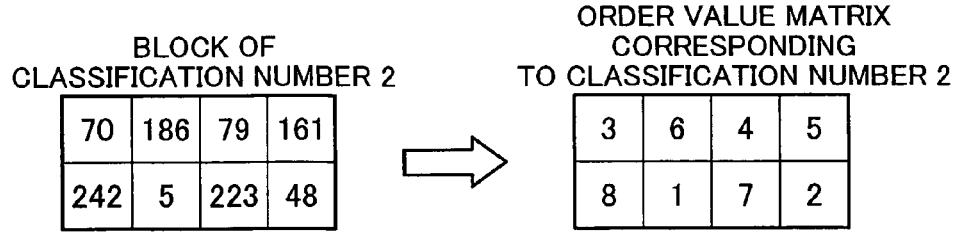

FIGS. 28A to 28C illustrate specifically the method for setting up the order value matrix. The following description makes reference to the drawing. During setup of the order value matrix, first, the dither matrix is divided into a plurality of blocks having the same size as the pixel groups, and each block is assigned a serial number. As described previously with FIGS. 20A to 20C, these serial numbers are simply the pixel group classification numbers. FIG. 28A is an illustration depicting conceptually a dither matrix divided into a plurality of blocks. Where the dither matrix is assumed to have the size depicted in FIG. 18 (i.e.128 pixels in the main scanning direction and 64 pixels in the sub-scanning direction), since a single pixel group has a size of four in the main scanning direction and two pixels in the sub-scanning direction, as shown in FIG. 28A, the dither matrix will be divided into 32 blocks in both the main scanning direction and the sub-scanning direction, so that overall it is divided into 1024 blocks assigned classification numbers from 1 to 1024.

Once the dither matrix has been divided into a plurality of blocks in this way, a single order value matrix is generated from each block. FIG. 28B illustrates by way of example generation of an order value matrix from the block of classification number 1. In the left half of FIG. 28B are shown the threshold values of the dither matrix included in the block of classification number 1. As discussed previously referring to FIG. 25, dots are formed in sequence starting from the pixel for which the smallest threshold value has been established. Consequently, the pixel on which a dot will be formed first in the first block depicted in FIG. 28B can be thought of as the pixel for which the threshold value of "1" has been established. Accordingly, an order value of "1" will be established for that pixel. Similarly, the pixel on which a dot will be formed second can be thought of as the pixel for which the second smallest threshold value of "42" has been established. Accordingly, an order value of "2" will be established for that pixel. By determining order values of "1" to "8" sequentially in this way, starting from the pixel for which the smallest threshold value has been established in the block, the order value matrix of classification number 1 shown in the right half of FIG. 28B may be derived.

FIG. 28C similarly depicts an order value matrix of classification number 2, derived by establishing order values of "1" to "8" in sequence starting from the pixel for which the smallest threshold value has been established in the block. By carrying out the above procedure for all blocks from classification number "1" to "1024" shown in FIG. 28A, order value matrices numbered from classification number "1" to "1024" can be derived.

The color printer 200 of the Embodiment has order value matrices set up in this way, associated with pixel group classification numbers and stored in memory in the ROM housed in the control circuit 260. When carrying out the dot on/off state determination process depicted in FIG. 11, the matrices corresponding to the pixel group classification numbers are loaded from among the order value matrices stored in memory.

C-8: Basic Principle Enabling Appropriate Determination of Dot on/Off State from Multi-Value Quantization Result Values:

As discussed previously, in the image printing process of the Embodiment, multiple pixels are grouped into pixel groups, and by looking up the multi-value quantization table shown by way of example in FIG. 9, Multi-value Quantization Result values are determined on a pixel group-by-group basis. Next, while looking up the conversion table shown by way of example in FIG. 12 and the order value matrix shown by way of example in FIGS. 16A to 16F, pixel locations for forming each type of dot in a pixel group are determined on the basis of the Multi-value Quantization Result value. Even where pixel locations for forming dots have been determined in this way, an image of high picture quality in which dots are dispersed appropriately can be output. Additionally, despite the fact that relatively small groups of pixels are grouped into pixel groups (groups of eight in the present embodiment) for processing, it is nevertheless possible to achieve good dot distribution, such as that attained through the use of a large-scale dither matrix with a pixel count exceeding a thousand, such as a blue noise mask or green noise mask. The basic principle for why this is possible shall be discussed below.

Where the technology taught in the aforementioned Japanese Patent No. 3292104 is employed, by converting image data to large dot density data, intermediate data for medium dot use, and intermediate data for small dot use, and then comparing these with threshold values established in the dither matrix as described previously with FIG. 23 and FIG. 24, dot on/off states for large, medium, and small dots can be decided. Additionally, where the dither matrix looked up at this time is a matrix that has taken dispersion into consideration, such as one typified by a blue noise mask or green noise mask, high quality images with good dispersion of dots can be obtained.

In typical image data, similar (or identical) tone values tend to be assigned to neighboring pixels. In recent years, demand for higher picture quality has been associated with increasingly high resolution for image data, and the tendency for similar or identical tone values to be assigned to neighboring pixels is increasingly noticeable at higher image data resolution. Consequently, even where multiple pixels are grouped together into pixel groups and large/medium/small dot on/off state decisions are made on the assumption that all of the pixels in a pixel group have identical image data, as described previously referring to FIG. 25, in actual practice it is rare for any difference in picture quality to result therefrom.

Here, in the Multi-value Quantization Result value generation process of the present embodiment discussed previously, Multi-value Quantization Result values dependent on pixel group classification number are generated. In combination with the pixel group classification numbers, the Multi-value Quantization Result values generated in this manner constitute data indicating the count of each type of dot formed in pixel groups. For the pixel group shown in FIG. 25, there is generated a Multi-value Quantization Result value that, in combination with the pixel group classification number, indicates that the large dot, the medium dot, and the small dot are formed in numbers of one, two, and one respectively.

Figure 29:
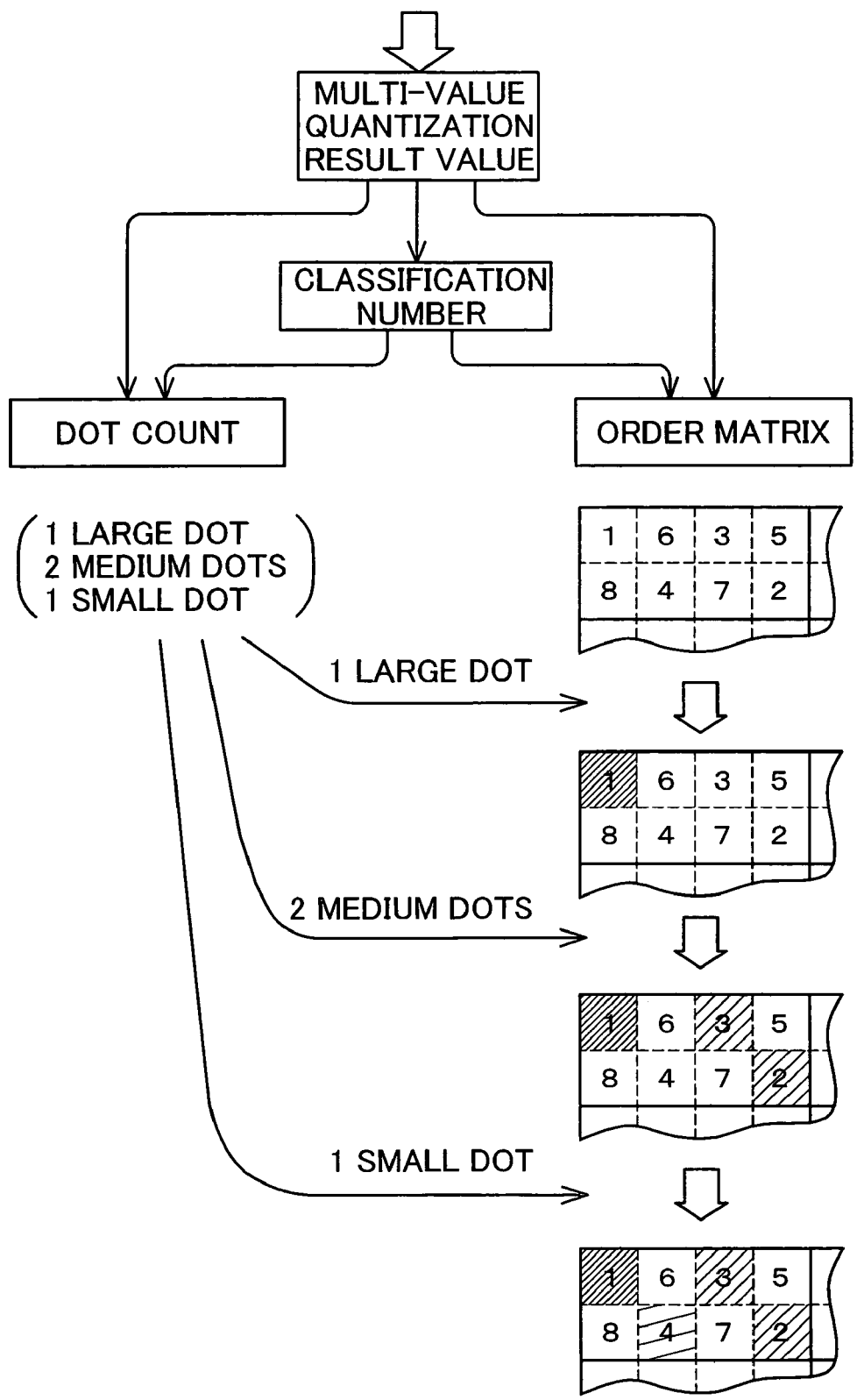
FIG. 29 is an illustration depicting conceptually the general flow of a process for determining large/medium/small dot on/off states on a pixel-by-pixel basis from Multi-value Quantization Result values values in the dot on/off state determination process of the Embodiment.

In the dot on/off state determination process of the Embodiment discussed previously, when such a Multi-value Quantization Result value is received, the on/off states for large/medium/small dots are determined for each pixel in the pixel group. FIG. 29 is an illustration depicting conceptually the general flow of a process for receiving a Multi-value Quantization Result value and determining large/medium/small dot on/off states for each pixel in a pixel group, in the dot on/off state determination process discussed previously. As illustrated, when a Multi-value Quantization Result value is received, the pixel group classification number represented by the result value is derived, after which the numbers of large/medium/small dot formed are acquired and the order matrix is generated on the basis of the Multi-value Quantization Result value and the classification number. The specific method for deriving the classification number will be described later.

Assuming for the purpose of the following discussion that the pixel group is the one depicted in FIG. 25, since the pixel group is situated at the upper left corner of the image, the number 1 is derived as the classification number. By combining the Multi-value Quantization Result value of this pixel group with the classification number derived in this way, it is ascertained that one large dot, two medium dots, and one small dot are formed in the pixel group. In order to determine on which pixels in the pixel group these dots should be formed, the order value matrix of classification number 1 is looked up. This order value matrix is a order value matrix generated from the relevant portion of the dither matrix used for the dot on/off state decisions in FIG. 25, i.e. the relevant portion used for deciding the dot on/off states for each pixel in the pixel group.

On the basis of the large/medium/small dot counts derived in this way and the order value matrix, pixel locations for forming these dots in the pixel group are determined. The specific method for determining pixel locations has been discussed previously with reference to FIGS. 17A and 17B and need not be discussed again here, except to note that as a result, a large dot is formed on the pixel of the order value 1, medium dots are formed on pixels of the order values 2 and 3, and a small dot is formed on the pixel of the order value 4. In FIG. 29, employing the convention of FIGS. 17A and 17B, the pixel on which the large dot is formed is shown with fine hatching, the pixels on which the medium dots are formed are shown with somewhat coarser hatching, and the pixel on which the small dot is formed is shown with coarse hatching. From a comparison of the dot distribution derived in this manner with the dot distribution derived through dot on/off state decisions on a pixel-by-pixel basis shown in FIG. 25, it will be apparent that the two dot distributions match completely.

Specifically, even where only Multi-value Quantization Result values dependent on classification number are received, by determining dot on/off state using the method discussed above, it is possible to derive a dot distribution identical to that derived where large/medium/small dot on/off states are decided on a pixel-by-pixel basis while applying the aforementioned Japanese Patent No. 3292104 and referring to the dither method.

Additionally, the multi-value quantization table looked up in order to generate Multi-value Quantization Result values has been set up on the basis of the dither matrix (see FIG. 27). Similarly, the conversion table and the order value matrices looked up in the process of determining dot on/off states from Multi-value Quantization Result values have been set up on the basis of the dither matrix (see FIGS. 27, 28). Consequently, where a blue noise mask or green noise mask is used as the dither matrix for setting up these tables, it is possible to obtain images of high picture quality, such as could be obtained only through the use of such masks.

The blue noise mask referred to herein is a dither matrix for generating dots irregularly, and refers to a matrix wherein the space frequency of the established threshold value has its largest component in a high frequency band having a cycle of two pixels or less. Naturally, the brighter (higher luminosity) an image is, it is acceptable for there to be instances in which dots are formed in regular patterns in proximity to a specific luminosity. The blue noise characteristics referred to herein refer to these characteristics of the blue noise mask. Furthermore, the green noise mask is a dither matrix for generating dots irregularly, and refers to a matrix wherein the space frequency of the established threshold value has its largest component in an intermediate frequency band having a cycle of from two pixels to ten-plus pixels. Naturally, for the green noise matrix as well, it is acceptable for there to be instances in which dots are formed in regular patterns, where in proximity to a specific luminosity. The green noise characteristics referred to herein refer to these characteristics of the green noise mask.

Figure 30:
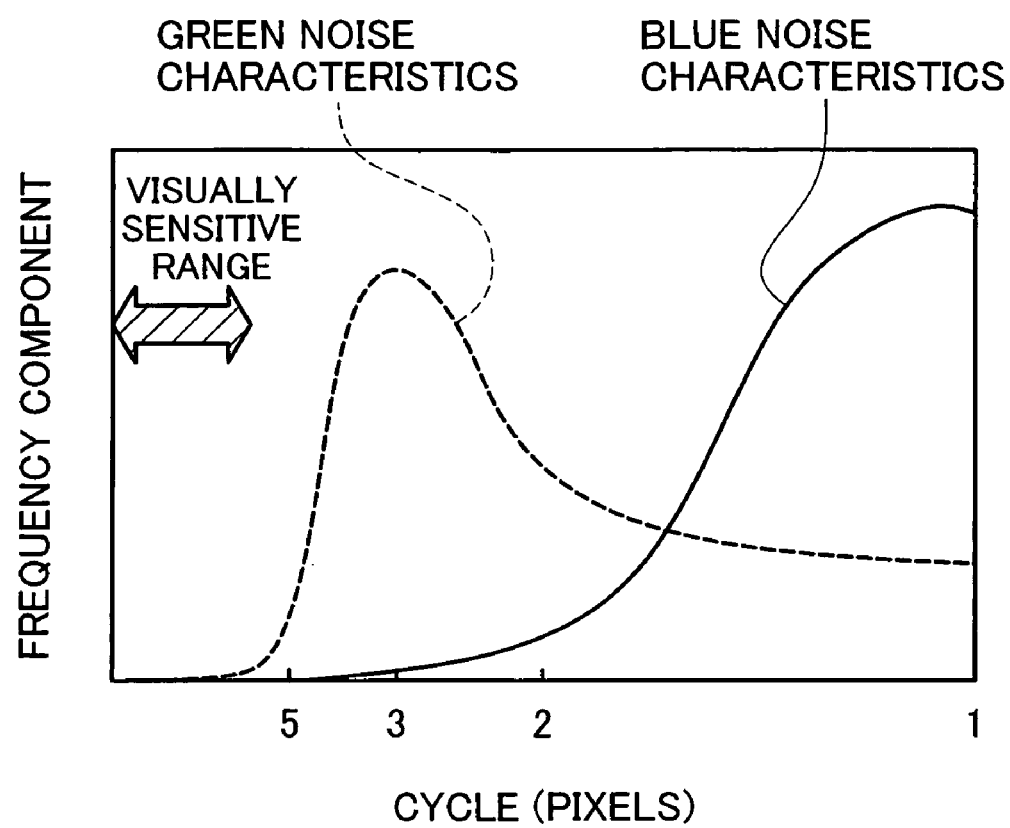
FIG. 30 is an illustration conceptually depicting exemplary space frequency characteristics of threshold values established in the blue noise mask and the green noise mask.

FIG. 30 is an illustration conceptually depicting exemplary space frequency characteristics of threshold values established in the blue noise mask and the green noise mask. In FIG. 30, for convenience in representation, cycle is shown instead of space frequency on the horizontal axis. It goes without saying that the shorter the cycle, the higher the space frequency. The vertical axis in FIG. 30 shows the space frequency components in the respective cycles. The illustrated frequency components are shown in smoothed form, so as to smooth out changes to a certain extent.

The solid line in the drawing shows conceptually the space frequency components of the blue noise mask. As illustrated, the blue noise mask has its largest frequency component in a high frequency band in which the length of one cycle is two pixels or less. Since the threshold value of the blue noise mask is established so that the mask will have these kind of space frequency characteristics, in the event that the dot on-off states have been decided on the basis of the blue noise mask, the dots will tend to be formed in a state discontiguous from one another. The broken line in the drawing shows conceptually the space frequency components of the green noise mask. As illustrated, the green noise mask has its largest component in an intermediate frequency band in which the length of one cycle is from two pixels to ten-plus pixels. Since the threshold value of the green noise mask is established so that the mask will have these kind of space frequency characteristics, in the event that the dot on-off states have been decided on the basis of the green noise mask, since dots are formed contiguously in units of several dots, they will tend to be formed overall in a state of dispersed clusters of dots.

Consequently, where dot on-off states within pixel groups are determined on the basis of such a blue noise mask or green noise mask, despite that fact that processing is carried out in pixel group units, dots will be generated so as to produce a distribution which reflects blue noise characteristics or green noise characteristics, making it possible to output an image of high quality.

C-9. Method of Determining Classification Number from Pixel Group Location:

Here, the method for deriving the classification number of a pixel group from the location of the pixel group on an image shall be described briefly.

FIGS. 31A to 31C illustrate the method for determining classification number on the basis of pixel group location in an image. As shown in FIG. 31A, the pixel group currently targeted is situated at the location of the i-th pixel group in the main scanning direction and the j-th pixel group in the sub-scanning direction, with reference to the uppermost left corner of the image. Let this pixel group location is represented by the coordinates (i, j). Since the size of the dither matrix is typically not large like the image, as discussed previously with reference to FIG. 21B, the dither matrix is used repeatedly while moving it across the main scanning direction.

Since a single dither matrix contains 32 blocks each in the main scanning and sub-scanning directions (see FIG. 18b), where the location of a pixel group of interest is designated as row I, column J in the dither matrix,
I and J can be derived with the following equations:

$$I = i - int(i/32) \times 32 + 1$$

$$J = j - int(j/32) \times 32 + 1$$

Here, int is the aforementioned operator representing rounding off to the decimal point to give an integer. Consequently, by deriving I and J through the application of the above equations to the pixel group coordinates (i, j), it is ascertained that the pixel group is situated at row I, column J in the dither matrix. Thus, the classification number can be derived from:

$$I + (J-1) \times 32 \quad (2)$$

Figure 32:
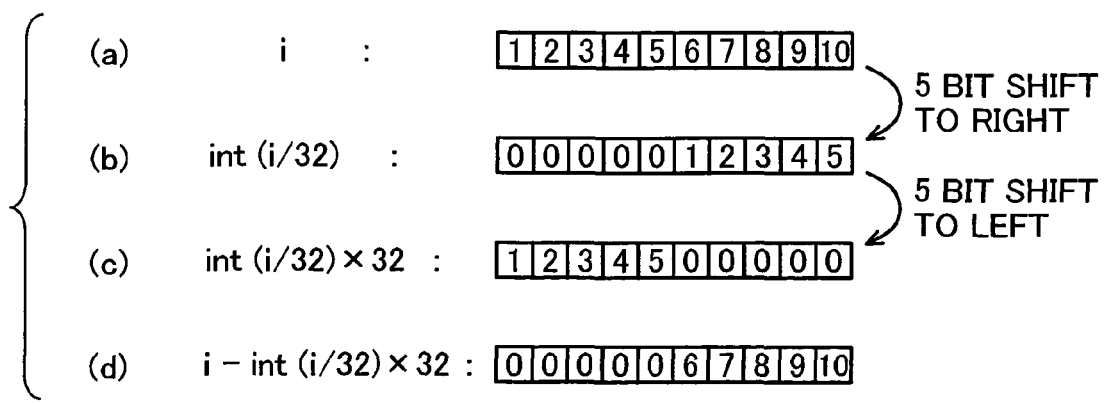
FIG. 32 is an illustration depicting a method for calculating location in the dither matrix from the coordinate values (i, j) of a pixel group, in order to determine the classification number.

The values I, J representing the location of the pixel group in the dither matrix can also be derived extremely simply, even without performing the calculations discussed above, simply by extracting data of prescribed bits from the binary representation of i, j. FIG. 32 illustrates specifically the method for calculating location of a pixel group in the dither matrix, from the coordinate values (i, j) of a pixel group. Zone (a) of FIG. 32 depicts conceptually data expressing the numerical value i in 10-bit binary representation. In Zone (a) of FIG. 32, in order to identify each bit, they are shown assigned serial numbers from 1 to 10, starting from the most significant bit towards the least significant bit.

When deriving the numerical value i which indicates the pixel group location, first, the expression int (i/32) is calculated. This calculation can be accomplished by bit-shifting the binary data of i to the right by the equivalent of 5 bits (see Zone (b) of FIG. 32). Next, the expression int (i/32)×32 is calculated. This calculation can be accomplished by bit-shifting the binary data of int (i/32) to the left by the equivalent of 5 bits (see Zone (c) of FIG. 32)). Finally, by subtracting int (i/32)×32 from the numerical value i, the desired numerical value I can be derived. Since this operation ultimately represents nothing more than extracting only the five lower order bits from the binary data of the numerical value i, it is possible to derive the numerical value I extremely simply. Similarly, the numerical value J can be derived extremely simply, by extracting only the five lower order bits from the binary data of the numerical value j. Where the numerical values I and J have been derived in this way, classification number can now be calculated using the aforementioned equation (2).

The particulars of the Multi-value Quantization Result value generation process (Step S106 of FIG. 6) and the dot on/off state determination process (Step S108 of FIG. 6) performed in the image printing process of the Embodiment have been described in detail above. In the Multi-value Quantization Result value generation process described above, pixels are grouped together in prescribed number to generate a pixel group, and a result value derived by multi-value quantization of the pixel group tone value of the group is generated. During generation of Multi-value Quantization Result values, generation can take place extremely quickly, by means of lookup in the multi-value quantization table. Additionally, the Multi-value Quantization Result values derived in this way are result values dependent on pixel group classification number, but since the amount of data is considerably less than data representing dot on/off state on a pixel-by-pixel basis, the data can be output very quickly from the computer 100 to the color printer 200. That is, in the Multi-value Quantization Result values generation process described above, it is possible for Multi-value Quantization Result value generation and output to be executed quickly, and possible for images to printed out commensurately faster.

Additionally, the process for generating Multi-value Quantization Result values is simply a process of lookup in the multi-value quantization table, and since the classification numbers and pixel group tone values used for lookup in the multi-value quantization table can also be derived by extremely simple processes, processing can be carried out at practicable speed, even when using a device not equipped with high data processing capability like that of a computer 100.

Additionally, since the majority of process content consists of the extremely simple process of lookup in a table, it is a simple matter for it to realized through hardware using an IC chip incorporating a dedicated logic circuit, rather than through software using the CPU, and by so doing to make possible extremely fast processing. Consequently, even in the case of a direct connection between a digital camera 120 or other device which generates image data and the color printer 200, images can be printed quickly by executing the Multi-value Quantization Result value generation internally within the digital camera 120 of the color printer 200.

Meanwhile, in the dot on/off state determination process performed in the image printing process of the Embodiment, when a Multi-value Quantization Result value is received, dot on/off states are determined for each pixel in the pixel group. During determination of dot on/off states, the result value is converted to a combination of dot counts, by means of lookup in the conversion table. Then, by lookup in an order value matrix, locations for forming each type of dot are determined. That is, by means of lookup in the conversion table and the order value matrix, locations for forming each type of dot can be determined quickly.

Normally, as the number of dots it is possible to form increases, the process for determining the locations at which each type of dot will be formed becomes increasingly complex. With the dot on/off state determination process of Embodiment 1, on the other hand, even with an increased number of dot types, the basic process content, namely that of lookup in the conversion table and the order value matrix, remains the same, and the process does not become any more complex. In this respect as well, the dot on/off state determination process of Embodiment 1 can be said to afford simpler and faster processing. Also, as with the Multi-value Quantization Result value generation process described earlier, in the dot on/off state determination process of the present embodiment, since the majority of process content consists of the extremely simple process of lookup in a table, it is a simple matter for it to realized through hardware using an IC chip incorporating a dedicated logic circuit, rather than through software using the CPU, and by so doing to make possible extremely fast processing.

FIGS. 33A to 33E show the change of the storage positions of threshold values in a local matrix according to the pixel group tone value. Each local matrix is a division of the dither matrix and has threshold values as elements corresponding to each pixel group.

FIG. 33B shows a local matrix LMd in the initial state as a division of a blue noise matrix. The order value matrix Ord6 (FIGS. 16A to 16F) is set based on the local matrix LMd. FIG. 33C shows the local matrix LMd that is identical with the initial state after optimization to the input tone value corresponding to the Multi-value Quantization Result value '1' of a pixel group with the classification number '1'. This matrix is used as the basis for creation of the order value matrix Ord1. The method of optimization to part of the input tone values will be described later.

FIG. 33D shows a local matrix LM1 optimized to the input tone value corresponding to the Multi-value Quantization Result value '2' of the pixel group with the classification number '1'. The local matrix LM1 has the change in positions of four threshold values from the local matrix LMd in the initial state. The local matrix LM1 has the positional change between threshold values '15' and '162' and the positional change between threshold values '40' and '116'. The dot arrangement according to the Multi-value Quantization Result value '2' of the pixel group with the classification number '1' accordingly specifies formation of dots in two other pixel positions with no dot formation in the pixel position specified by the dot arrangement according to the Multi-value Quantization Result value '1' of the pixel group with the classification number '1'.

FIG. 33E shows a local matrix LM2 having the further positional change between threshold values '40' and '210' from the local matrix LM1. The local matrix LM2 is used as the basis for creation of the order value matrix Ord3. Such positional change of threshold values has been accomplished for the first time by the inventors of the present application. This concept is not present in the conventional dither matrix at least as a practical matter.

Figure 34:
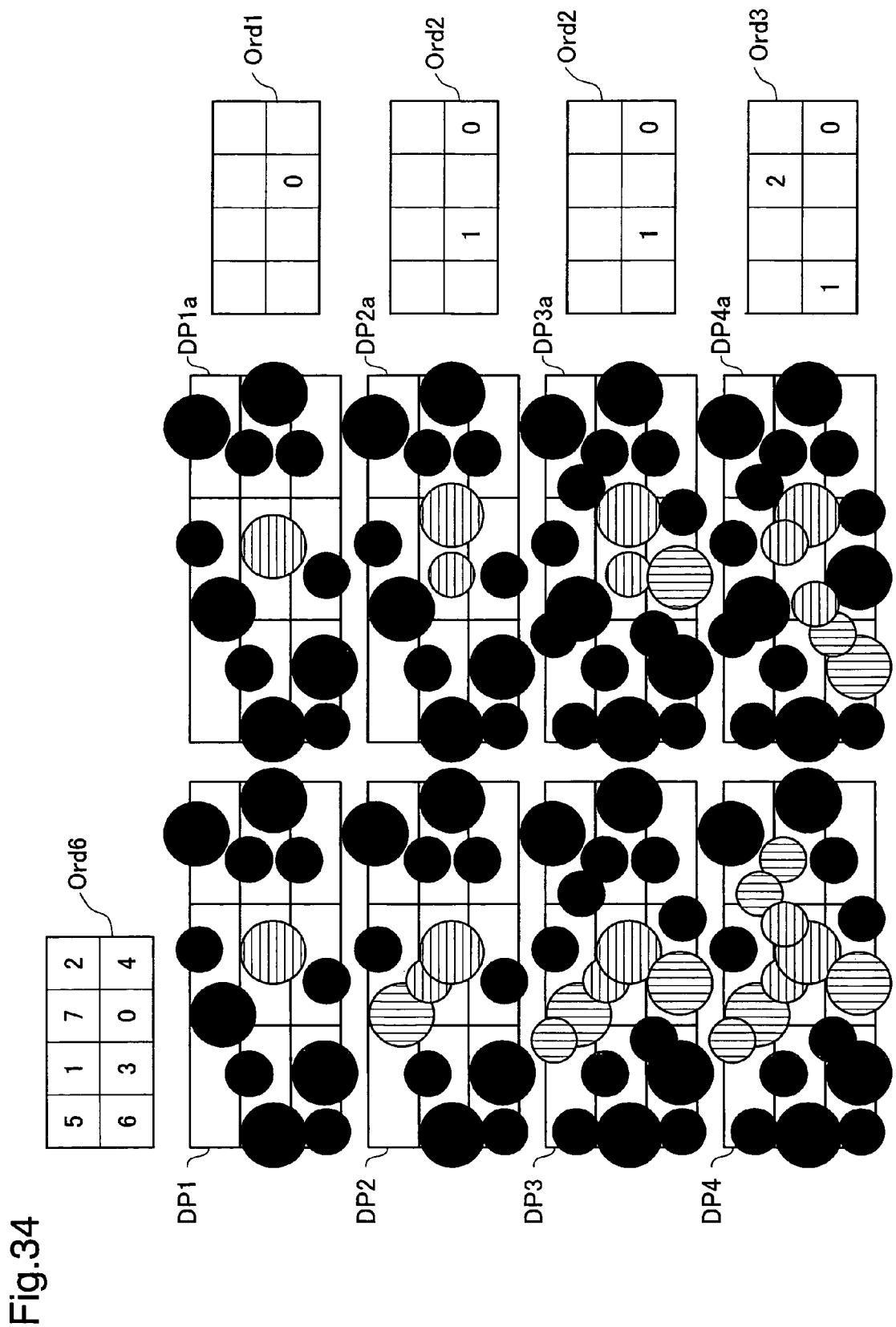
FIG. 34 shows reduction of the granularity by the positional change of threshold values.

FIG. 34 shows reduction of the granularity by the positional change of threshold values. Dot patterns DP1 to DP4 are formed according to the order value matrix Ord6 created on the basis of the local matrix in the initial state. Dot patterns DP1a to DP4a are formed according to the order value matrixes Ord1 to Ord3 created on the basis of the local matrix in the initial state. In the dot patterns DP1 to DP4 and the dot patterns DP1a to DP4a, each dot filled with horizontal lines represents a dot formed in the object local matrix, while each dot filled with vertical lines represents a dot consecutive to the dot formed in the object local matrix.

As clearly understood from FIG. 34, the dot patterns DP1a to DP4a have the less granularities than those of the dot patterns DP1 to DP4. This is because the dot patterns DP1a to DP4a have the lower frequencies of massive dots appearing by formation of consecutive dots than the dot patterns DP1 to DP4. The frequency of the occurrence of such massive dots is reduced by modifying the order value matrix to prevent formation of consecutive dots with consideration of the dot arrangement in an object local matrix. The modification of the order value matrix may be semi-automated by conditioning of the dither matrix according to the method described below.

Figure 35:
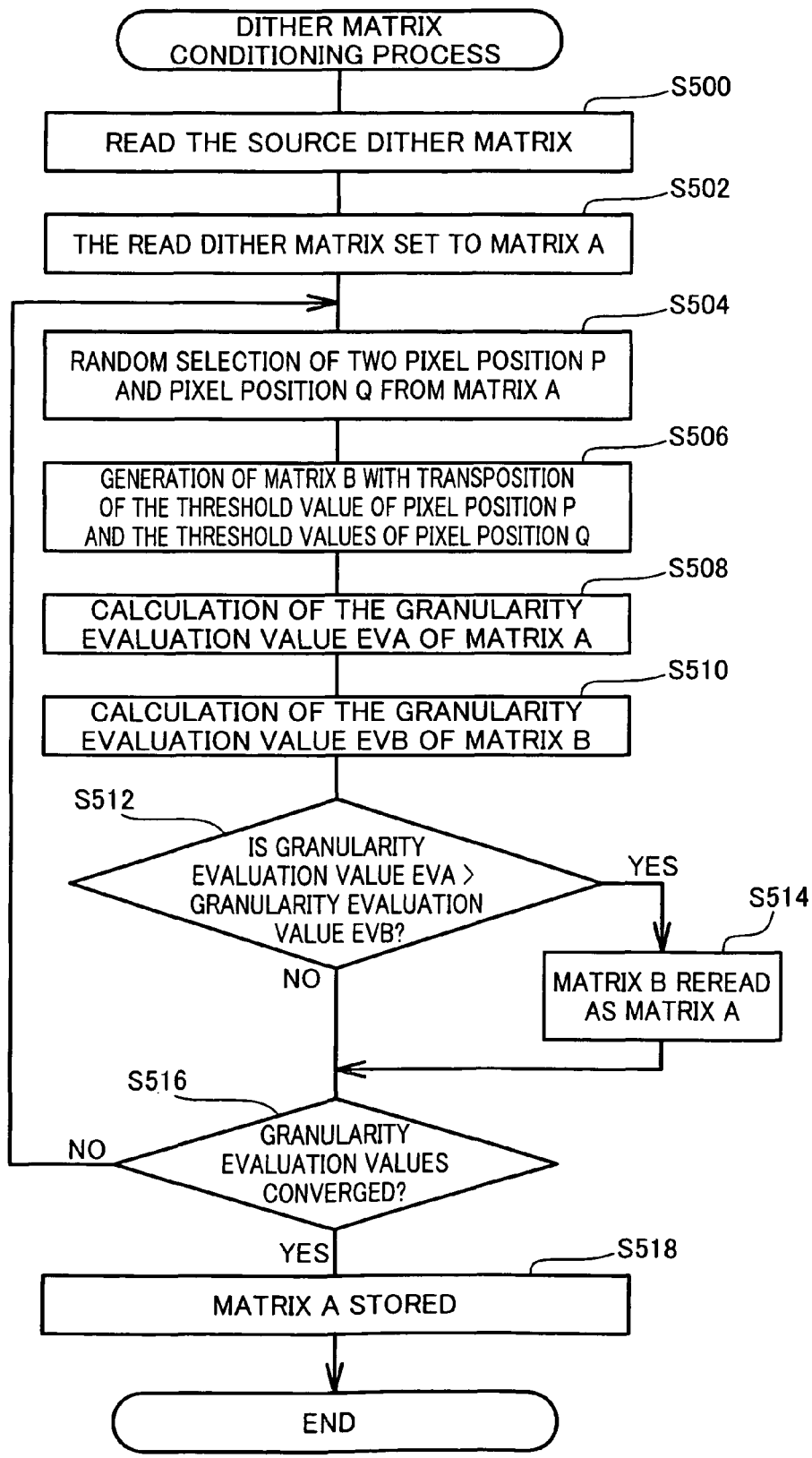
FIG. 35 is a flowchart showing a conditioning process of a dither matrix, which is referred to for creation of the order value matrix in the embodiment.

FIG. 35 is a flowchart showing a conditioning process of a dither matrix, which is referred to for creation of the order value matrix in the embodiment. The following description regards the method of reducing the granularity of target tone values as part of expected input tone values based on an existing dither matrix having the blue noise characteristic.

The dither matrix conditioning process reads the existing dither matrix having the blue noise characteristic as an original dither matrix at step S500. This dither matrix is optimized over the whole range of input tone values to have the blue noise characteristic. Optimization over the whole range of input tone values naturally leads to some compromise in the individual ranges of input tone values.

The dither matrix conditioning process then sets the read dither matrix to a matrix A at step S502 and selects two pixel positions (pixel position P and pixel position Q) at random in an object local matrix at step S504. The object local matrix is a local matrix as an object of optimization. The terminology 'local matrix' here represents each divisional matrix of the dither matrix corresponding to each pixel group.

The dither matrix conditioning process exchanges a threshold value set at the selected pixel position P with a threshold value set at the selected pixel position Q in the object local matrix to prepare a matrix B at step S506. Such exchange of threshold values is limited to the inside of each local matrix. This keeps unchanged the dot count to be formed in a pixel group corresponding to each local matrix.

A granularity evaluation value Eva of the matrix A is computed at step S508. The granularity evaluation value of this embodiment is expressed by RMS granularities in 8 different dot formation states obtained by application of the dither method to images of 8 target tone values (for example, tone values 0 to 7). The RMS granularity shows the standard deviation of a concentration distribution and is readily computable as the standard deviation of low-pass-filtered numerical data of the dot formation state. At step S510, a granularity evaluation value Evb of the matrix B is computed in the similar manner.

The computed granularity evaluation value Eva of the matrix A is compared with the computed granularity evaluation value Evb of the matrix B at step S512. The better dither matrix (having the smaller granularity evaluation value) is selected as the result of comparison. The selection of the better dither matrix is implemented by replacement of the matrix (step S514).

This series of processing (steps S504 to S514) is repeated with a shift of the object local matrix until convergence of the granularity evaluation value. A typical process of identifying convergence of the granularity evaluation value calculates a decrease of the granularity evaluation value, for example, after each determination that the granularity evaluation value Evb of the matrix B is smaller than the granularity evaluation value Eva of the matrix A. When the calculated decrease is stably kept to be not greater than a preset constant value over multiple series of processing, convergence of the granularity evaluation value is identified.

This creates the dither matrix optimized to the 8 target tone values (for example, tone values 0 to 7). The dither matrix may be optimized to any tone values with a change of the target tone values. This technique enables enhancement of the picture quality beyond the limitation of the conventional dither matrix, that is, the limitation in arrangement of the threshold values in the dither matrix due to the requirement for consideration about the whole range of expected input tone values.

D. Variation Examples:

D-1. Variation Example 1:

In the Multi-value Quantization Result value generation process of the Embodiment described hereinabove, a multi-value quantization table storing a corresponding Multi-value Quantization Result values for each pixel group tone value from a tone value of 0 to a tone value of 255 is used for lookup. However, since Multi-value Quantization Result values simply increase in stepwise manner in correspondence relationship with increasing pixel group tone values, it will be possible to derive Multi-value Quantization Result values for pixel group tone values provided merely that those pixel group tone values at which Multi-value Quantization Result values change have been stored in memory. In the image printing process of Variation Example 1 described herein below, the Multi-value Quantization Result value generation process of such a variation example is carried out.

Figure 36:
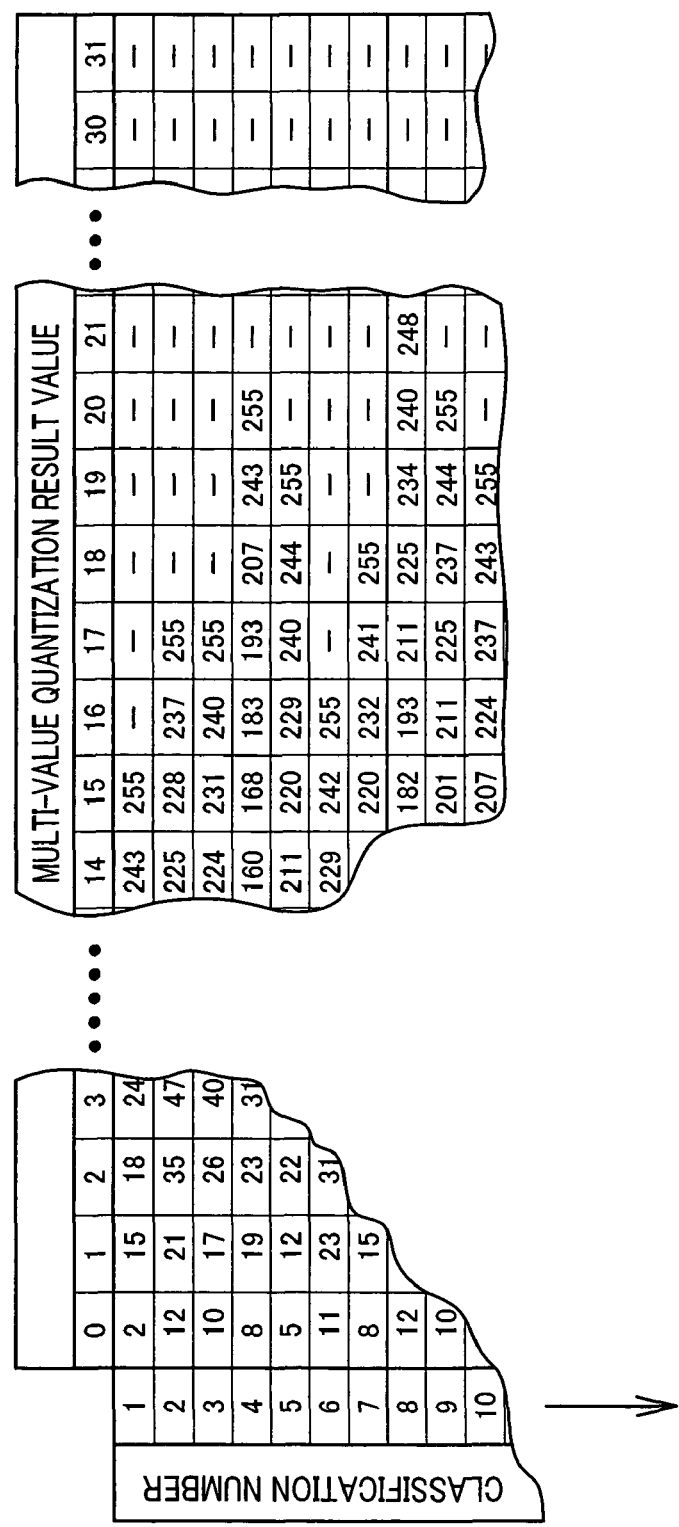
FIG. 36 is an illustration depicting conceptually a threshold value table referred to in the Multi-value Quantization Result value generation process of a variation example.

FIG. 36 is an illustration depicting conceptually a threshold value table referred to in the Multi-value Quantization Result value generation process of the variation example. As shown in the drawing, in the threshold value table, threshold values corresponding to Multi-value Quantization Result values are established on a classification number-by-number basis. This threshold value represents the largest pixel group tone value affording a particular Multi-value Quantization Result value, as the pixel group tone value is increased from a tone value of 0 to a tone value of 255. The discussion shall take the pixel group of classification number 1 as an example. For classification number 1, a threshold value of "2" is established for a Multi-value Quantization Result value of "0." This represents that, for a pixel group of classification number 1, the Multi-value Quantization Result value will be "0" as long as the pixel group tone value is within the range of "0" to "2." A threshold value of "15" is established for a Multi-value Quantization Result value of "1." This represents that, for a pixel group of classification number 1, the Multi-value Quantization Result value will be "1" as long as the pixel group tone value is within the range of "3" to "15." Similarly, a threshold value of "243" is established for a Multi-value Quantization Result value of "14." This represents that the Multi-value Quantization Result value will be "15" as long as the pixel group tone value is within the range of "244" to "255," and that for a pixel group of classification number 1, the maximum value for the Multi-value Quantization Result value is "15."

In FIG. 36, a threshold value for each classification number is established in correspondence relationship with the respective Multi-value Quantization Result value. However, simple threshold value sets may be stored on a classification number-by-number basis, without being associated with Multi-value Quantization Result values. In this case, a Multi-value Quantization Result value can be derived by counting the number of threshold values smaller than a particular pixel group tone value. This shall be described, again taking the example of the pixel group of classification number 1. For example, let the pixel group tone value be "20." In the set of threshold values established for classification number 1, there are three threshold values smaller than the tone value of 20, namely, "2," "15," and "18." From this it may be determined that the Multi-value Quantization Result value for the pixel group tone value of 20 is "3."

In the Multi-value Quantization Result value generation process of the variation example described above, once a pixel group tone value and a classification number for a pixel group have been derived, a Multi-value Quantization Result value is generated by means of lookup in the threshold value table depicted in FIG. 36. This threshold value table can store a smaller amount of data than does the multi-value quantization table used for lookup in the Multi-value Quantization Result value generation process of the Embodiment (see FIG. 9). Thus, as compared to the process of the Embodiment, the Multi-value Quantization Result value generation process of the variation example is able to use less memory capacity. In contrast, in the Multi-value Quantization Result value generation process of the Embodiment, Multi-value Quantization Result values can be derived immediately simply by lookup from classification numbers and pixel group tone values in the multi-value quantization table. That is, it is possible for multi-value quantization to be faster, since there is no need to compare pixel group tone values with threshold values as in the process of the variation example.

D-2. Variation Example 2:

In the dot on/off state determination process of the Embodiment described previously, when a pixel group classification number and a Multi-value Quantization Result value are received, these are initially converted to data representing the number of each type of dot to be formed in the pixel group. Then, when deciding the dot on/off state, it is determined for each dot type whether a dot or dots should be formed on any pixel or pixels in the pixel group. For example, in the flowchart shown in FIG. 11, the dot on/off state is decided for each dot type, first deciding the dot on/off state for the large dot, then deciding for the medium dot, and finally deciding for the small dot. However, the method of deciding dot on/off state is not limited to this method. For example, selecting one pixel at a time within a pixel group, it could be decided whether to form a large, medium, or small dot thereon, or to form no dot at all. In the image printing process of Variation Example 2 described herein below, the dot on/off state determination process of such a variation example is carried out.

Figure 37:
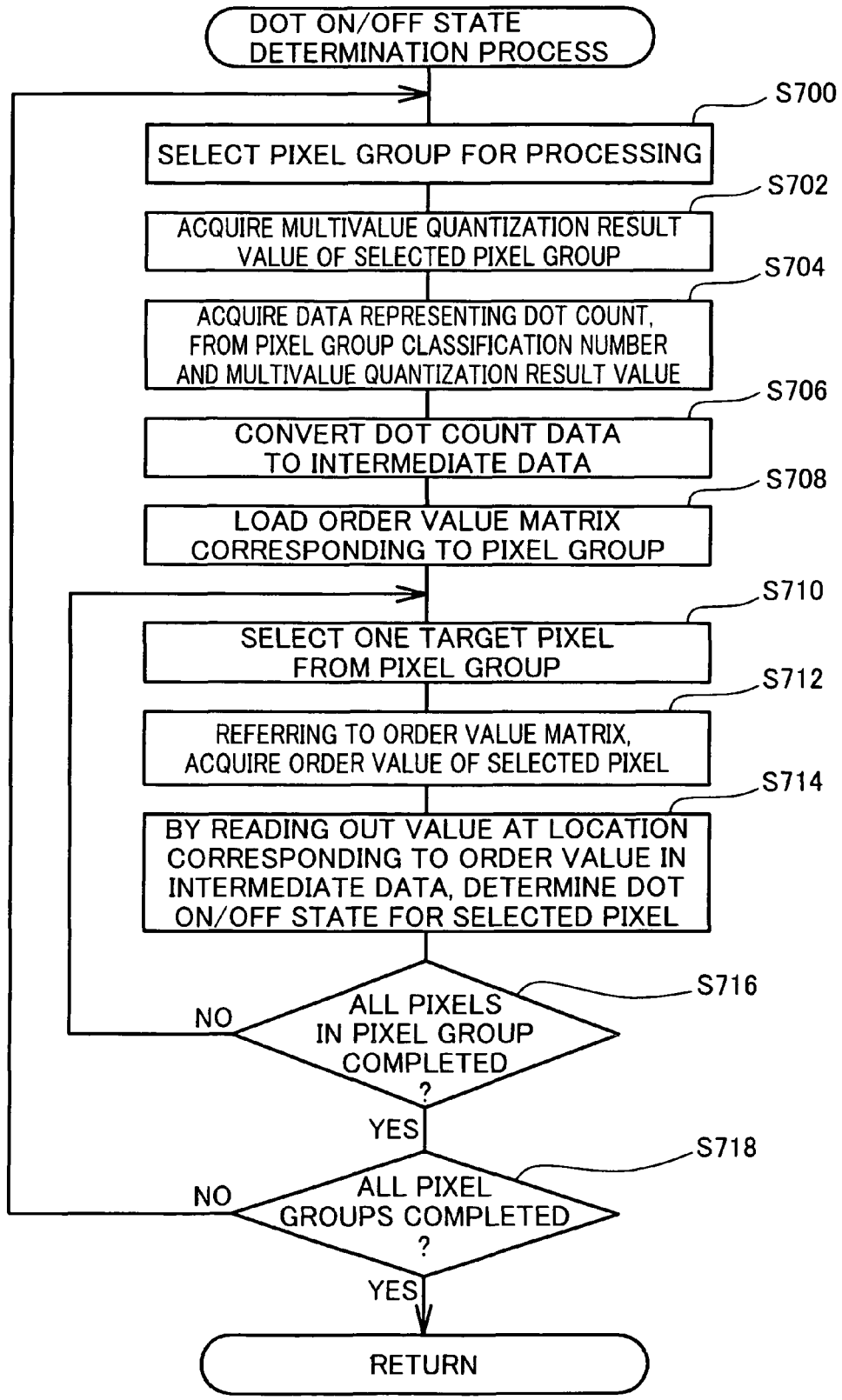
FIG. 37 is a flowchart depicting the flow of the dot on/off state determination process of a variation example.

FIG. 37 is a flowchart depicting the flow of the dot on/off state determination process of the variation example. The description of the dot on/off state determination process of such a variation example hereinbelow shall follow the flowchart.

As in the process of the Embodiment described previously, in the dot on/off state determination process of the variation example, when the process is initiated, first, one pixel group is selected for processing (Step S700). Next, the Multi-value Quantization Result value of the selected pixel group is acquired (Step S702), and on the basis of the pixel group classification number and the Multi-value Quantization Result value, data representing dot counts to be formed in the pixel group is acquired (Step S704). The dot count data can be acquired quickly, from the combination of the classification number and the Multi-value Quantization Result value, by looking up in the conversion table shown in FIG. 12.

In the dot on/off state determination process of the variation example, the dot count data acquired in this way is initially converted to intermediate data of 16-bit length (Step S706). Specifically, in the conversion table of FIG. 12, in order to reduce the amount of data it is represented as code value of 8-bit length; in the dot on/off state determination process of the variation example, however, it is initially converted to intermediate data represented in a format that enables the dot on/off state to be determined more easily. Here, reason for the 16-bit data length of the intermediate data is that the pixel count in the pixel groups is eight, and the dot on/off state for each pixel can be represented on two bits. In other words, with each two bits of the intermediate data constituting one set, the data represents the dot count with eight sets of data corresponding to the pixel count. Where the dot count to be formed in a pixel group is represented in this way, correspondence relationship with pixels becomes easy (as will be described later), and thus it is possible to determine dot on/off states easily. In the dot on/off state determination process of the variation example, correspondence relationships of dot counts with intermediate data are pre-stored in memory, and in Step S706, the intermediate data is acquired by looking up these correspondence relationships.

FIG. 38 is an illustration depicting an correspondence relationship table in which intermediate data is associated with code value representing dot counts. Since code value like that described above is associated with combinations of dot counts for each dot type (see FIG. 13), where converted to a representation format in which dot type is represented in sets of 2 bits each, and these bit sets are arrayed in a number corresponding to the dot count, the result is 16-bit data. The intermediate data of 16-bit data length is data derived by conversion of the code value representation format in this way.

For example, code value of "1" represents the combination of zero large dots, zero medium dots, and one small dot. For reference, the dot count combinations represented by the respective code value are shown at left in FIG. 38. Where the 2-bit data representing the small dot is "01," the 16-bit data corresponding to code value of "1" will include only one "01" set, with the other seven sets of 2-bit data being "00." 2-bit data of "00" is data representing that no dot is formed.

Similarly, code value of "163" represents the combination of seven large dots, one medium dot, and zero small dots. Where the 2-bit data representing the large dot is "11" and the 2-bit data representing the medium dot is "10," the 16-bit data corresponding to code value of "163" will include seven sets of the 2-bit data "11" and one set of the 2-bit data "10."

The 2-bit data is established right-aligned in the sequence: large dot, medium dot, small dot. For example, where the dot count combination is one large dot, two medium dots, and three small dots, in the eight sets of 2-bit data, one set of the 2-bit data "11" representing the large dot will be established at the right end; continuing to the left thereof, there will be established two sets of the 2-bit data "10" representing the medium dot; continuing further to the left thereof, there will be established three sets of the 2-bit data "01" representing the small dot; and in the remaining two sets there will be established the 2-bit data "00" representing that no dot is to be formed. The 2-bit data could be left-aligned instead. That is, it would be acceptable for the data to be established from the left end in the sequence: large dot, medium dot, small dot.

In Step S706 of the dot on/off state determination process of the variation example shown in FIG. 37, the process for converting data representing dot counts to intermediate data is carried out by means of looking up the correspondence relationships shown in FIG. 38. In the preceding description, once a combination of a classification number and a Multi-value Quantization Result value has been converted to 8-bit code value by means of lookup in the conversion table shown in FIG. 12, the code value is converted to 16-bit intermediate data on the basis of the correspondence relationships shown in FIG. 38. Since there is a one-to-one correspondence between the code value and the intermediate data, it would be possible to establish 16-bit intermediate data rather than 8-bit code value in the conversion table shown in FIG. 12, and to acquire 16-bit intermediate data directly on the basis of the pixel group classification number/multi-value quantization result value combination. While this would mean a larger amount of data in the conversion table, the intermediate data could be derived quickly.

Once the intermediate data has been acquired in the above manner, the order value matrix is generated based on the classification number and the tone value representative of the pixel groups (Step S708), a single pixel is selected for determination of dot on/off state from within the pixel group (Step S710), and the order value established in the order value matrix for the selected pixel location is acquired (Step S712).

Figure 39:
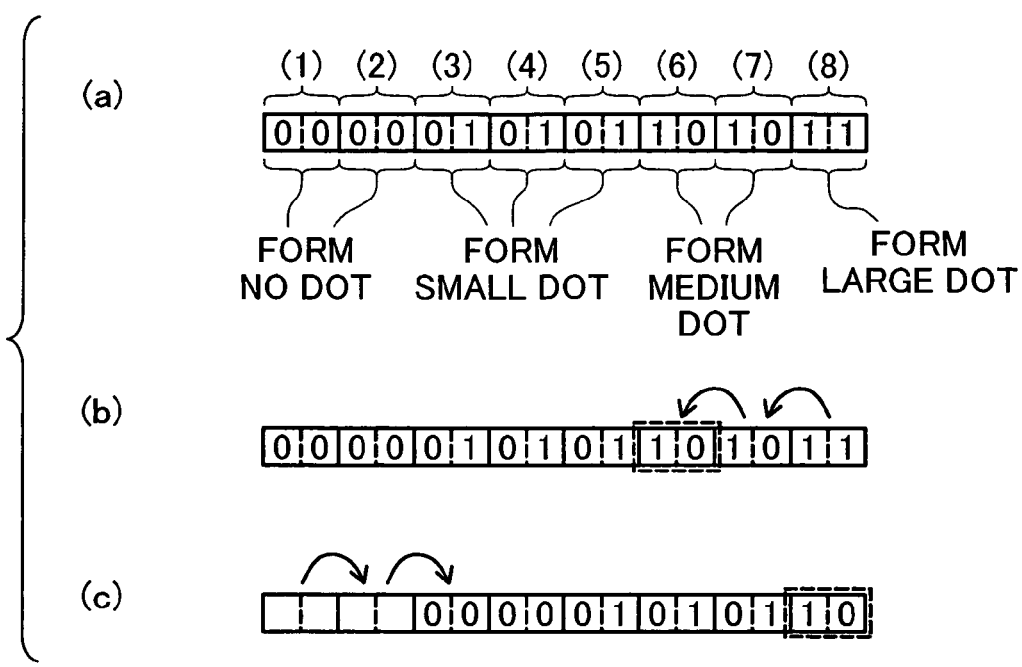
FIG. 39 is an illustration depicting determination of dot on/off state by means of reading out at data at a location corresponding to an order value in the intermediate data.

Next, from the previously acquired intermediate data, the 2-bit data established at the location corresponding to the order value is read out, in order to determine the dot on/off state for the selected pixel (Step S714). FIG. 39 is an illustration depicting determination of dot on/off state by means of reading out at data at a location corresponding to an order value in the intermediate data. Zone (a) of FIG. 39 shows an example of intermediate data derived by conversion of data for dot counts to be formed in a given pixel group. As mentioned previously, the intermediate data is data of 16-bit length, composed of eight sets of 2-bit data. The intermediate data shown in Zone (a) of FIG. 39 includes one set of the 2-bit data "11" representing the large dot, two sets of the 2-bit data "10" representing the medium dot, three sets of the 2-bit data "01" representing the small dot, and two sets of the 2-bit data "00" representing that no dot is to be formed, with the 2-bit data having been established right-aligned in the sequence: large dot, medium dot, small dot.

Let the order value of the pixel for which dot on/off state is being determined be "3." In this case, the type of dot to be formed on the pixel of order value 3 can be determined by reading out the 2-bit data established in the third set from the right in the intermediate data. Zone (b) of FIG. 39 depicts conceptually reading out of the 2-bit data in the third set from the right end of the intermediate data. In the illustrated example, since the read out 2-bit data is "10," is it decided to form a medium dot on this pixel. If the order value had been "1," the 2-bit data established at the right end of the intermediate data would be read out, and it would be decided to form a large dot.

In this way, in the dot on/off state determination process of the variation example, dot on/off states can be determined by an exceptionally simple procedure, namely, of reading out from the intermediate data 2-bit data that has been established at locations corresponding to the order values. The reason for this is as follows. First, in the intermediate data, 2-bit data representing the large dot, medium dot, and small dot is established right-aligned. Meanwhile, in the process for determining large/medium/small dot on/off states using the dither process as illustrated in FIG. 23 or FIG. 25, dot on/off states are determined in the sequence large dot, medium dot, small dot. Consequently, by reading the 2-bit data from the intermediate data sequentially starting from the right end, a string of 2-bit data representing the large dot, medium dot, small dot can be derived in the same sequence as that in which pixel locations for forming each dot type have been determined through application of the method described previously using FIG. 23 or FIG. 25.

D-3. Variation Example 3

Figure 40:
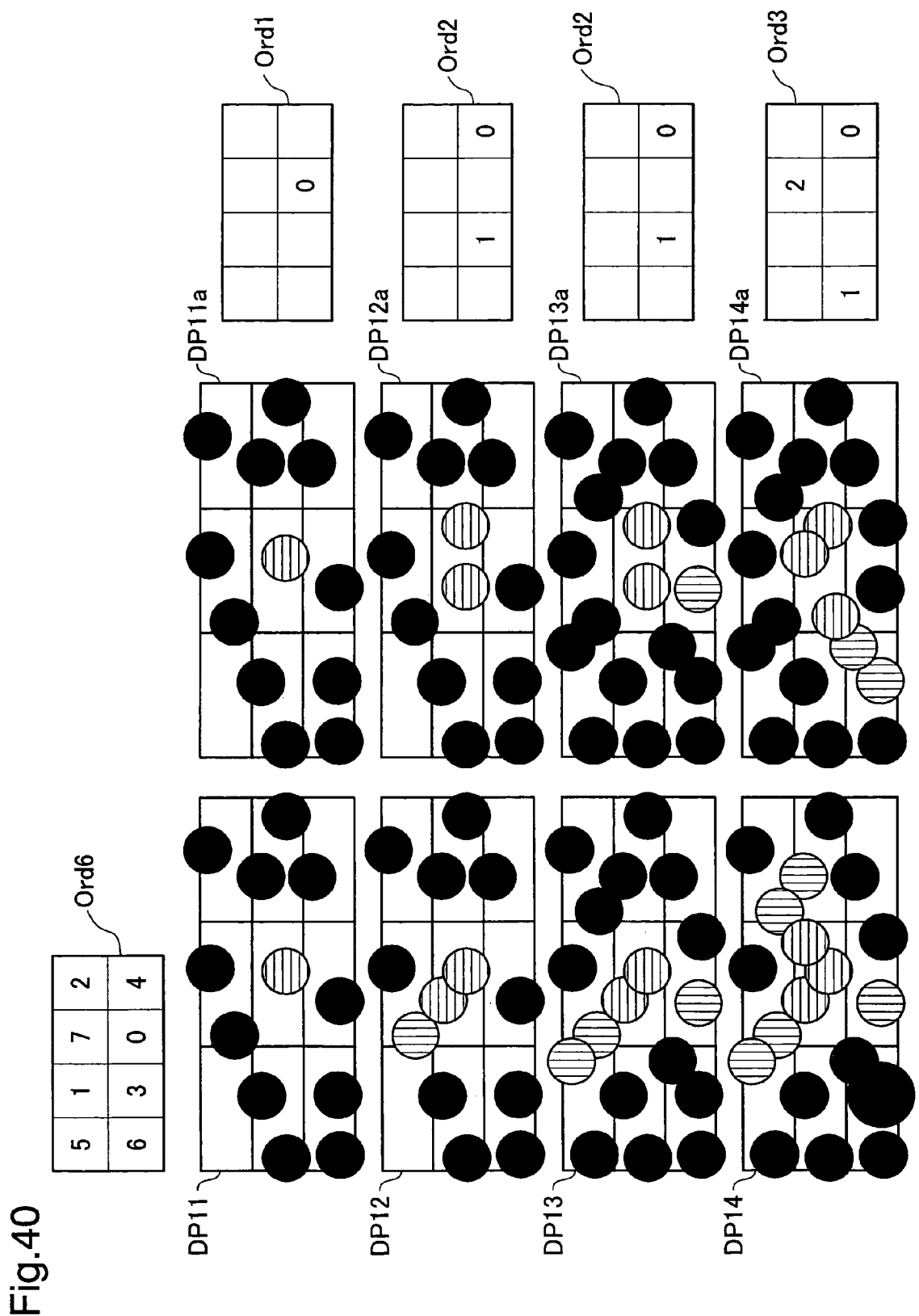
FIG. 40 shows reduction of the granularity by the positional change of threshold values for printers capable of forming only one type of dots.

The embodiment and its variation examples regard the printer that is capable of forming three variable-size dots, the large-size dot, the medium-size dot, and the small-size dot. The technique of the invention is also applicable to printers that are capable of forming four or more different types of dots, to printers that are capable of forming two different types of dots, and to printers that are capable of forming only one type of dots as shown in FIG. 40.

Application of the invention to the printer forming only one type of dots does not require the determination of the dot on-off state with regard to the respective size dots by the dither technique (FIGS. 23 and 25). This leads to non-requirement for generation and supply of dot count data as well as the concept of order in the order value matrix. The dot formation positions in each pixel group are thus determinable only according to the classification number and the position number (see FIGS. 15A and 15B). This attains printing of the optimum dot dispersion in each input tone value range (or at each input tone value) with extremely little processing load.

D-4. Variation Example 4

In the embodiment and its variation examples described above, the halftone process is performed for each of multiple pixel groups obtained by division of a printing image. Like the conventional dither technique, the halftone process may alternatively be performed for each pixel with multiple dither matrixes optimized in respective partial ranges of input tone values. The halftone process in the embodiment and the above variation examples, however, advantageously requires the less processing load than the conventional dither technique.

The dither matrix may include multiple different dither matrixes optimized in individual ranges. For example, when the input tone value varies from 0 to 255, each range may have a predetermined width of input tone values, such as 0 to 7 or 8 to 15, or may be equivalent to each input tone value. The storage positions of the threshold values may be changed in only a specific range having a high potential of halftone-induced picture quality deterioration, that is, in a range of low dot density.

The terminology 'halftone process on the image data with a preset dither matrix' in claims is used in a wide sense and includes a procedure of generating dot data according to data (for example, the count data conversion table shown in FIG. 12) based on the preset dither matrix or according to the order value matrix conversion table (FIG. 14) based on the preset dither matrix.

In the embodiment and its variation examples described above, the count data conversion table and the order value matrix conversion table are provided by comparison between the threshold value set in the dither matrix and the tone value of image data with regard to each pixel. One possible modification may compare the sum of the threshold value and the tone value with regard to each pixel with a fixed value to determine the dot on-off state in the pixel and provide the respective tables (see FIGS. 12 and 14).

D-5. Variation Example 5

The above embodiment adopts the low-pass filtering process and evaluates the optimality of the dither matrix based on the uniformity of dot density and the RMS granularity. One possible modification may perform the Fourier transform of the dot pattern and uses the VTF function to evaluate the optimality of the dither matrix. A concrete procedure may apply the evaluation scale (grain scale: GS value) by Dooley et al, Xerox Corp. to the dot pattern and use the GS value to evaluate the optimality of the dither matrix. The GS value is the granularity evaluation value obtained by quantifying the dot pattern by a preset series of processing including two-dimensional Fourier transform, cascading the quantified dot pattern with a visual spatial frequency characteristic VTF, and integrating the cascade (reference: Fine Imaging and Hard Copy, Corona Publishing Co., Ltd., Edited by Publishing Correspondence relationship of Society of Photographic Science and Technology of Japan with the Imaging Society of Japan). The method of the embodiment, however, has the advantage of non-requirement for any complicated calculations including Fourier transform. The GS value is also called the granularity index.

The embodiment and its variation examples discussed above are to be considered in all aspects as illustrative and not restrictive. There may be many modifications, changes, and alterations without departing from the scope or spirit of the main characteristics of the present invention. For example, the above embodiment and variation examples regard formation of dots on printing paper to print an image. The technique of the invention is, however, not restricted to such image printing but may favorably be applied to liquid crystal display apparatuses that disperse bright points at adequate densities on a liquid crystal screen to express an image of continuously varying tones.

D-6. Variation Example 6

The process of the above embodiment switches the order value matrixes for all the output pixel groups. The range of switching the order value matrixes may be limited to half of the output pixel groups selected in a checker pattern or to even ¼ of the output pixel groups. According to the inventors' experiments, the effects were saturated in the case of switching the order value matrixes for half of the output pixel groups and were sufficient in the case of switching the order value matrixes for even ¼ of the output pixel groups. The dot arrangement specification step of the invention requires the switch of multiple order value matrixes with regard to at least part of the output pixel groups.

D-7. Variation Example 7

For the purpose of optimization, the process of the above embodiment exchanges the storage positions of the threshold values in the local block of the dither matrix with regard to a partial range of the input tone values. One possible modification may exchange the order values stored in the order value matrix to directly optimize the order value matrix with regard to a partial range of the input tone values.

D-8. Variation Example 8

As shown in FIG. 29, the dot on-off state determination process specifies the classification number of each pixel group corresponding to the received Multi-value Quantization Result value of the pixel group and determines the counts of the respective types of dots to be formed in the pixel group according to the combination of the Multi-value Quantization Result value and the classification number. The positions of the dot-on pixels with regard to the respective types of dots are determined by referring to the order value matrix corresponding to the classification number. Namely specification of the Multi-value Quantization Result value and the classification number of one pixel group determines the counts of the respective types of dots to be formed in the respective pixels included in the pixel group. The counts of the respective types of dots to be formed in respective pixels of each pixel group are specified and stored in advance as a map corresponding to each combination of the Multi-value Quantization Result value and the classification number. The dot on-off state of each pixel group is then readily determinable by simply referring to this map. The dot on-off state determination process of Variation Example 8 adopts this conceptual approach and quickly determines the dot on-off state in respective pixels of each pixel group according to the Multi-value Quantization Result value of the pixel group.

FIG. 41 conceptually shows a conversion table referred to in the dot on-off state determination process in Variation Example 8. In the conversion table of Variation Example 8, data representing the dot type to be formed in each pixel included in each pixel group is set corresponding to each combination of the Multi-value Quantization Result value and the classification number. This data is referred to as dot data in the following description. The conversion table of FIG. 41 immediately gives dot data corresponding to the combination of the pixel group classification number and the multi-value quantization result value. For example, a combination of the classification number 'i' and the multi-value quantization result value 'j' gives corresponding dot data DD(i,j). The dot data represents the dot formation state in the respective pixels of each pixel group.

Figures 42A, 42B:
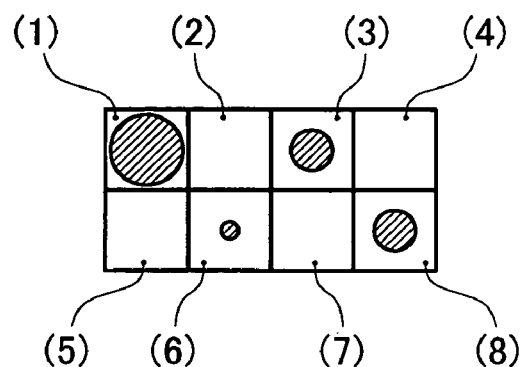
FIGS. 42A and 42B shows the data structure of the dot data set in the conversion table of Variation Example 8.

FIGS. 42A and 42B shows the data structure of the dot data set in the conversion table of Variation Example 8. As shown in FIG. 42A, the dot data has a 16-bit length and includes 8 sets of 2-bit data. One dot data consists of 8 sets of data, since one pixel group includes 8 pixels in the image printing process of this embodiment. In another example, when one pixel group includes 4 pixels, one dot data consists of 4 sets of data. Each set of data is 2-bit data, because the color printer 200 of this embodiment is capable of expressing one of the four different states in each pixel, that is, 'formation of the large-size dot', 'formation of the medium-size dot', 'formation of the small-size dot', and 'formation of no dot'. These four different states in each pixel are expressible by 2-bit data. Each data set corresponding to one pixel accordingly has the 2-bit data length.

As shown in FIGS. 42A and 42B, the 8 sets of data constituting the dot data respectively correspond to pixels at predetermined positions in each pixel group. For example, the 1$^{st}$ set of data at the head of the dot data shown in FIG. 42A corresponds to a left-most pixel on the upper row in the pixel group as shown in FIG. 42B. The 2$^{nd}$ set of data at the 2$^{nd}$ position of the dot data corresponds to a second left pixel on the upper row in the pixel group. In this manner, the 8 sets of data in the dot data are related to the pixels at the predetermined positions in the pixel group.

Each set of data represents the dot type to be formed in the corresponding pixel. The 2-bit data '11', '10', '01', and '00' respectively represent 'formation of the large-size dot', 'formation of the medium-size dot', 'formation of the small-size dot', and 'formation of no dot'. The dot data of FIG. 42A accordingly indicates formation of the large-size dot in the left-most pixel on the upper row in the pixel group, formation of the medium-size dot in the third left pixel on the upper row, formation of the small-size dot in the second left pixel on the lower row, formation of the medium-size dot in the right-most pixel on the lower row, and no formation of any dots in the remaining pixels.

The dot on-off state in the respective pixels of each pixel group is readily determinable according to the combination of the classification number and the Multi-value Quantization Result value of the pixel group by simply referring to this conversion table. A concrete process of determining the dot on-off state in the respective pixels of each pixel group according to the Multi-value Quantization Result value is described briefly in Variation Example 8.

Figure 43:
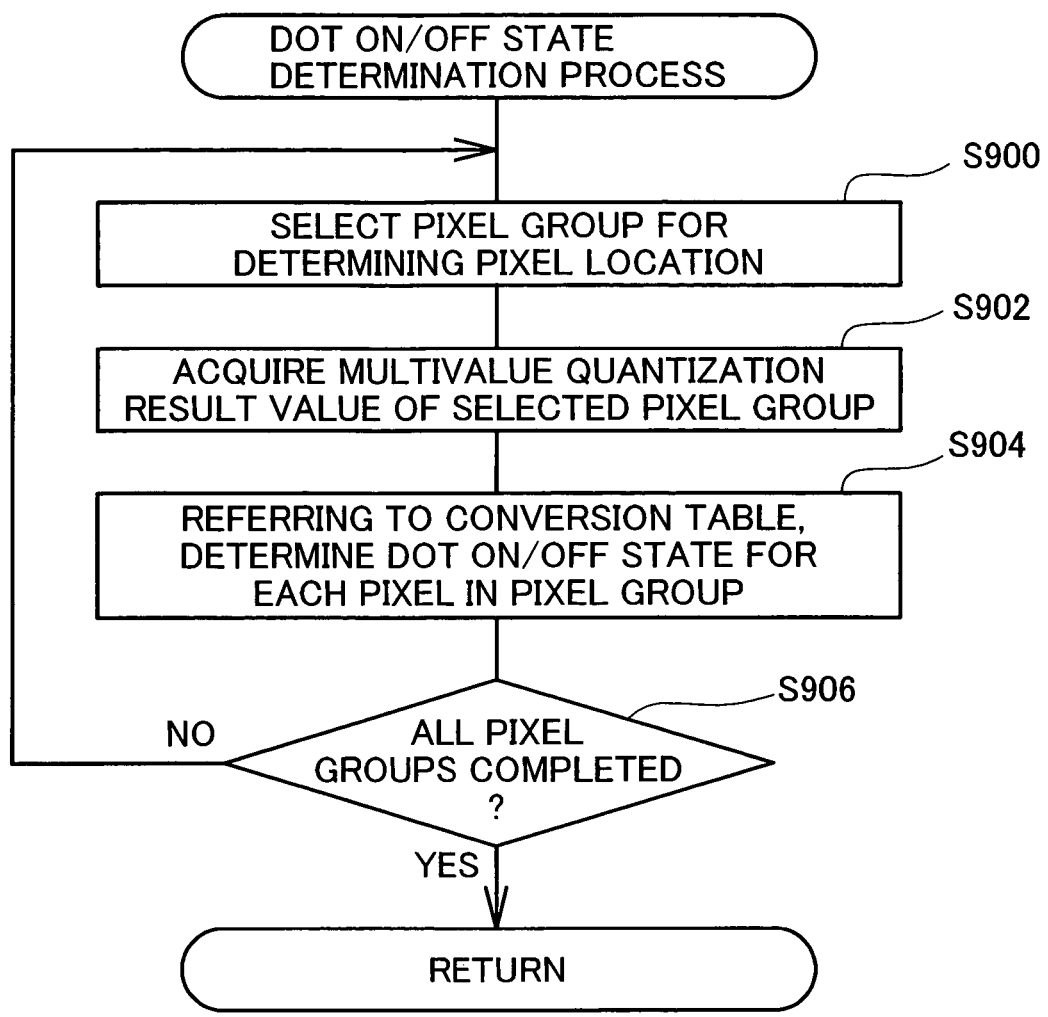
FIG. 43 is a flowchart showing the dot on-off state determination process in Variation Example 8.

FIG. 43 is a flowchart showing the dot on-off state determination process in Variation Example 8. The dot on-off state determination process in Variation Example 8 first selects one pixel group as a processing object (step S900) and obtains a Multi-value Quantization Result value of the selected pixel group (step S902). The classification number of the pixel group is computed according to the requirement. The dot data representing the dot on-off state in the respective pixels of the pixel group is read corresponding to the combination of the classification number and the Multi-value Quantization Result value by referring to the conversion table of FIG. 41 (step S904). The dot on-off state determination process in Variation Example 8 simply reads the dot data stored at the corresponding position in the conversion table to determine the dot on-off state in the respective pixels of each pixel group.

The dot on-off state determination process in Variation Example 8 then identifies complete or incomplete determination of the dot on-off state with regard to all the pixel groups (step S906). When there is any unprocessed pixel group (step S906: no), the dot on-off state determination process goes back to step S900 to select another pixel group and executes the subsequent series of processing with regard to the newly selected pixel group. Upon completion of the processing with regard to all the pixel groups (step S906: yes) after the repeated processing, the processing flow exits from the dot on-off state determination process in Variation Example 8 shown in FIG. 43.

The dot on-off state determination process in Variation Example 8 simply refers to the conversion table only once to immediately determine the dot on-off state in the respective pixels of each, pixel group according to the Multi-value Quantization Result value. This enables the easier and quicker determination of the dot on-off state and ensures the higher-speed image output, compared with even the dot on-off state determination process of the embodiment shown in FIG. 11.

Finally, the present application claims the priority based on Japanese Patent Application No. 2005-334419 filed on Nov. 18, 2005 is herein incorporated by reference.

What is claimed is:

1. An image processing method of processing image data indicative of an image represented with a prescribed number of input tones by each of pixel groups composed of a plurality of print pixels, and generating dot data representing a dot on-off state of dot formation on each of the print pixels to be formed on a print medium, the method comprising:

preparing a first conversion table containing first correspondence relationships of pixel group tone values representing tone values of the pixel groups and multi-value quantization result values assuming a prescribed range of values, the first correspondence relationships being prepared for each of the pixel groups;

preparing a second conversion table containing second correspondence relationships of output dot arrangements indicative of a dot on-off state for each pixel in the pixel groups and the multi-value quantization result values, the second correspondence relationships being prepared for each of the pixel groups;

determining the pixel group tone value in response to input tone values corresponding to the pixel group, among the image data;

converting the determined pixel group tone value into the multi-value quantization result values for each of the pixel groups, by referring to the first conversion table;

transforming the acquired multi-value quantization result value into the output dot arrangement for each of the pixel groups, by referring to the second conversion table; and outputting the dot data in response to the output dot arrangement, wherein the first correspondence relationships and the second correspondence relationships are configured to make a state of dot formation close to either one of blue noise characteristics and green noise characteristics over a whole range of the input tone values, wherein dot positions of at least part of the output dot arrangements are changed within each pixel group so that a decrease of a granularity evaluation value of the state of dot formation to a granularity evaluation value of the state of dot formation provided by referring to the first and second conversion table is not greater than a preset value to make the state of dot formation closer to either one of blue noise characteristics and green noise characteristics with regard to a partial range of the input tone values corresponding to each of the output dot arrangements, wherein the second conversion table includes a third conversion table and a fourth conversion table, the third conversion table containing third correspondence relationships of dot count data indicative of a number of dots of a single size and code values, the fourth conversion table containing fourth correspondence relationships of order value matrixes indicative of sequential orders of pixels for dots to be formed in the pixel group and the multi-value quantization result values, the fourth correspondence relationships being prepared for each of the pixel groups, wherein the transforming includes:

(a) acquiring the dot count data in response to the code value for each of the pixel groups, by referring to the third conversion table;

(b) acquiring the order value matrix in response to the acquired multi-value quantization result value for each of the pixel groups, by referring to the fourth conversion table; and (c) acquiring the output dot arrangement in response to the acquired dot count data and the acquired order value matrix; and wherein each of the operations of the image processing method is executed by a processor.

2. The image processing method according to claim 1, further comprising the step of providing a reference position matrix as a basis for generating the order value matrix, wherein the step of acquiring the order value matrix includes:

acquiring variable-length position number data representing an order of dot formation in the reference position matrix; and generating the order value matrix in response to the acquired variable-length position number data.

3. A printing method of printing on a printing medium in response to image data indicative of an image represented with a prescribed number of input tones, the printing method comprising:

generating dot data representing a dot on-off state of dot formation on each of print pixels of a print image to be formed on a print medium, by performing a halftone process on the image data with a preset dither matrix; and forming a dot on each print pixel to generate the print image in response to the dot data, wherein the preset dither matrix is structured to include a plurality of local matrixes as multiple cell blocks, each cell of the cell block storing a threshold value, wherein storage positions of the threshold values in the preset dither matrix being determined to make a state of dot formation close to either one of blue noise characteristics and green noise characteristics over a whole range of the input tone values, wherein storage positions of the threshold values in at least part of the cell blocks being changed within each cell block so that a decrease of a granularity evaluation value of the state of dot formation to a granularity evaluation value of the state of dot formation provided by the preset dither matrix is not greater than a preset value to make the state of dot formation closer to either one of blue noise characteristics and green noise characteristics with regard to a partial range of the input tone values, wherein the generating dot data includes:

preparing a first conversion table containing first correspondence relationships of pixel group tone values representing tone values of the pixel groups and multi-value quantization result values assuming a prescribed range of values, the first correspondence relationships being prepared for each of the pixel groups;

preparing a second conversion table containing second correspondence relationships of output dot arrangements indicative of a dot on-off state for each pixel in the pixel groups and the multi-value quantization result values, the second correspondence relationships being prepared for each of the pixel groups;

determining the pixel group tone value in response to input tone values corresponding to the pixel group, among the image data;

converting the determined pixel group tone value into the multi-value quantization result values for each of the pixel groups, by referring to the first conversion table;

transforming the acquired multi-value quantization result value into the output dot arrangement for each of the pixel groups, by referring to the second conversion table; and outputting the dot data in response to the output dot arrangement, wherein the first correspondence relationships and the second correspondence relationships are configured to make a state of dot formation close to either one of blue noise characteristics and green noise characteristics over a whole range of the input tone values, wherein dot positions of at least part of the output dot arrangements are changed within each pixel group so that a decrease of a granularity evaluation value of the state of dot formation to a granularity evaluation value of the state of dot formation provided by referring to the first and second conversion tables is not greater than a preset value to make the state of dot formation closer to either one of blue noise characteristics and green noise characteristics with regard to a partial range of the input tone values corresponding to each of the output dot arrangements, wherein the second conversion table includes a third conversion table and a fourth conversion table, the third conversion table containing third correspondence relationships of dot count data indicative of a number of dots of a single size and code values, the fourth conversion table containing fourth correspondence relationships of order value matrixes indicative of sequential orders of pixels for dots to be formed in the pixel group and the multi-value quantization result values, the fourth correspondence relationships being prepared for each of the pixel groups, and wherein the transforming includes:

(a) acquiring the dot count data in response to the code value for each of the pixel groups, by referring to the third conversion table;

(b) acquiring the order value matrix in response to the acquired multi-value quantization result value for each of the pixel groups, by referring to the fourth conversion table; and (c) acquiring the output dot arrangement in response to the acquired dot count data and the acquired order value matrix.

4. The printing method according to claim 3, wherein the first correspondence relationships and the second correspondence relationships are configured based on the local matrixes, each of the local matrixes corresponding to each of the pixel groups.

5. An image processing system for processing image data indicative of an image represented with a prescribed number of input tones by each of pixel groups composed of a plurality of print pixels, and generating dot data representing a dot on-off state of dot formation on each of the print pixels to be formed on a print medium, the system comprising:

a first conversion table containing first correspondence relationships of pixel group tone values representing tone values of the pixel groups and multi-value quantization result values assuming a prescribed range of values, the first correspondence relationships being prepared for each of the pixel groups;

a second conversion table containing second correspondence relationships of output dot arrangements indicative of a dot on-off state for each pixel in the pixel groups and the multi-value quantization result values, the second correspondence relationships being prepared for each of the pixel groups;

a pixel group tone value determining unit that determines the pixel group tone value in response to input tone values corresponding to the pixel group, among the image data;

a converter that converts the determined pixel group tone value into the multi-value quantization result values for each of the pixel groups, by referring to the first conversion table;

a transformer that transforms the acquired multi-value quantization result value into the output dot arrangement for each of the pixel groups, by referring to the second conversion table; and an outputting unit that outputs the dot data in response to the output dot arrangement, wherein the first correspondence relationships and the second correspondence relationships are configured to make a state of dot formation close to either one of blue noise characteristics and green noise characteristics over a whole range of the input tone values, wherein dot positions of at least part of the output dot arrangements are changed within each pixel group so that a decrease of a granularity evaluation value of the state of dot formation to a granularity evaluation value of the state of dot formation provided by referring to the first and second conversion tables is not greater than a preset value to make the state of dot formation closer to either one of blue noise characteristics and green noise characteristics with regard to a partial range of the input tone values corresponding to each of the output dot arrangements, wherein the second conversion table includes a third conversion table and a fourth conversion table, the third conversion table containing third correspondence relationships of dot count data indicative of a number of dots of a single size and code values, the fourth conversion table containing fourth correspondence relationships of order value matrixes indicative of sequential orders of pixels for dots to be formed in the pixel group and the multi-value quantization result values, the fourth correspondence relationships being prepared for each of the pixel groups, and wherein the transformer performs the following:
  (a) acquiring the dot count data in response to the code value for each of the pixel groups, by referring to the third conversion table;
  (b) acquiring the order value matrix in response to the acquired multi-value quantization result value for each of the pixel groups, by referring to the fourth conversion table; and
  (c) acquiring the output dot arrangement in response to the acquired dot count data and the acquired order value matrix.

* * * * *